United States Patent

Barnard et al.

[15] 3,648,175

[45] Mar. 7, 1972

[54] COMPUTER-ORIENTATED TEST SYSTEM HAVING DIGITAL MEASURING MEANS WITH AUTOMATIC RANGE-CHANGING FEATURE

[72] Inventors: John D. Barnard, Wappingers Falls; Carl C. Gaito, Hopewell Junction; Gary R. Giedd, Wappingers Falls; Thomas G. Greene, Lagrangeville; James W. Lind, Hyde Park; Merlyn H. Perkins, Hopewell Junction, all of N.Y.; Charles M. Pross, Arlington, Mass.

[73] Assignee: International Business Machines Corporation, Armonk, N.Y.

[22] Filed: Nov. 20, 1969

[21] Appl. No.: 877,552

Related U.S. Application Data

[62] Division of Ser. No. 697,676, Jan. 15, 1968, Pat. No. 3,546,582.

[52] U.S. Cl. ....................................324/115, 340/347 AD

[51] Int. Cl. ....................................G01r 17/06, G01r 15/08

[58] Field of Search ............................324/115; 340/347 AD

[56] References Cited

UNITED STATES PATENTS 3,133,278 5/1964 Millis ................................324/115 X 3,187,323 6/1965 Flood et al. ........................324/115 X 3,510,770 5/1970 Lowe ...................................340/347

*Primary Examiner*—Rudolph V. Rolinec

*Assistant Examiner*—Ernest F. Karlsen

*Attorney*—Hanifin and Jancin and Henry Powers

[57] ABSTRACT

A test system is provided for performing functional tests on combinatorial and sequential monolithic devices with the testing automatically programmed under control of a computer processing unit. The test results can be printed out on a printer, logged on tape and/or punched on cards.

Tests are performed by the system under the control of an operational test program comprised of a plurality of interrelated subprograms. The operational test program is run by a computer processing unit which processes the programmed instructions through an input-output logic control section which sets up the test circuit configurations in and commands to an analog section. The analog section provides the required bias, pin resistor loads and signal levels to a device under test. The test parameter data is sensed by a digital voltmeter for conversion from analog-to-digital data form, and for optional visual display if desired. The digital test parameter data is inserted in a comparator for pass/fail logic comparison. High, Low and/or No-Fail information is added by the comparator and sent with the converted digital information to the input-output logic control section where the data is serialized and fed to the computer processing unit for logging or analysis.

18 Claims, 65 Drawing Figures

AUTO-RANGER

INVENTORS
JOHN D. BARNARD
CARL C. GAITO
GARY R. GIEDD
THOMAS G. GREENE
JAMES W. LIND
MERLYN H. PERKINS
CHARLES M. PROSS

BY [signature]
ATTORNEY

Patented March 7, 1972 3,648,175

48 Sheets-Sheet 9

OUTPUT BUFFER CIRCUIT

AUTO-RANGER

AUTO-RANGER

AUTO-RANGER

AUTO-RANGER

MONITOR

MONITOR

MONITOR

SUPERVISOR

FIG. 17B-a
SUPERVISOR

FIG. 17B-b
SUPERVISOR
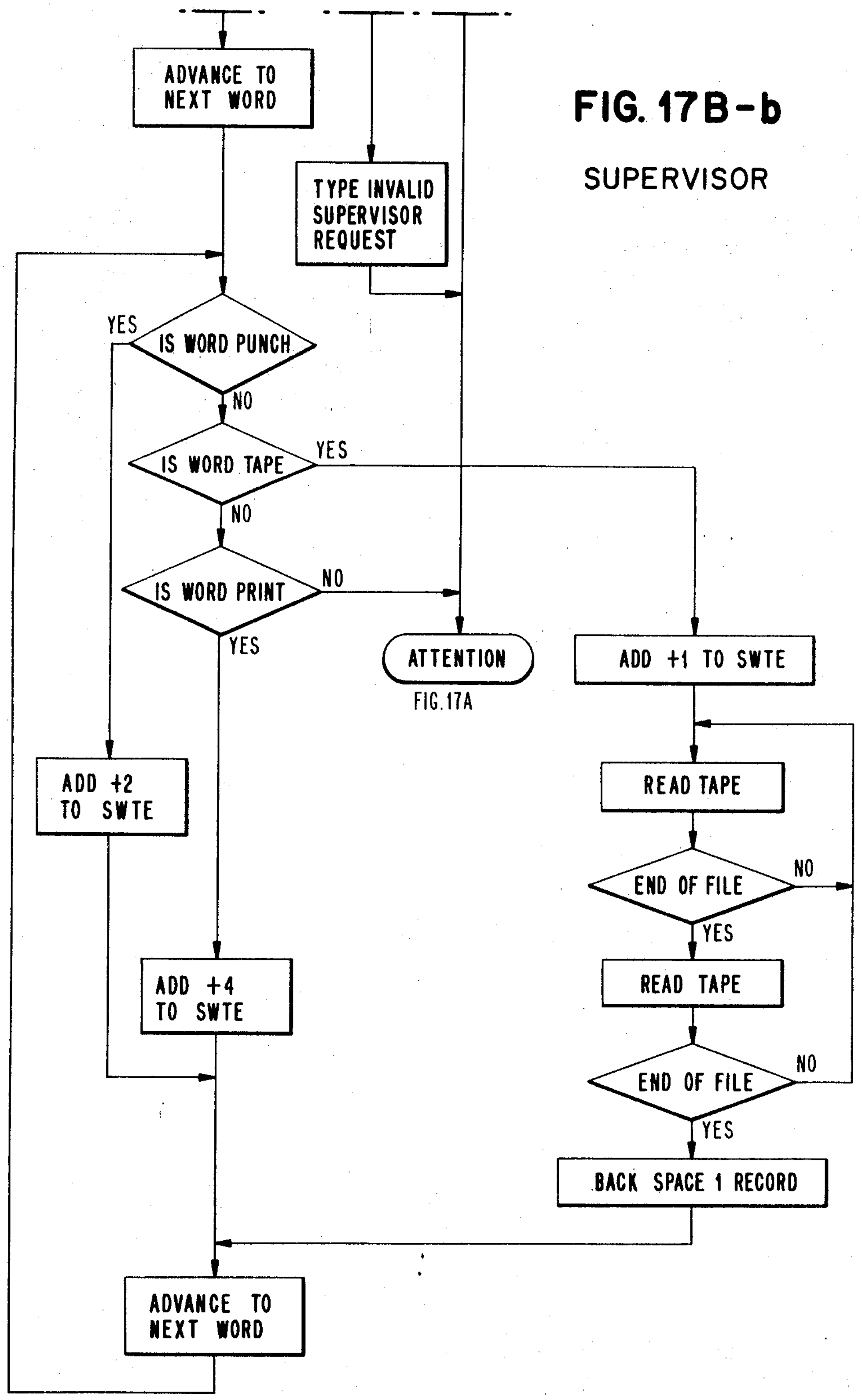

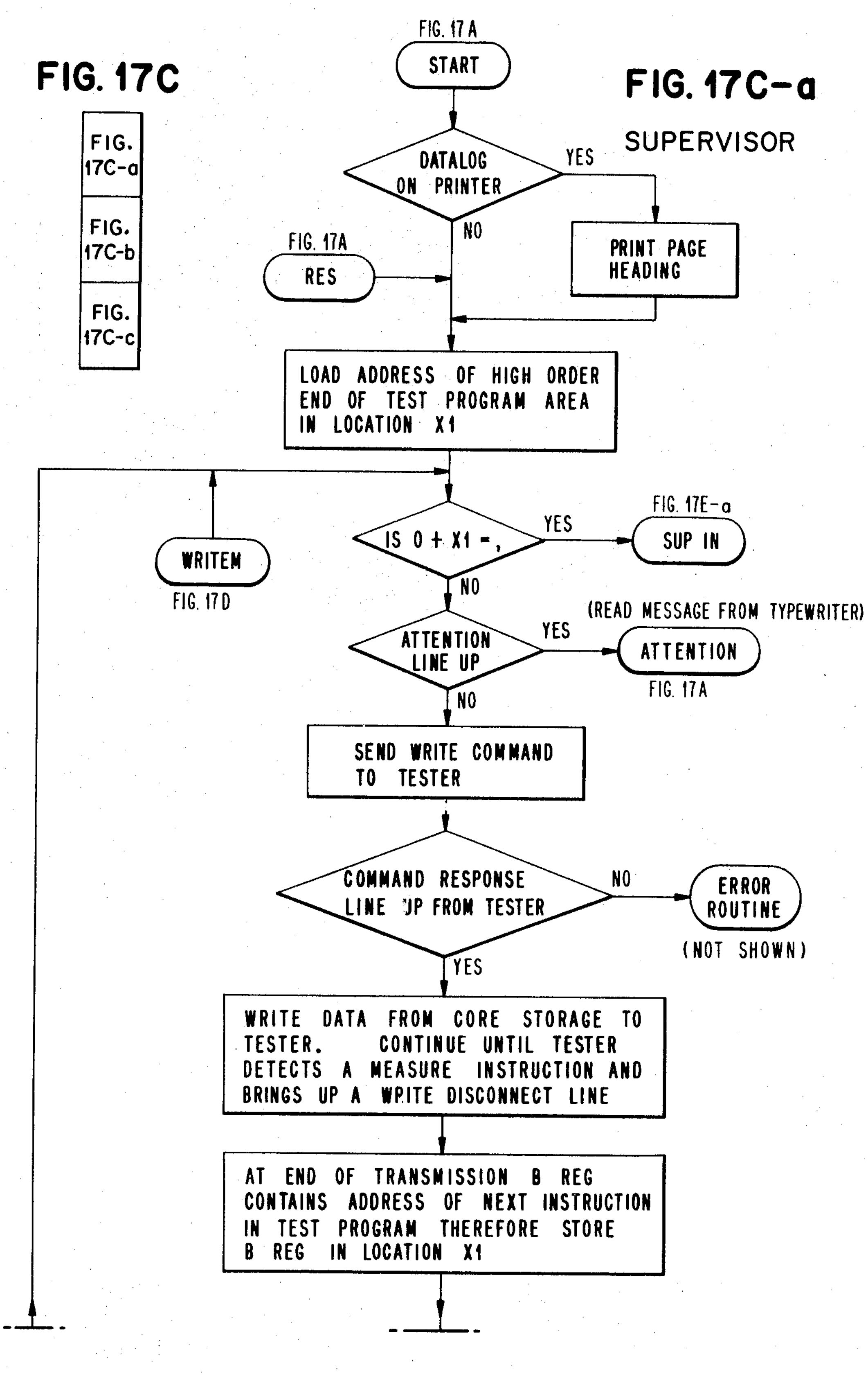
FIG. 17C, FIG. 17C-a

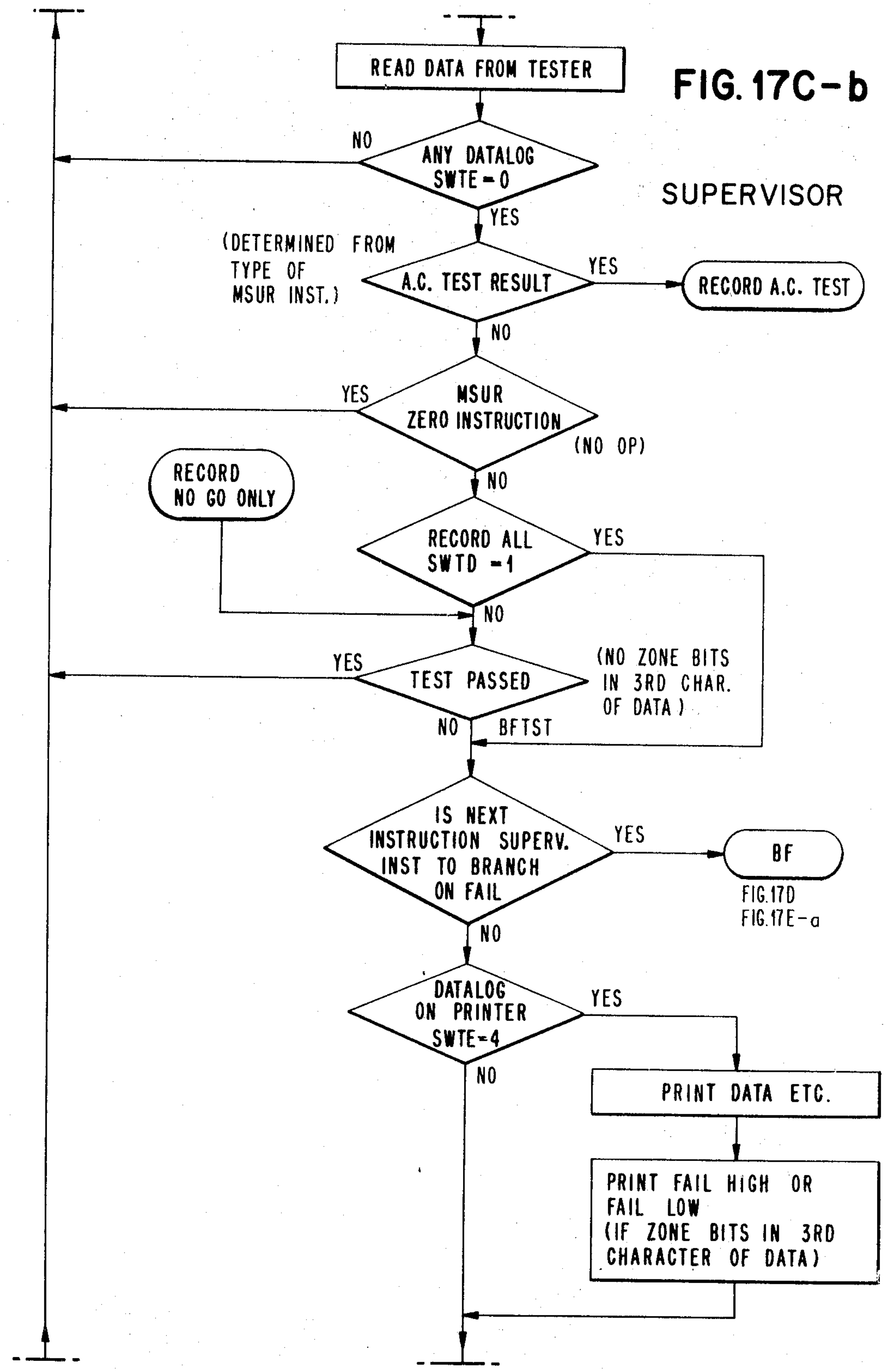
FIG. 17C-b

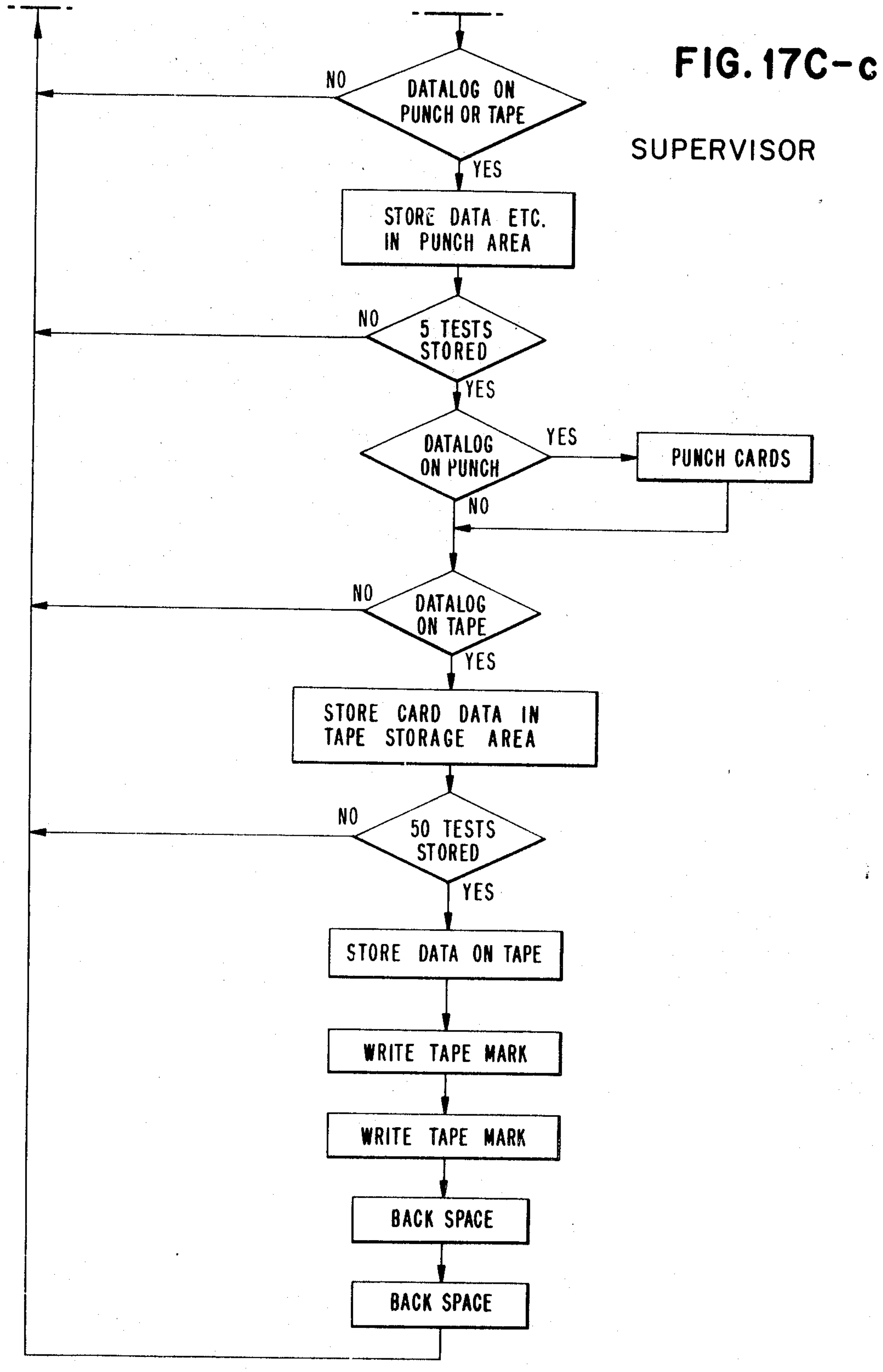
FIG. 17C-c
SUPERVISOR

SUPERVISOR

FIG.17E-a FIG.17E
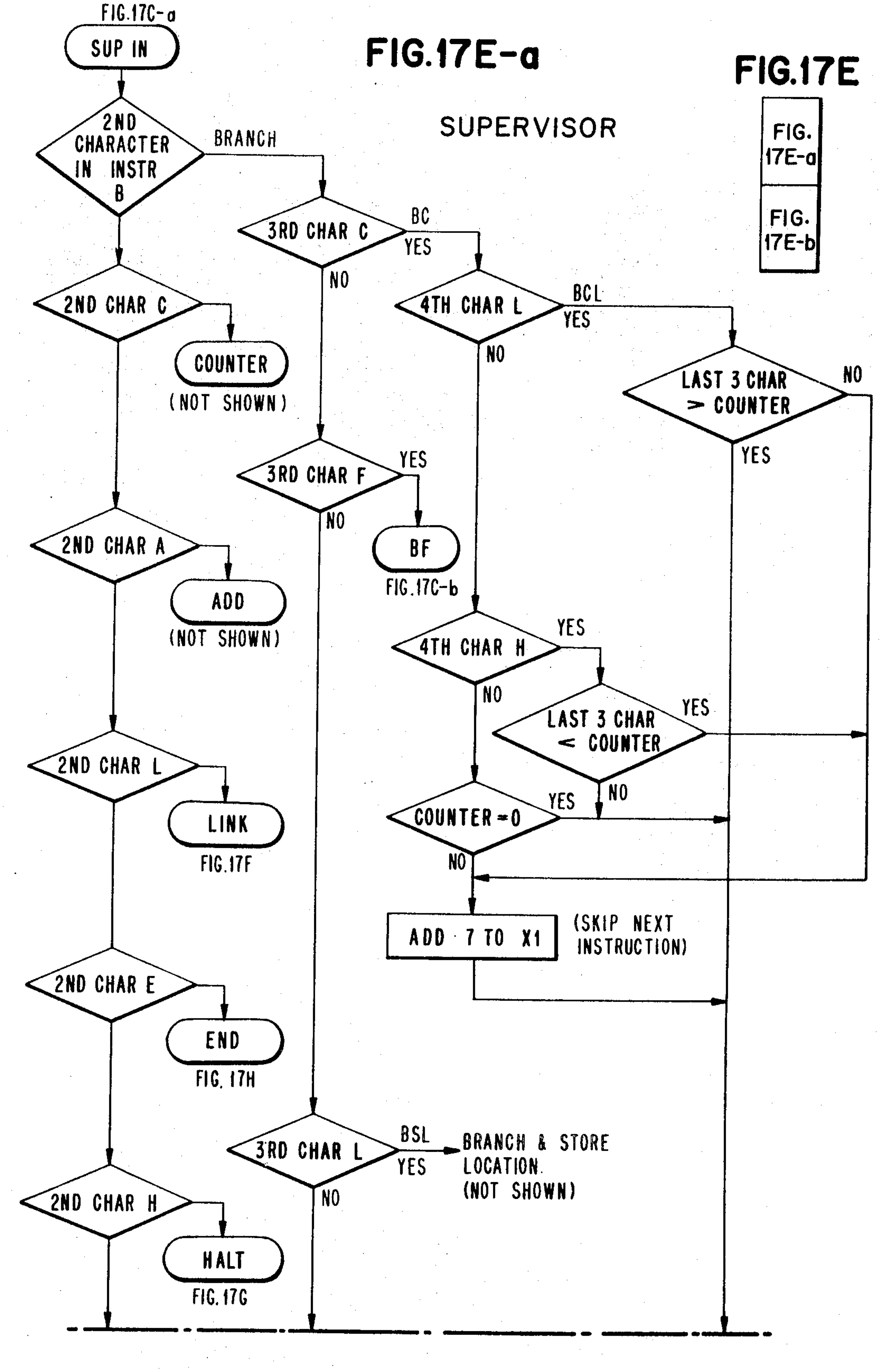

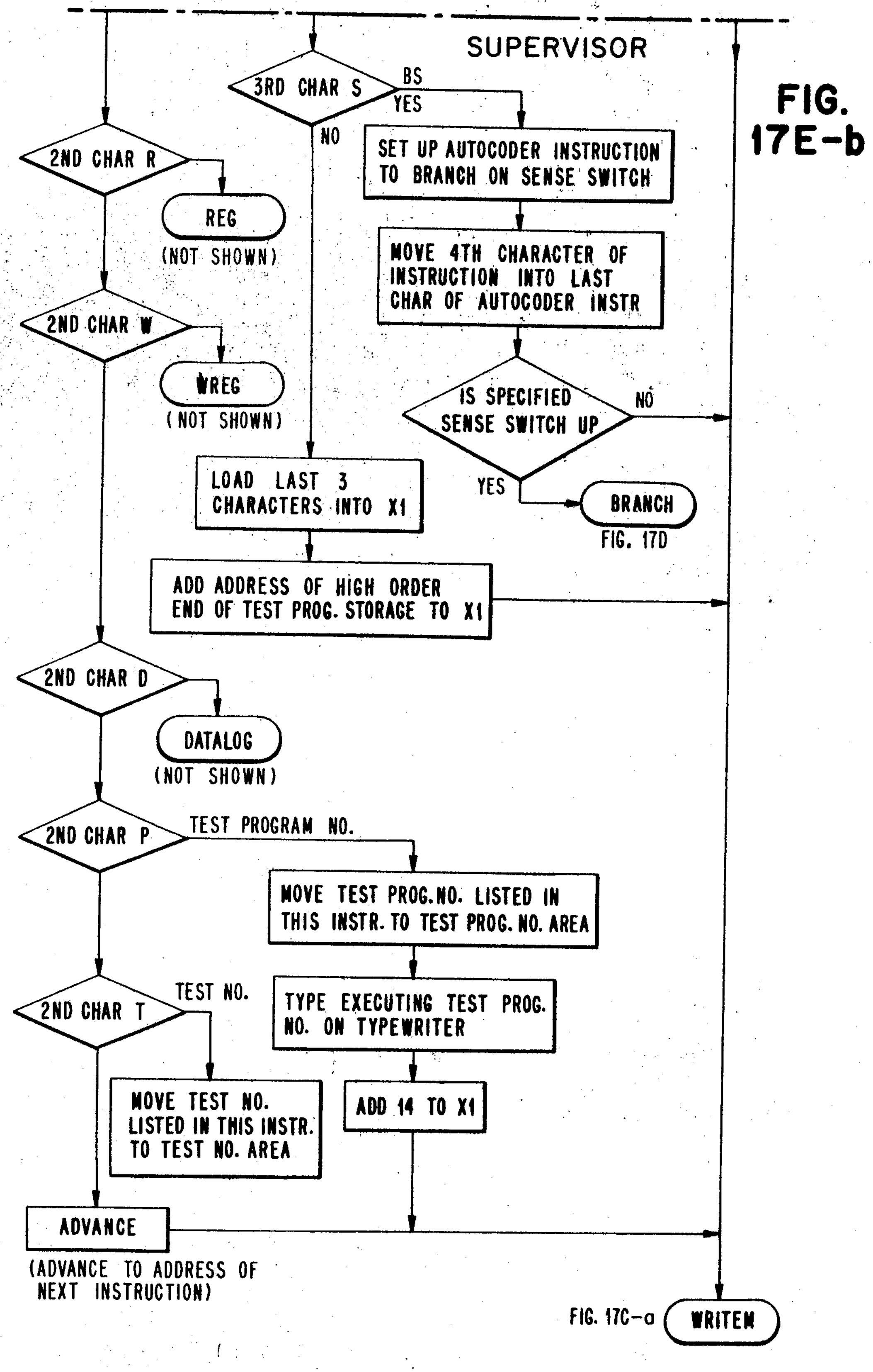
FIG. 17E-b

SUPERVISOR IN CORE

FIG. 19A TEST PROGRAM

| NAME | | | | DEPT. | BLDG. | PHONE | | SHEET OF | |
|---|---|---|---|---|---|---|---|---|---|

| LINE # | C (1) | SYMBOL ADDRESS (2–6) | OP CODE (7–11) | TIME (12) | OPERAND (13–18) | DATA FIELD 1 (19–24) | DATA FIELD 2 (25–30) | DATA FIELD 3 (31–35) | COMMENTS (43–76) | CODING LINE (77–80) |
|---|---|---|---|---|---|---|---|---|---|---|
| 1 | | | PRTNO | | SAMPLE | PGM | | | | 1 |
| 2 | | | TEST | | PN1-4 | | | | | 2 |
| 3 | | | CTRL | W | RESET | | | | | 3 |
| 4 | | | SET | | V1 | +5 | | | | 4 |
| 5 | | | SET | | V2 | -3ØØØ | | | | 5 |
| 6 | | | SET | | MN | -3ØØØ | | | | 6 |
| 7 | | | SET | | LP | ØØØ5 | | | | 7 |
| 8 | | | CNCT | | 1 | DVR | | | | 8 |
| 9 | | | CNCT | | 2 | DV1 | | | | 9 |
| 10 | | | CNCT | | 3 | V1 | | | | 1Ø |
| 11 | | | CNCT | | 4 | V2 | | | | 11 |
| 12 | | | CNCT | W | 5 | GND | REF | DVM | | 12 |
| 13 | | | CTRL | W | ALLON | | | | | 13 |
| 14 | | | SET | | MPLIM | +7 | | | | 14 |
| 15 | | | SET | | LPLIM | 3 | | | | 15 |
| 16 | | | SET | | MNLIM | -3ØØ3 | | | | 16 |
| 17 | | | SET | | LNLIM | -2997 | | | | 17 |
| 18 | | | LEV | | 1 | MN | | | | 18 |
| 19 | | | LEV | W | 2 | LP | | | | 19 |
| 20 | | | MSUR | | 1 | Ø | Ø1MN | | | 2Ø |
| 21 | | | MSUR | | 2 | 1 | | | | 21 |
| 22 | | | MSUR | | 3 | 1 | | | | 22 |
| 23 | | | MSUR | | 4 | Ø | 4-V | | | 23 |
| 24 | | | CTRL | W | ALLOFF | | | | | 24 |
| 25 | | | END | | | | | | | 25 |

FIG. 19B TEST PROGRAM

NAME | DEPT. | BLDG. | PHONE | SHEET OF

| LINE # | C (1) | SYMBOL ADDRESS (2–6) | OP CODE (7–11) | TIME (12) | OPERAND (13–18) | DATA FIELD 1 (19–24) | DATA FIELD 2 (25–30) | DATA FIELD 3 (31–35) | COMMENTS (43–76) | CODING LINE (77–80) |
|---|---|---|---|---|---|---|---|---|---|---|
| 1 | | | PRTNO | | DIFFMSUR | | | | | 1 |
| 2 | | | TEST | | SETUP | | | | | 2 |
| 3 | | | CTRL | W | RESET | | | | | 3 |
| 4 | | | SET | | MP | +8ØØ | | | | 4 |
| 5 | | | SET | | LP | +2ØØ | | | | 5 |
| 6 | | | CNCT | | 1 | DVR | | | | 6 |
| 7 | | | CNCT | | 2 | V3 | | | | 7 |
| 8 | | | CNCT | W | 3 | GND | DVM | REF | | 8 |
| 9 | | | CTRL | W | ALLON | | | | | 9 |
| 10 | | | SET | | MPLIM | +8Ø2 | | | | 1Ø |
| 11 | | | SET | | LPLIM | +798 | | | | 11 |
| 12 | | | LEV | W | 1 | MP | | | | 12 |
| 13 | | | MSUR | | 1 | 1 | Ø1MN | | | 13 |
| 14 | | | MVR | | A+6 | | | | | 14 |
| 15 | | | TEST | | MP-LP | | | | | 15 |
| 16 | | | CTRL | W | ALLOFF | | | | | 16 |
| 17 | | A | SET | | V3 | Ø | | | | 17 |
| 18 | | | CNCTF | | 3 | DVM | | | | 18 |
| 19 | | | CNCTN | W | 1 | DVM | | | | 19 |
| 20 | | | CTRL | W | ALLON | | | | | 2Ø |
| 21 | | | SET | | MPLIM | +6Ø2 | | | | 21 |
| 22 | | | SET | | LPLIM | +598 | | | | 22 |
| 23 | | | LEV | W | 1 | LP | | | | 23 |
| 24 | | | MSUR | | 2 | 1 | | | | 24 |
| 25 | | | | | | | | | | |

FIG.19B-a
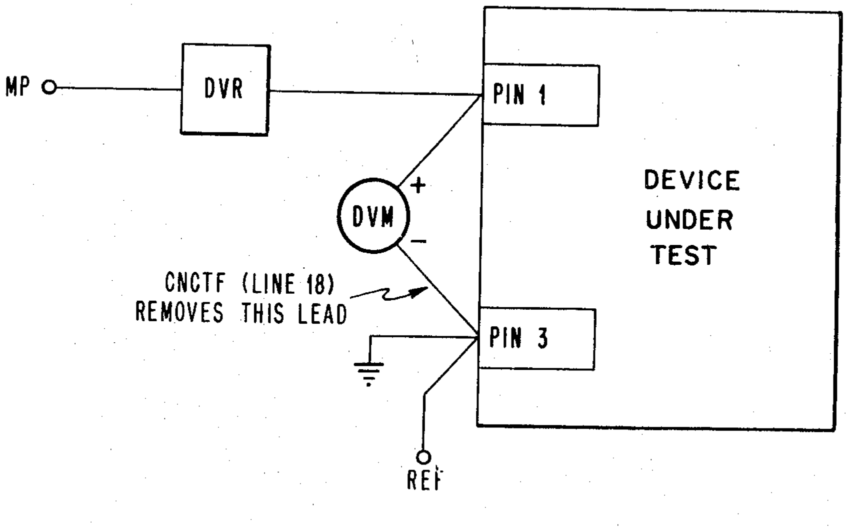
FIG.19B-b
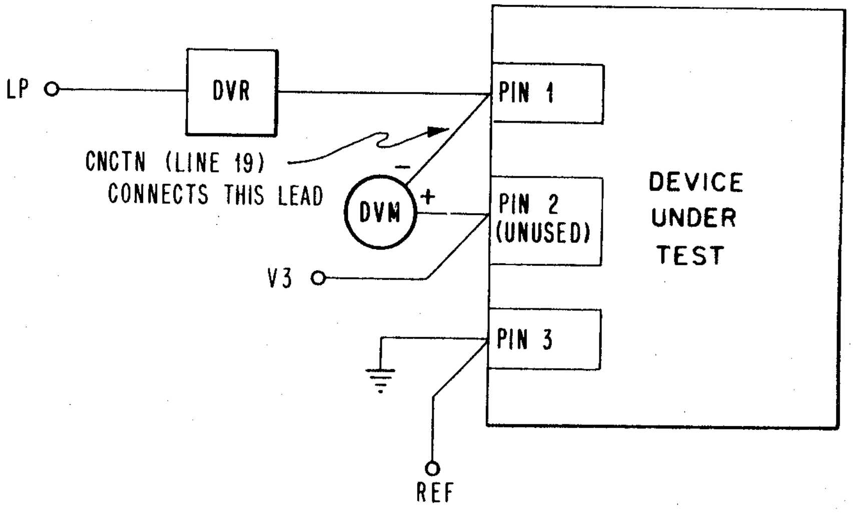

FIG. 19C TEST PROGRAM

NAME DEPT. BLDG. PHONE SHEET OF

| LINE # | C | SYMBOL ADDRESS | OP CODE | TIME | OPERAND | DATA FIELD 1 | DATA FIELD 2 | DATA FIELD 3 | COMMENTS | CODING LINE |
|---|---|---|---|---|---|---|---|---|---|---|
| 1 | | | TEST | | Ø15ØI | | | | | 1 |
| 2 | | | LCTR | | 73Ø | | | | RESTORE V3 | 2 |
| 3 | | | CTRS | | A+6 | | | | | 3 |
| 4 | | | LCTR | | 17 | | | | INITIALIZE COUNTER | 4 |
| 5 | | | CTRL | W | ALLOFF | | | | | 5 |
| 6 | | | SET | | MPLIM | +738 | | | | 6 |
| 7 | | | SET | | LPLIM | +722 | | | | 7 |
| 8 | | | SET | | MNLIM | -17Ø | | | | 8 |
| 9 | | | SET | | LNLIM | -3Ø | | | | 9 |
| 10 | | | CNCT | | 16 | DVM | GND | REF | | 1Ø |
| 11 | | | CNCT | W | 1 | R5 | V3 | | R5 EQUALS 1K | 11 |
| 12 | | | CTRL | W | ALLON | | | | | 12 |
| 13 | | A | SET | W | V3 | +73Ø | | | | 13 |
| 14 | | | MSUR | | 1 | 1 | | | | 14 |
| 15 | | | BFL | | +14* | | | | | 15 |
| 16 | | | B | | C | | | | | 16 |
| 17 | | | ADD | | A+6 | +1Ø | | | | 17 |
| 18 | | | BCL | | Ø | | | | | 18 |
| 19 | | | BC | | A | | | | | 19 |
| 20 | | C | CNCTF | | 16 | DVM | | | | 2Ø |
| 21 | | | CNCTN | W | 1 | DVMR | | | | 21 |
| 22 | | | MSUR | | 1 | Ø | 1UA | | | 22 |
| 23 | | | | | | | | | | |
| 24 | | | | | | | | | | |
| 25 | | | | | | | | | | |

COMPUTER-ORIENTATED TEST SYSTEM HAVING DIGITAL MEASURING MEANS WITH AUTOMATIC RANGE-CHANGING FEATURE

This application is a division of copending application, Ser. No. 697,676 filed Jan. 15, 1968, new U.S. Pat. No. 3,546,582.

BACKGROUND OF THE INVENTION

1. Field of the Invention

This invention relates to testers for electrical circuits, and more particularly to an automatic test system for testing semiconductor devices including circuits containing such devices.

2. Description of the Prior Art

Significant increases and present growth in the complexity of electrical circuits, particularly in integrated semiconductor devices have been and are being accompanied by a corresponding proliferation in the actual and growing number of test and data reduction requirements. Typically, an integrated circuit array can contain scores of interconnected circuits and dozens of inputs, for which the number of test inputs and their permutations can be astronomical. A DC functional checkout, alone, of such arrays can demand the performance of thousands and even millions of tests in a relatively short time. In order to facilitate a reasonable control over such growing testing requirements, the use of computers has been resorted to in order to automatically perform such tests, together with analysis, diagnosis, and storage of the results thereof in conjunction with some appropriate display thereof. One such computer control test system is described in U.S. Pat. No. 3,237,100 issued on Feb. 22, 1966.

In general, such test systems rely on the laborious creation of a test program which prescribes each step and function of the test system and its associated computer. In addition, such systems are also characterized by inherent limitations in the system itself, as for example, tolerances and drifts in the components, remote sensing, requirements for scaling or selection of ranges for signal levels to be applied and sensed, restructuring of the program to incorporate modifications either permanent or provisional or the like.

SUMMARY OF THE INVENTION

Accordingly, it is an object of this invention to provide a new and improved test system for testing of complex electrical circuits.

Another object of this invention is to provide a test system for rapidly testing and accurately performing a large number of tests on complex electrical circuits, including integrated-circuit arrays thereof together with analysis, diagnosis, and recording of the results of such tests, if desired, on optionally selected recording mediums.

It is further an object of this invention to provide a novel and improved test system having immediate and ready access to a large number of test programs for a corresponding number of electrical circuits to be tested.

A further object of this invention is to provide a novel and improved test system having means for testing and determining the critical pass and fail parameter levels of electrical circuits to be tested.

A still further object of this invention is to provide a novel and improved test system to establish and apply accurate test signals to an electrical circuit to be tested.

A still further object of this invention is to provide a novel and improved test system which corrects the generation of test signals to a programmed level specified for application to electrical circuits to be tested.

A still further object of this invention is to provide a new and improved test system in which a test program for a device to be tested can be monitored and permanently or provisionally modified and restructured within the system itself.

An additional object of this invention is to provide a test system which provides automatic scaling for the output of measuring devices which sense the input and response of an electrical circuit under test.

Still another object of this invention is to provide a computer-orientated test system in which the execution of a program of test instructions is performed under control of an auxiliary program which determines which instructions are to be executed in the computer and which instructions are to be transmitted through the test system to an electrical device to be tested.

The foregoing and other objects, features and advantages of the invention will be apparent from the following more particular description of the embodiments of the invention, as illustrated in the accompanying drawings.

In the drawings:

BRIEF DESCRIPTION OF THE DRAWINGS

FIGS. 19A–19C illustrate the use of test instructions in a test program for use in the test system of this invention.

DESCRIPTION OF THE PREFERRED EMBODIMENTS

Figure 1A:
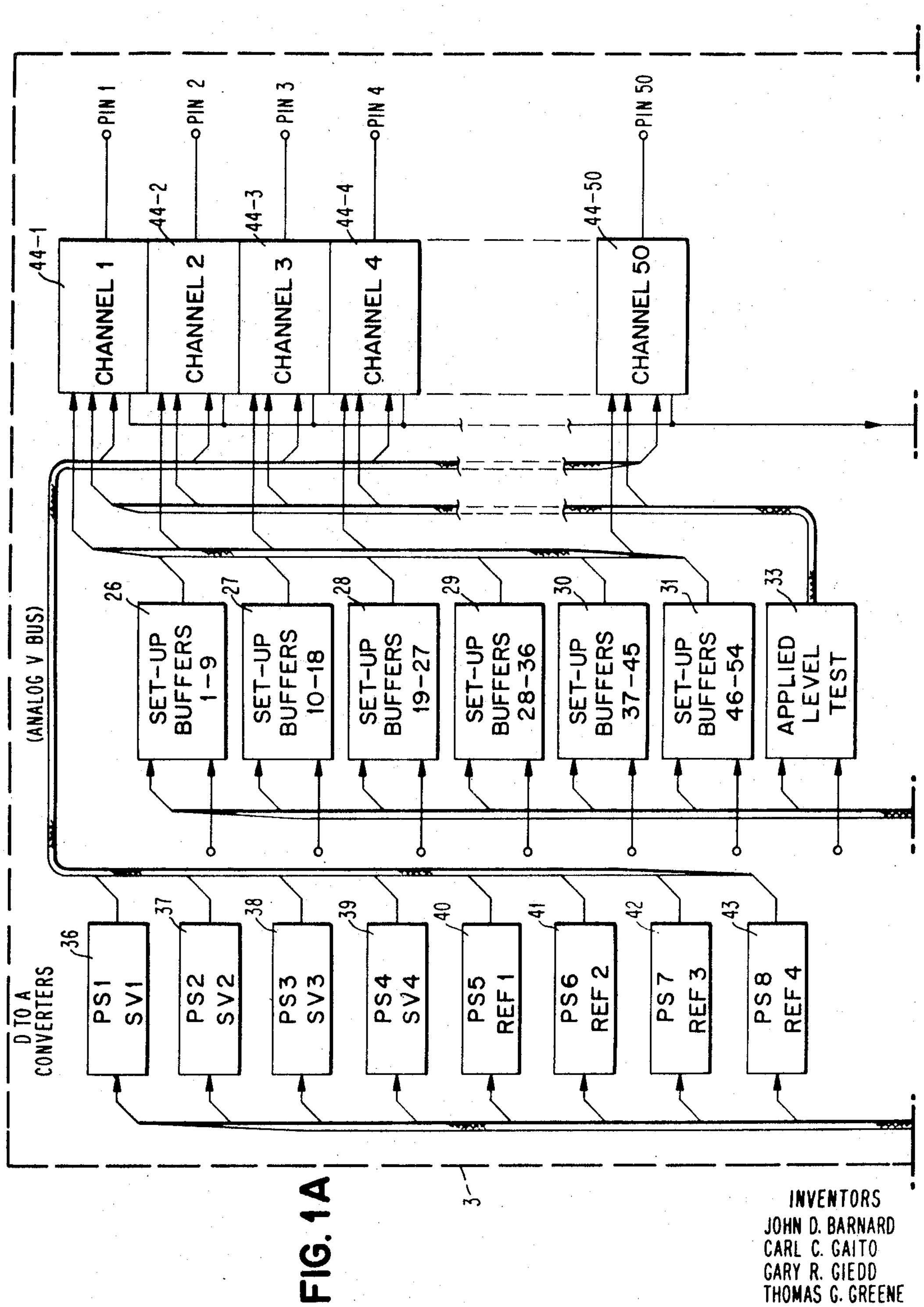
FIGS. 1–1B are simplified block diagrams illustrating the overall system organization of the tester.
Figure 1:
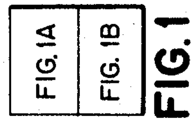
Figure 1B:
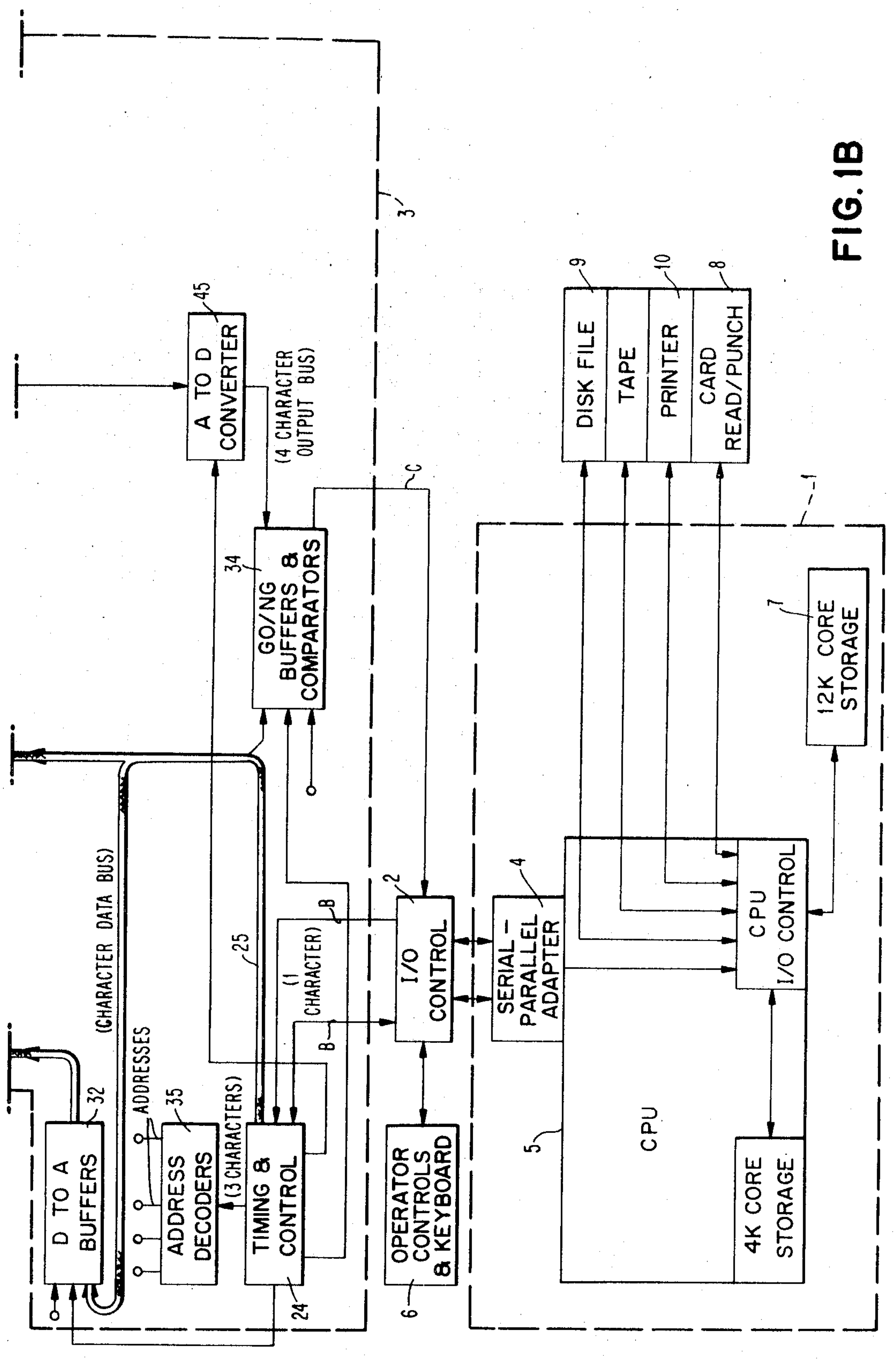

Referring to FIG. 1, the basic system organization of the tester is illustrated. The system comprises three major subsystems; a data processing subassembly 1, an input-output control logic 2 and the analog subassembly 3 containing digital storage registers. The input-output control unit 2 functions as an interface between the data processing unit 1 and the analog section 3. Two-way transmission of BCD (Binary Coded Decimal) information may be made through the input-output unit 2 either (a) between analog section 3 and a serial-to-parallel converter 4 of a digital Computer Processing Unit (CPU) 5, or (b) between the analog section 3 and an operator keyboard control unit 6 which may comprise a discrete unit or be employed in combination with any conventional operator's panel; not shown.

Test instructions and test input data are initially entered into the CPU 5 from storage in a core memory 7 (comprising an associated part of CPU 5) by way of a card reader 8 for subsequent storage on a disc-file 9. The test instructions originate from a general test program (GTL) card deck consisting of one instruction per card. Each GTL transfer and/or processing of test instructions and test input and output data through and in the test system is accomplished under control of an operational test program assimilated from a plurality of interrelated subprograms (described below). Initially, test instructions and test input data are entered into the CPU 5 for storage in a memory system such as a core storage 7 by way of a card reader-punch unit 8 for subsequent storage in a disc-storage or disc-file 9 which comprises a unit of a number of conventional peripheral communication devices provided for operation of the test system. By way of example such devices may include the indicated keyboard control unit 6, an output typewriter unit, a high-speed printer 10, the card read/punch unit 8 and a magnetic tape unit 11 which may serve as the communication and control mediums for the test system.

Figure 2:
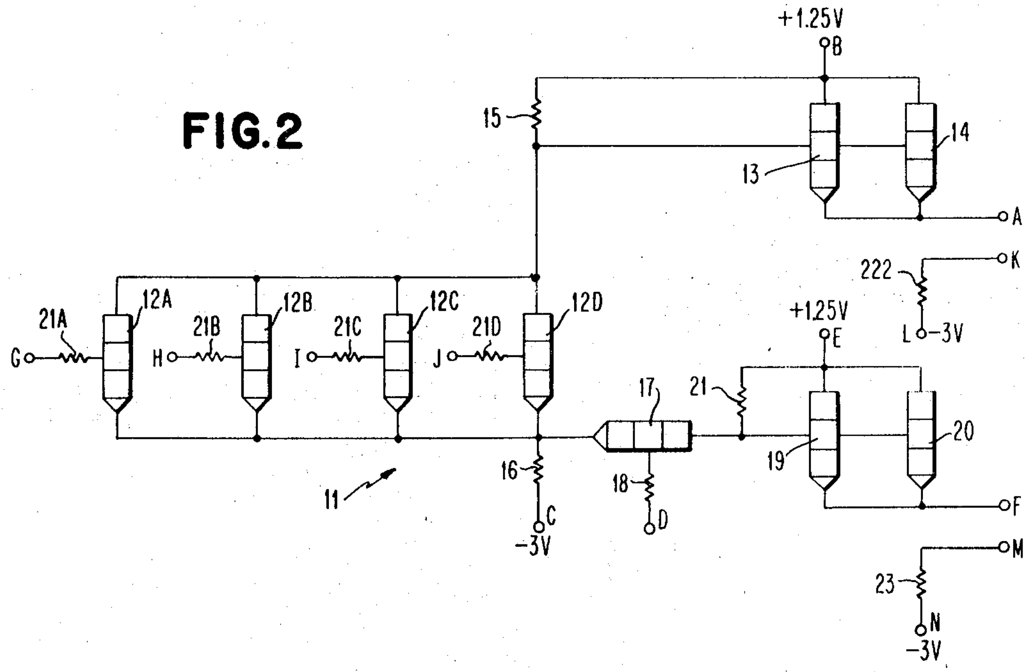
FIG. 2 is a schematic diagram of a logic circuit for illustrating the complexity of circuits comprehended to be tested by the system of this invention.

Test instructions originate from a general test language (GTL) card deck containing one instruction per card. Each GTL instruction is then converted by an assembler subprogram into a systems test language (STL) card deck containing a maximum of 23 instructions per card which are subsequently stored on the indicated disc-file 9. When a set of tests is required for testing a particular device, applicable test instructions and test inputs are retrieved from the disc-file 9 into core storage 7 under control of a systems monitor subprogram which then transfers control of the instructions to a supervisor subprogram which determines when STL instructions are to be executed in CPU 5 and which STL instructions are to be forwarded to the analog subassembly 3 for execution. The test instructions and the test input data are converted into specific voltage levels by the analog subassembly 3, and the levels applied at a test station to applicable pins of a circuit such as FIG. 2 which may be integrated on a monolithic module.

The sample circuit shown is a four-input circuit with an in-phase and out-of-phase output. The circuit illustrated comprises four NPN-transistors 12A, 12B, 12C, and 12D, which have their collectors connected in common to the common bases of one transistor 13 of a pair 13,14 and through a resistor 15 to a reference potential of +1.25v. at pin B and also connected in common to the collectors of the transistor pair 13,14 having their emitters connected in common to an output pin A. The emitters of transistors 12A to 12D are also connected in common through a resistor 16 to a −3v. reference potential at pin C and to the emitter of a transistor 12 having its base connected to ground at pin D through a resistor 18. The collector of emitter 17 is connected to the common base of a transistor pair 19,20 and through resistor 21 to +1.25v. potential at pin E also connected in common to the collectors of the transistor pair 19,20 which has its emitters connected to pin F. Each of transistors 12A to 12D has its bias connected respectively to input pins G, H, I and J through individual resistors 21A to 21D. Also associated with the main circuit are two resistors 22 and 23 connected between respective pairs of pins K–L and M–N with pins L and N connected to a potential of −3v. This specific circuit was tested by the system of this invention as more fully indicated below.

However, although a specific circuit has been described alone, it is to be understood that a large variety of circuits may be tested by the system of this invention. Such circuits include diverse logical circuit which also comprehends the usual combinatorial logic circuit which perform AND, OR, NOR, NAND, EXCLUSIVE OR, and the like logical function. In general, sequential and combinatorial logical circuits may be tested, which include latches, binary triggers, etc.

Regardless of the circuit configuration under test, the test results are sensed by the analog section 3 wherein they are compared with programmable limits. The results of the comparison are in the form of a GO/NO-GO signal which is forwarded together with the converted voltage from the analog section 3 through the CPU 5 to memory 7. The CPU 5 under control of the supervisor program combines the GO/NO-GO signal with data which identifies the type of test performed and the type of circuit configuration tested. The composite test data is then stored on tape and, as required, punched on cards, recorded by the printer, and the like.

Figure 3:
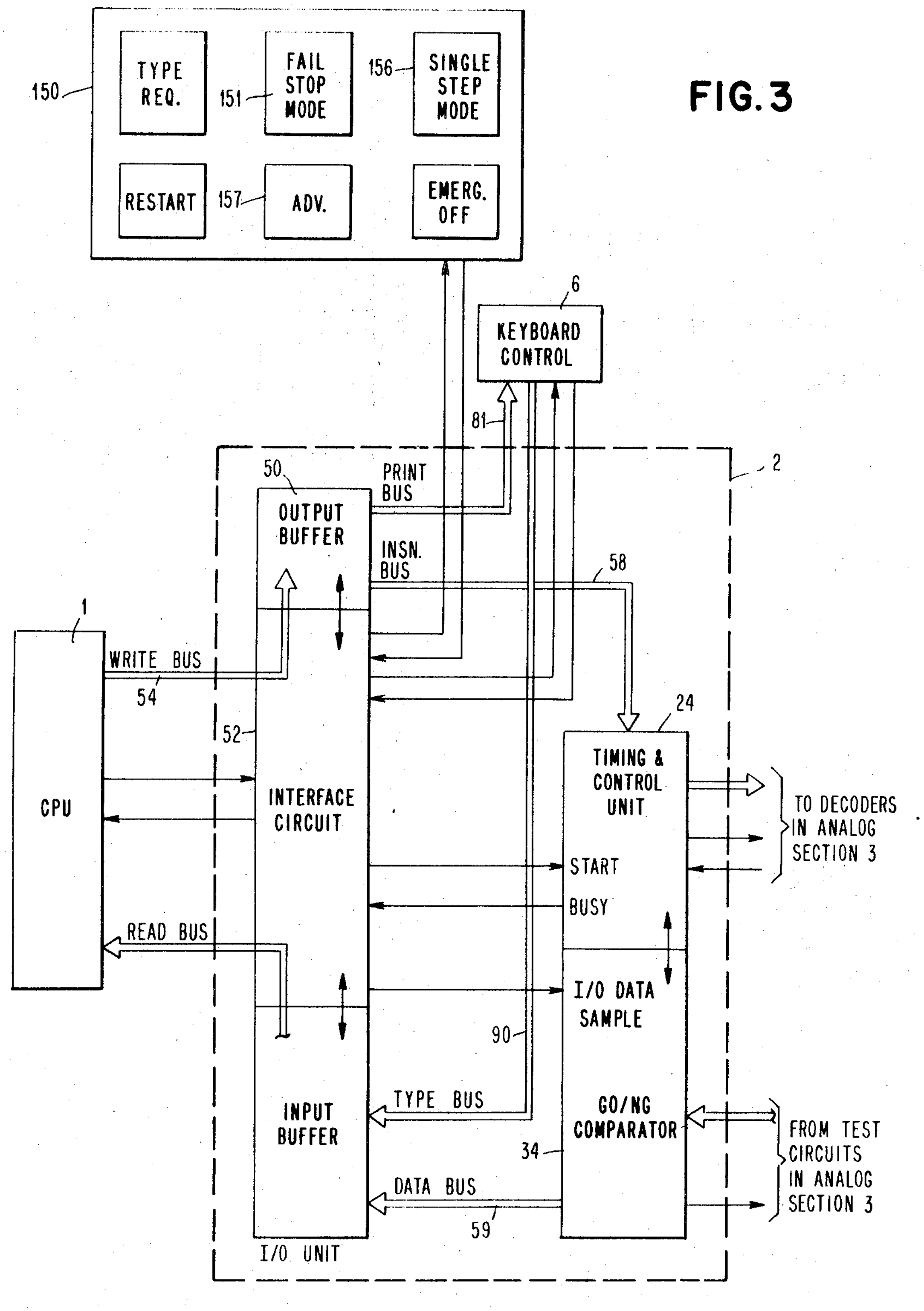
FIG. 3 is a block diagram of a portion of the system shown in FIG. 1 and illustrates additional details of an input-output control together with an indication of the flow of logic and signals through the unit.
Figure 4:
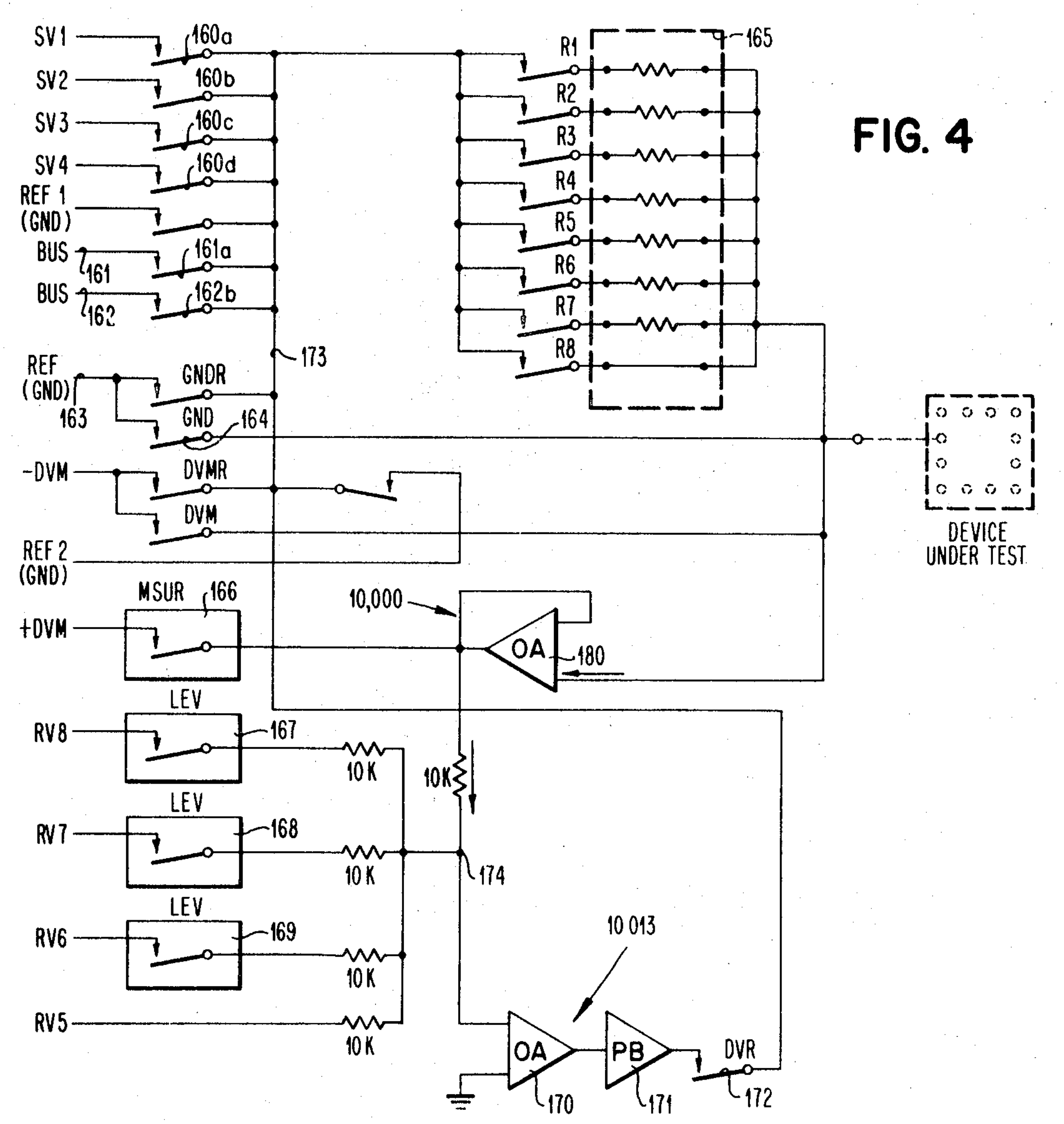

Also comprehended in the test system is provision for altering a programmed sequence of test instructions and test input data by means of the keyboard control unit 6. Such new instructions and new test input data are typed on the keyboard control unit 6 and transferred to the CPU 5 which, under control of the supervisor program, then transfers the information to the analog section 3 or to the input-output control logic 2. A block diagram of the analog section is shown in FIG. 4 wherein each block is a self-contained, serviceable, maintainable individual module. Similarly each block of the input-output control logic shown in FIG. 3 is also self-contained, serviceable, maintainable, independent module. In this respect, it is noted, that although the specific embodiments are shown for a 50-pin version of the test system, it is to be understood that in view of the module construction of the test system (particularly in the control logic and analog sections), the test system can be readily expanded to 999 pins or more by the simple expedient of adding modules.

As shown in FIG. 1, lines to and from the CPU-unit 5 feed the "input-output control logic" section 2. Seven BCD characters (where one character is comprised of six bits B, A, 8, 4, 2, 1, respectively) are read serially from the CPU-unit 5 into an input buffer that is part of the timing and control module 24, although the characters could be read serially into the keyboard control unit 6. Table 1 below shows the format of the seven-character input word. The output from the timing and control module 24 comprises four data characters which are directed to a data bus 25 which feeds channel connect or setup buffers 26–31, the digital-to-analog buffers 32, the applied level test buffers 33, and the Limit in the GO/NO-GO buffer 34. This data is gated into the register indicated by the three-digit address decoded in an address decoder module 35. The eight power supplies 36–43 are set up by the digital-to-analog buffers 32, of which as indicated above, the first four power supplies 36–39 are used for service purposes with the remaining four power supplies 40–43 used for setting up the different pins for high-speed analog applications. The output of these power supplies is then applied to the desired ones of pins 1 to 50 through previously configured b the setup buffers 26–31 as addressed by the decoders 35 under program control. The output of the device under test is sampled through any one of the 50-channel circuit 44–1 to 44–50 through the analog-to-digital converter, (which may conveniently comprise a digital voltmeter), into a binary-coded decimal (BCD) which is compared in a GO/NO-GO comparator of block 34. The results of the comparison are in turn, encoded as to whether it is a pass or fail, and if fail, whether it is fail high or fail low; these results are in turn fed back to computer 5.

TABLE 1

Input Format

| Character N: | | $B_n A_n 8_n 4_n 2_n 1_n = C_n$ | |
|---|---|---|---|
| | $B_1$ | – | Op Code |
| | $A_1$ | – | Op Code |
| | $8_1$ | – | Hundreds Address |
| $C_1$ | $4_1$ | – | |
| | $2_1$ | – | |
| | $1_1$ | – | |
| | $B_2$ | – | Op Code |
| | $A_2$ | – | * System Timing: Normal=1/Wait=0 |
| | $8_2$ | – | Tens Address |
| $C_2$ | $4_2$ | – | |
| | $2_2$ | – | |
| | $1_2$ | – | |
| | $C_3$ | – | Units Address |
| | $C_4$ | – | 1st Data Character |
| | $C_5$ | – | 2nd Data Character |
| | $C_6$ | – | 3rd Data Character |
| | $C_7$ | – | 4th Data Character |

*Except for measure operation where $A_2$=0 means test for zeros and $A_2$=1 means test for ones.

The type of operation (Op Code) is contained in the zone bits of the first two characters of the input data which may also be considered part of the address. These operations are listed in Table 2 below. Thus, if a "connect" operation was desired, the address decoder 35 would set the data into the desired one of the 50 "channel connect" buffers 26–31 corresponding to the addressed test pin.

TABLE 2

Op Code Operations

Op Code Bit/Character

| No. $B_1$ | $A_1$ | $B_2$ | Operation | Address | Data |
|---|---|---|---|---|---|
| 0 - 0 | 0 | 0 | Connect | Pin | 12-bit channel setup |
| 1 - 0 | 0 | 1 | Set | Power Supply Limit AC Operations | 4 BCD characters |
| 2 - 0 | 1 | 0 | | | |
| 3 - 0 | 1 | 1 | | | |
| 4 - 1 | 0 | 0 | Apply Level | Set of 10 Pins | 20-bit channel test |
| 5 - 1 | 0 | 1 | | | |
| 6 - 1 | 1 | 0 | Measure | Pin | Not used* |
| 7 - 1 | 1 | 1 | Control | Control Function | Not used* |

*When $B_1$=1 and $A_1$=1, only $C_1$, $C_2$ and $C_3$ are read into the tester.

Only 12 bits (three per character) are used by the "channel connect" buffers 26–31 to set up the channel prior to testing: Tables 3 and 4 below show how these 12 bits are decoded to control the channels. The specific manner in which these controls actually connect the test pin to ground, to a service voltage, etc. will be described in more detail below.

TABLE 3

Binary Input Format

| Applied Level Input | Setup Input |
|---|---|
| $B_4$ - $a_1$ | $4_4$ Connect $V_{1-14}$ or |
| $A_4$ - $b_1$ | $2_4$ $V_{ref}$ or $Bus_{1-2}$ |
| $4_4$ - $a_2$ | $1_4$ *1 |
| $2_4$ - $b_2$ | |
| $1_4$ - $b_2$ | |
| $1_4$ - $a_3$ | $4_5$ GND and driver ref |
| | $2_5$ Connection *1 |
| $B_5$ - $b_3$ | $1_5$ - Spare |
| $A_5$ - $3_4$ | |
| $4_5$ - $b_4$ | $4_6$ - DVM to resistor |
| $2_5$ - $a_5$ | $2_6$ - DVM to pin |
| $1_5$ - $b_5$ | $1_6$ - Spare |
| $B_6$ - $a_6$ | $4_7$ |
| $A_6$ - $b_6$ | $2_7$ Resistor 1–7 *1 |
| $4_6$ - $a_7$ | $1_7$ |
| $2_6$ - $b_7$ | |
| $1_6$ - $a_8$ | |
| | Note: *1 See Table 7 for Setup codes |
| $B_7$ - $b_8$ | |
| $A_7$ - $a_9$ | |
| $4_7$ - $b_9$ | |
| $2_7$ - $a_{10}$ | |
| $1_7$ - $b_{10}$ | |
| $a_n b_n$ control one test pin where: | |

| $a_n b_n$ | | Applied Level |
|---|---|---|
| 0 | 0 | $MNDL=-V_5$ |
| 1 | 0 | $LNDL=-V_5-V_6$ |
| 0 | 1 | $LPUL=-V_5-V_6-V_7$ |
| 1 | 1 | $MPUL=-V_5-V_6-V_7-V_8$ |

TABLE 4

Data Setup Codes

| $4_4$ | $2_4$ | $1_4$ | |
|---|---|---|---|
| 0 | 0 | 0 | Do nothing |
| 0 | 0 | 1 | Connect $V_1$ to Pin |
| 0 | 1 | 0 | Connect $V_2$ to Pin |
| 0 | 1 | 1 | Connect $V_3$ to Pin |
| 1 | 0 | 0 | Connect $V_4$ to Pin |
| 1 | 0 | 1 | Connect V Return and Driver Reference to Pin |
| 1 | 1 | 0 | Connect Bus 1 to Pin |
| 1 | 1 | 1 | Connect Bus 2 to Pin |
| $1_5$ | $2_5$ | | |
| 0 | 0 | | Do nothing |
| 0 | 1 | | Connect GND to Resistors (Supply Bus) |
| 1 | 0 | | Connect GND to Pin |
| 1 | 1 | | Connect Driver and Return to Pin |
| $4_7$ | $2_7$ | $1_7$ | |
| 0 | 0 | 0 | Connect $V_n$ directly to Pin |
| 0 | 0 | 1 | Connect $V_n$ through $R_1$ to Pin |
| 0 | 1 | 0 | Connect $V_n$ through $R_2$ to Pin |
| 0 | 1 | 1 | Connect $V_n$ through $R_3$ to Pin |
| 1 | 0 | 0 | Connect $V_n$ through $R_4$ to Pin |
| 1 | 0 | 1 | Connect $V_n$ through $R_5$ to Pin |
| 1 | 1 | 0 | Connect $V_n$ through $R_6$ to Pin |
| 1 | 1 | 1 | Connect $V_n$ through $R_7$ to Pin |

A "Set" operation (Table 2 above and Table 5 below) shows how the digital-to-analog buffers 32 are addressed. In accordance with this format, four characters of data are set into this buffer, associated with one of eight programmable power supplies 36–43, which as employed in the instant embodiment, are commercial programmable power supplies obtainable from the Fluke Company, Seattle, Wash. The format for this data is shown in Table 6 below.

TABLE 5

Set Addresses

Op Code 1 ($B_1$=0, $A_1$=0, $B_2$=1):

| Decimal Equivalent of BCD Address | Address |
|---|---|
| 01 | V Supply 1 |
| 02 | V Supply 2 |
| 03 | V Supply 3 |
| 04 | V Supply 4 |
| 05 | V Supply 5 |
| 06 | V Supply 6 |
| 07 | V Supply 7 |
| 08 | V Supply 8 |
| 41 | MND Limit |
| 42 | LND Limit |
| 43 | LPU Limit |
| 44 | MPU Limit |
| 81 | |
| 82 | |
| 83 | AC TMS (time measuring) parameters |
| ↓ | |
| 99 | |
| 15 | |
| 16 | Used by the computer Assembler Program |
| 17 | |
| 18 | |

TABLE 6

I/O BCD Data Formats

| Input Data | Output Data |
|---|---|
| $B_7$ - Polarity | $B_4$ -Polarity |
| $A_7$ - Polarity | $A_4$ -Polarity |

| | | | | | |
|---|---|---|---|---|---|
| $8_7$ –, $4_7$ –, $2_7$ –, $1_7$ – | Units Digit | $8_4$ –, $4_4$ –, $2_4$ –, $1_4$ – | Units Digit | | |
| | | | Go | Low Fail | Hi Fail |
| $C_6$ – | Tens Digit | $B_3$ – | 0 | 1 | 1 |
| | | $A_3$ – | 0 | 0 | 1 |
| $C_5$ – | Hundreds Digit | $8_3$ –, $4_3$ –, $2_3$ –, $1_3$ – | Tens Digit | | |
| $C_4$ – | Thousands Digit | | | | |
| $B_4$ – | Range: X1=0 X10=1 | $C_2$ – | Hundreds Digit | | |
| | | $C_1$ – | Thousands Digit | | |
| | | | $B_1$–Range: X1=0 X10=1 | | |

Note: All voltage levels in mvolts.

| B | A | Polarity Input | Polarity Output |
|---|---|---|---|
| 0 | 0 | + | + |
| 0 | 1 | + | not used |
| 1 | 0 | – | – |
| 1 | 1 | + | not used |

In general, the programmable power supplies 36–43 are programmed in four digits of *m* volts plus polarity. The "control" operations (Tables 2 above and 7 below) are used to sequence the power on or off to one or all of the supplies. Normally this is done before each series of tests.

TABLE 7

Control Addresses

Op Code 7 ($B_1$=1, $A_1$=1, $B_2$=1):

| Decimal Equivalent of BCD Address | | Function | Decimal Equivalent of BCD Address | Function |
|---|---|---|---|---|
| | | Turn on: | | |
| 01 | – | V1 | 41 | –Reset TESTER |
| 02 | – | V2 | 42 | –Fix 1V |
| 03 | – | V3 | 43 | –Fix 10V |
| 04 | – | V4 | 44 | –Reset Fix |
| 09 | – | All V's | 45 | – |
| | | Turn Off: | | |
| 11 | – | V1 | 46 | – |
| 12 | – | V2 | 47 | – |
| 13 | – | V3 | 48 | – |
| 14 | – | V4 | 49 | – |
| 19 | – | All V's | 81 | –AC measurement 1 |
| | | | 82 | –AC measurement 2 |
| | | | 83 | –AC measurement 3 |

An "Apply Level" op code (Table 2) is initiated after the pins and power supplies are all set up. The address selects buffers for a set of 10 pins. As shown in Table 3, 20 of the data bits (out of 24) are used two at a time to control the test level applied to each of the 10 pins. This decoding is done in the "Applied Level" buffers 33 which are channeled to drive solid-state switches in channels 44–1 to 44–50. Each of these channels is modular in form so that the levels of one to 10 pins can be changed without effecting any other pins.

Figure 4A:
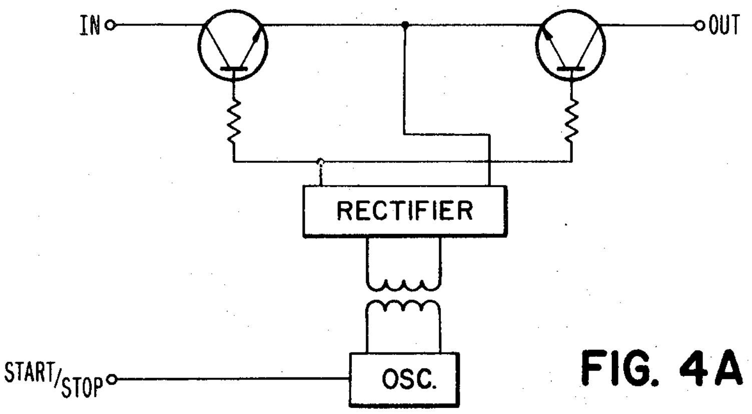

Each of channel units 44–1 to 44–50 comprise individual monitor circuits individually associated with each of pins 1 to 50 for controlling flow of information to and from these pins, including logic and signals. In its broadest concept, these channel units comprise a modification and adaptation of a similar circuit configuration described by one of the inventors J. W. Lind on pages 98 to 101 of the Oct. 17, 1966 issue of the "Electronics"magazine. Included in the function of these channel units, is that of multiplexing information flows to and from their respective pins. The service voltages, reference voltages, currents, resistor load selections, and grounds are applied to the device under test, at the pin, through the channel unit. The general configuration of each channel unit is shown in FIG. 4 which illustrates the flexibility of the multiplexing which can be made. The upper portion of the drawing shows the various service voltages SV1 to SV4 applied to any one of selected relays 160*a* to 160*d*. In addition, the channel has a capability of applying any one of two busses 161 and 162 through relays 161*a*, 162*b* to the selected pin in the event that there are pins that are desired to be tied together on the device under test. Any one of the 50 pins can be designated as a reference return for all power supplies and may also have the capability of applying ground or other voltage reference 163 through relay 164 to any one of the pins connecting the device under test. In addition, ground or reference voltage 163 can be applied to the pin through any one of resistors in the resistor matrix 165 via selection of any of relays R1 to R7. High-speed capabilities for the tester are provided by solid-state switches 166–169 which are chopper switches (as manufactured by Brower Labs) in the back-to-back chopper transistors in the Bright configuration driven by the floating drive circuit. The general configuration of these switches is shown in FIG. 4A which shows the use of two back-to-back transistors with a common base-to-collector drive source. The solid-state switches 167–169 are employed to connect any one of reference voltages RV5 to RV8 through an operational amplifier 170 and a power booster 171 via a driver relay 172, bus 173 and relay 8 to the exercised pin. The desired test voltage is formed at the output of the solid-state switches by adding the input voltage levels in a prescribed sequence to the operational summing amplifier 170 in a prescribed sequence. Three of the programmed voltages are connected to the amplifiers summing junction 174 by chopper switches 167–169 and one reference voltage (RV5) is connected directly to the operational amplifier 170. In the configuration shown, the addition of voltage as indicated prevents overshoots at the output caused by timing inconsistencies in the chopper drive or the transition from one voltage to another. The voltages available at the output of the multiplex switch are RV5, RV5+RV6, RV5+RV6+RV7, RV5+RV6+RV7+RV8. In addition, any one of the output pins can be designated as a reference return for all power supplies, and includes the capability of applying a ground to any one of the output pins or more than one ground if required. In addition, ground can be applied to any of the pins through selected resistors in the resistor network 165. The feedback path from the pins that are receiving voltage, is passed through a unit gain voltage follower 180 whose output is connected to the summing junction of the summing amplifier 170, and through the chopper switch 166 to the positive terminal of a digital voltmeter. By virtue of the specific configuration shown for the channel units, a highly increased flexibility is accorded for multiplexing to the output pin. Included in the features or functions of the multiplexing are the application of programmed service for environmental voltages, as indicated above, of SV1 to SV4 to any selected pins, application of selectively variable reference voltages RV5 to RV8 to some or all of the remaining selected pins, and selectively varying reference voltages at solid-state speeds while maintaining the service voltages fixed (e.g., directly between fixed levels) and preselected load resistors to the pin.

Figure 6:
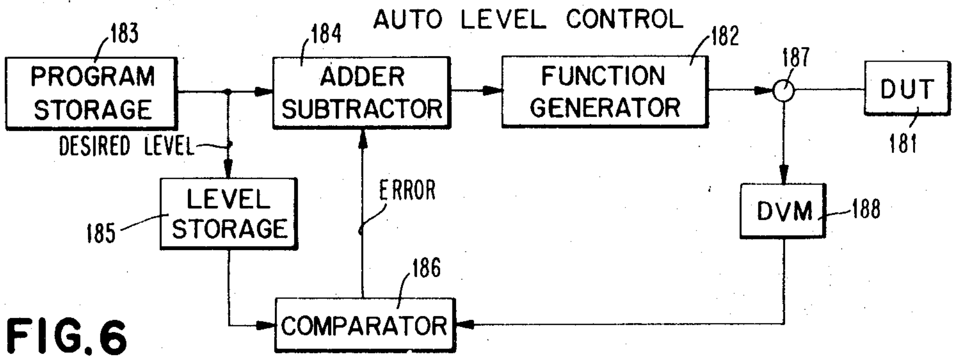
FIGS. 4–7A illustrate the construction of a subsystem employed for controlling the flow of signal levels to and from each input to a device to be tested.
Figure 5:
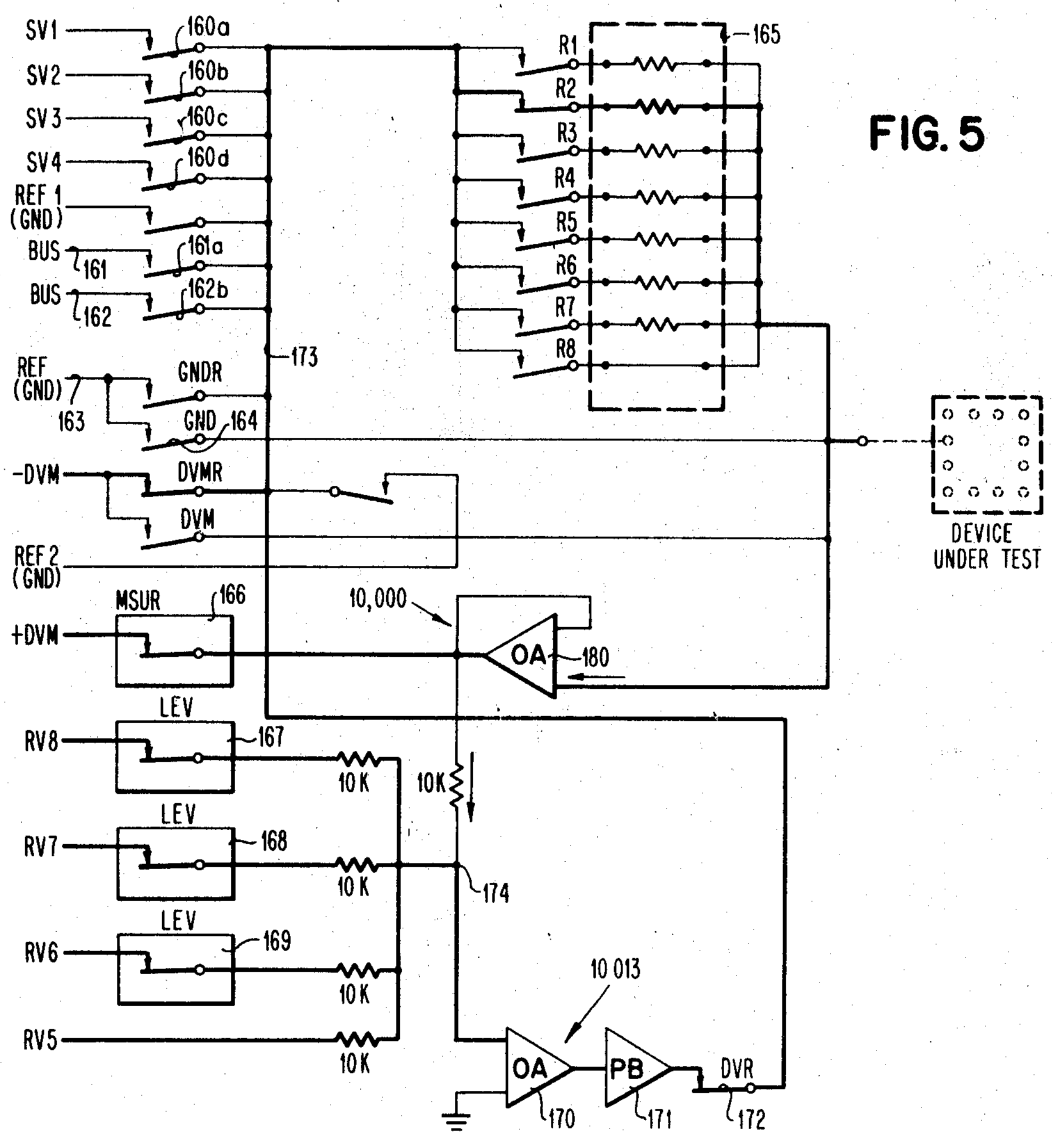
Figure 5A:
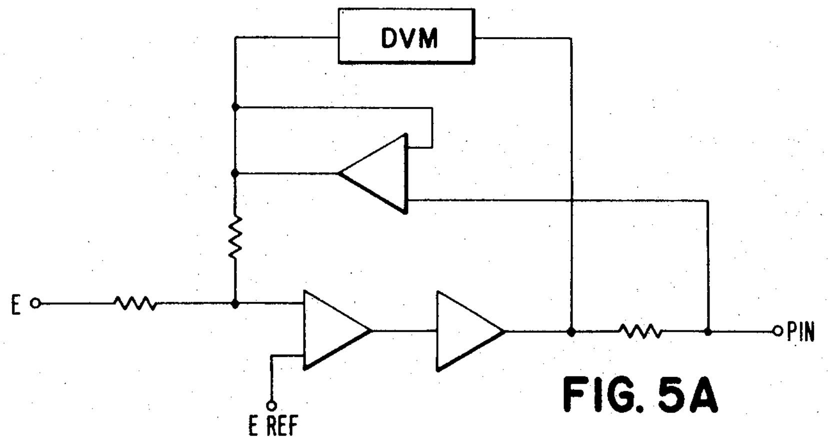
Figure 7:
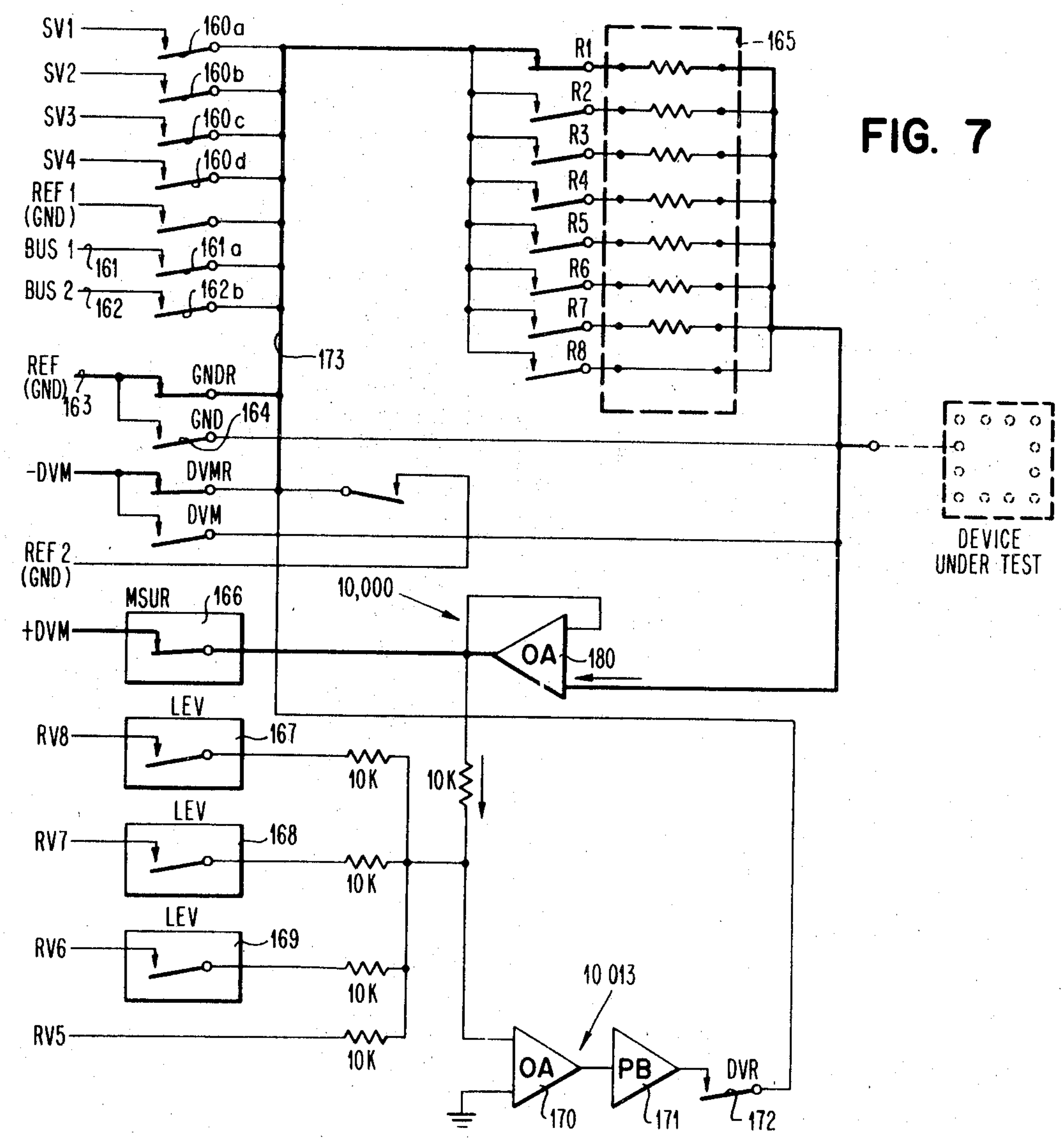
Figure 7A:
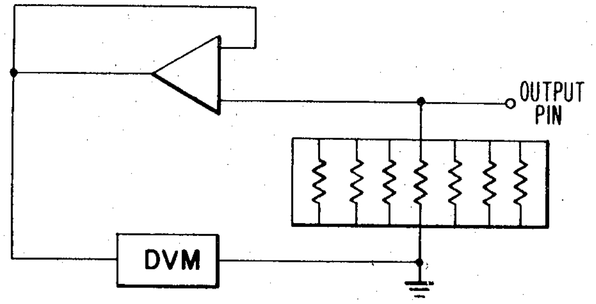

Conversely, the digital voltmeter can be connected to measure input voltage, bias voltage, or the current through one of the load resistors. Among the more significant features resulting from the indicated circuit configuration of the channel units, is that of self-checking or autocontrol so as to insure the impressing of the programmed one or more of the reference voltage levels RV5 to RV8 combinations to the pin without need for intervention. The picked relay and switch state of this channel unit for this purpose is shown in FIG. 5 with the final resultant circuit shown in FIG. 5A for simplicity. However, in practice the minus side of the DVM, ground and reference functions would be connected to and at a second pin to the device under test. In conjunction with this self-check feature accorded by the channel units, in output level control for positive impressing of a programmed voltage level to the pin of a device under test 181 is shown in the circuit arrangement of FIG. 6. As shown in this figure, the programmed level of a function generator 182 from a program storage 183 may be fed through an adder-subtractor logic 184 and stored in a level storage 185 for comparison in the digital comparator 186. The programmed level at pin 187 of the device 181 is sensed by digital voltmeter 188 for comparison with the stored level in comparator 186 with the error signal or difference fed to the adder-subtractor logic 184 for appropriate incrementation of the function generator 182 to provide the requisite level at pin 187. Referring to FIG. 7 which shows picked switches, the resultant connection of a load to the output terminal at the pin of the device under test and the measurement of current through the load is illustrated together with the resultant simplified circuit shown in FIG. 7A.

A measure operation (Table 2) terminates a test by indicating with the address a pin to be measured by the analog-to-digital converter 45 comprising any conventional unit such as the ADAGE DVM obtainable from ADAGE, Boston, Mass., to which is provided a programmable scaled output. After the address decoder 35 selects the proper channel that is to activate the proper one of channels 44–1 to 44–50, the analog-to-digital is triggered. The output of the analog-to-digital converter 45 in four digits of *m* volts shown in Table 6, is fed to the GO/NO-GO comparator 34 and then to the input-output control logic 2 wherein the four digits are serialized and fed one character at a time to the CPU-unit 5 for data logging or analysis. The comparator adds the High, Low or No-Fail information to the output word.

High and Low limits for both a "1" and a "0" are prestored with a "Set" operation in four four-digit limit buffers located in the GO/NO-GO module 34. The $A_2$ zone bit of the "Measure" tells the comparator whether to use the "1" or the "0" limits.

This digital GO/NO-GO comparator compares the output of the analog-to-digital converter 45 (e.g., digital voltmeter,) to an externally generated or programmed high and low limits. In practice, the same BCD code is used for the d.v.m. and limit inputs. However, it is to be understood that any BCD code is acceptable.

Returning to FIG. 1, the timing and control module is provided with a set of timing circuits that are conditioned by a decoded Op Code. Operation is asynchronous being started by a signal developed in the input-output logic section 2, and initiated by the CPU 5 when the analog subassembly 3 (viz, timing and control) signals it is not busy.

Input-output control logic section 2 is shown in FIG. 3. In general, the format for the input-output logic control unit is computer orientated with all "input-output" lines employing "computer input" and "computer output." Within this format the CPU or computer unit 5 "writes" when transmitting output information and "reads" when receiving input information. "Input" and "output" are further program orientated in that, all input lines control or transmit "data" resulting from a measure operation, or type data originating at the keyboard control 6 under manual control, and all output lines are associated with program "instructions" either transmitted to the analog subassembly section 3 as instructions or to the keyboard control 6 to advise the operator of the system status.

Three discrete circuits form the input/control logic: namely an output buffer 50, an input buffer 51 and an interface circuit 52. Both buffers 50 and 51 operate independently under control of asynchronous gate signals developed in the interface circuit. The asynchronous signalling arrangement inherently allows greater flexibility in the amount of manual operator control required with three operating modes possible: fully automatic, semiautomatic and manual. The operating modes, together with the other three input-output circuits are discussed in more detail below. In general, FIG. 3 shows a simplified block diagram of the information flow.

Figures 8, 8A:
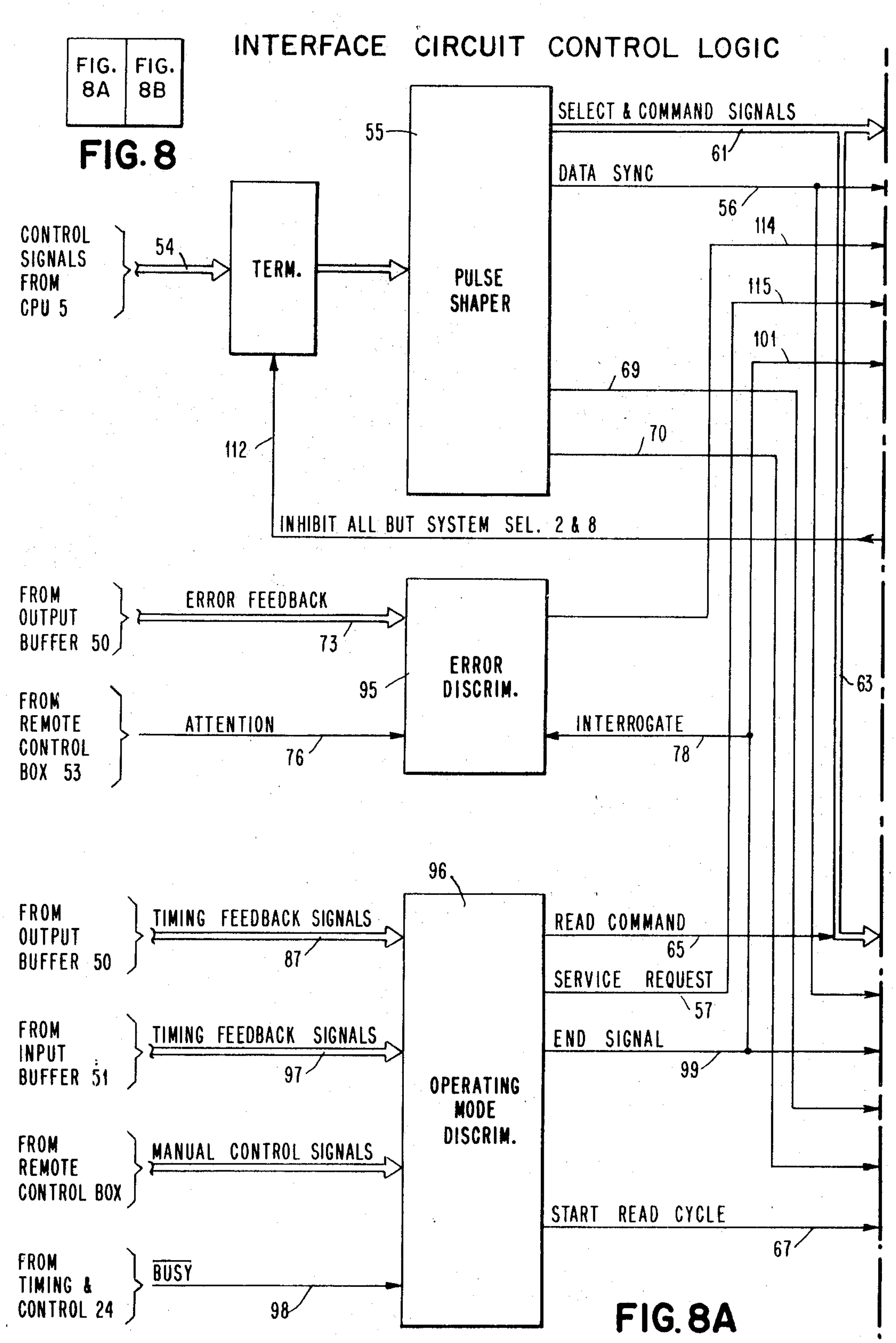
FIGS. 8–8B illustrate and expand the organization of the interface circuit shown in FIG. 3.
Figure 8B:
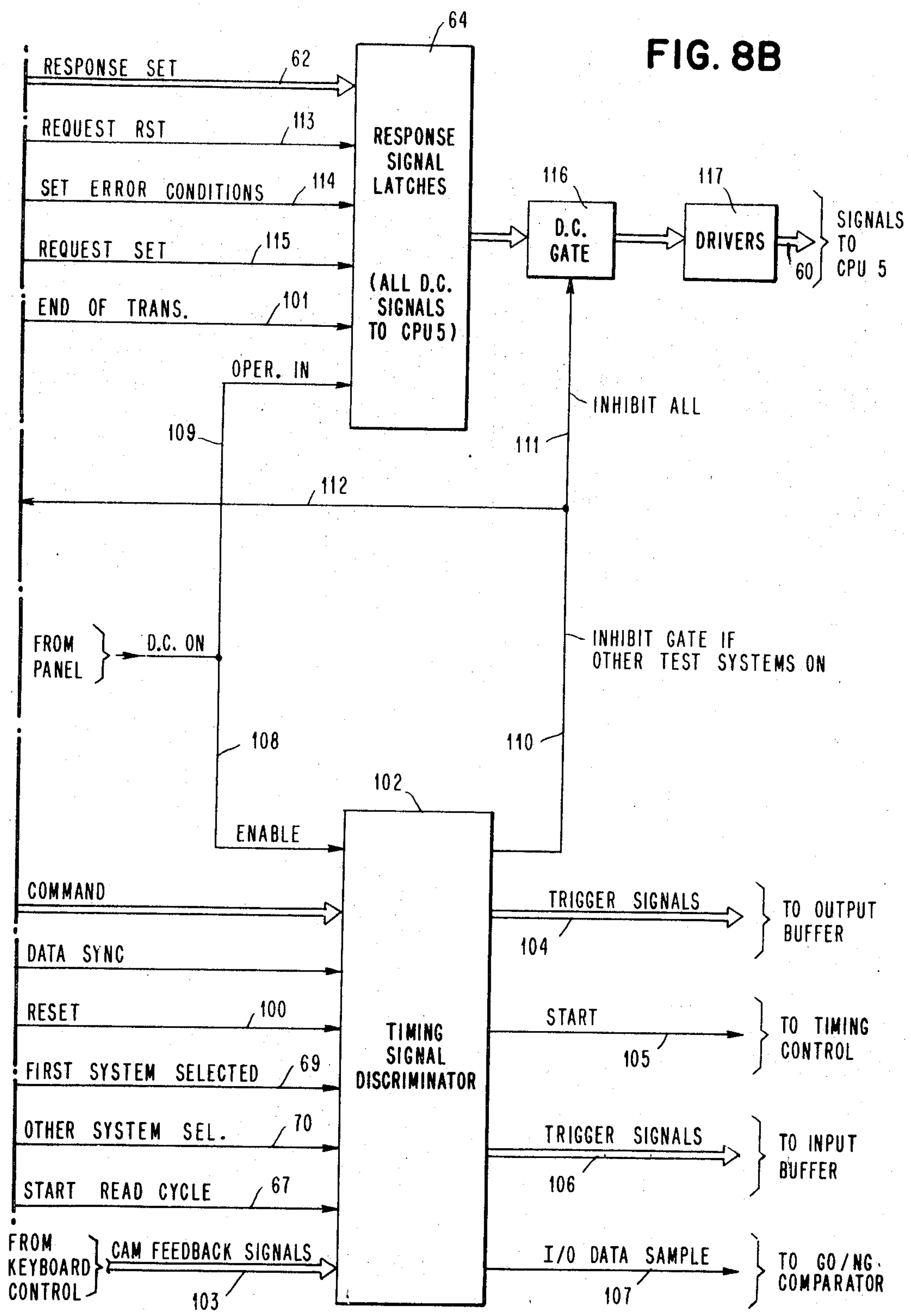

The interface circuit 52, more detailed in FIG. 8. In general, all signal lines originating in the CPU 5 are pulse operated and are asynchronously interlocked to DC response lines originating in the interface circuit 52. Included is a "write" bus 54 which sends information through a pulse shaper 55 in the interface circuit 52. In the embodiment shown, this bus is comprised of seven lines, e.g., six-bit lines and one line for odd parity. Information is valid on the "write" bus 54 from the leading edge to the fall edge of a "data sync" on line 56. The "data sync" is used to signal the input-output control logic section 2 in recognition of a signal on the service request line 57. The "data sync" indicates to the I/O logic section 2 that the computer 5 is transmitting or has received information on, respectively, instruction bus 58 or data bus 59 (FIG. 3). During a "write" operation, the leading edge of the "data sync" indicates that information is available on write bus 54; and during a read operation, the fall edge of the "data sync" indicates the computer 5 has read information on the "read" bus 60.

Read bus 60, which sends information to computer 5 is comprised of seven lines, e.g., six bit lines and one for odd parity. Information is valid on read bus 60 from the leading edge of the signal on service request line 57 to the fall edge of the signal on the data sync line 56.

The write command, given by computer 5, resets all error latches and initiates the write cycle. It is controlled under program option for transfer through the I/O logic section 2, on lines 61 and branches 62 and 63 to set command response latch 64 and the I/O latch 64A for output mode. It is the controlling signal for telling the I/O logic section 2 that computer 5 document information is being sent over the write bus 54.

A read command normally given by computer 5, under program option or manually over line 67, initiates the read cycle via line 65. The read command may also be given by the I/O logic section 2 on line 65 at the end of a measure test cycle when the interface circuit 52 is in the fully automatic or high-speed mode.

The read command is the controlling signal for telling the I/O logic unit 2 that the analog section 3 document information is being sent over the read bus 60.

A type select signal given by computer 5 over line 66 initiates a read or write cycle for the keyboard unit 6. It is the controlling unit for telling the I/O logic unit 2 that information is to be directed to or from the keyboard unit. If the type select line 68 is not used before using a read or write command, the I/O interface circuit 52 directs information to or from the analog section 2.

Also included are lines 69 and 70 to accommodate an analog select signal for selection, under program control, of a particular one of a plurality of parallel analog sections 2 for connection to a common processing computer 5.

An analog off signal is also available over line 71 when initiated by computer 5 under program control to gate a multiplexing terminal 72 for all control lines communicating with the analog section 2 to enable computer 5 to utilize such control lines for other systems without physical disconnect.

An error feedback signal is also provided on line 73 which, when given by computer 5 under program option, may be employed to light a transmission error lamp on a suitable operator's panel (not shown). The error feedback signal can thus be employed to signal the operator when a parity or systems error has been detected by the supervisor subprogram, and it is not possible to transmit information to the keyboard unit 6.

A service request signal is employed, over line 57, to signal computer 5 when the I/O logic section 2 wants to transmit or receive a character or byte of information. In use, the service request signal is brought up by the I/O logic section 2 as a DC line which is reset by the data sync line 56.

A command response signal is used to signal computer 5 over line 75, in recognition of a signal on either of the two command lines 63 and 65. This signal indicates the ability of the I/O logic unit 2 to perform the command. The command response line 74 rises on the fall of a command signal, and is gated down by the I/O logic unit 2 either at the end of a write cycle, if the legal code has been detected, or normally at the end of a read cycle. When in the typewriter mode, the command response is brought down by the transmission of a group mark in either direction.

An attention signal on line 76 is also provided, and when used alone indicates to the computer 5 that the operator wants to enter information into program storage via the keyboard control unit 6. The attention signal may also be used with the command response line 76A. The attention line in conjunction with the command response line indicates a parity error was detected by the I/O logic unit 2 during the last write cycle.

A write disconnect signal indicates 77 the end of the message being sent or received by the I/O logic unit 2. During the write cycles the I/O logic unit 2 brings up this line 77 on the fall of the service response for the last character being transmitted. Within the I/O logic unit 2 the write disconnect signal inhibits the service request on line 57, triggers a sequential circuit which switches the interface circuit 52 from write to read mode, and interrogates on line 78 the analog section 3 for errors. If a transmission error has been detected, the proper combination of the attention line and command response line 62 is set. The flow chart shown in AA shows briefly how the computer 5 scans these lines. In general, the write disconnect signal remains on for sufficient time to terminate the computer write program routine and advances the program to the first instruction of the read program routine. During the read cycle, the I/O logic unit 2 brings up the write disconnect in a similar manner. Within the I/O logic unit 2 the write disconnect may also reset the command response line and rèturn the I/O logic unit 2 to an idle state awaiting a command signal. If transmission is between the computer 5 and the keyboard unit 6, the write disconnect signal is initiated by the translation of a group mark in either direction, and resets the I/O logic unit 2 to idle.

An operation end signal is provided which is generated within the I/O logic unit 2 as a DC level at the fall edge of the power-on reset line 79. An operation-in signal on line 80 indicates to computer 5 that the DC power of the analog section 3 is on and all logic systems 3 are operable.

Associated with the analog subsection 3 are 50 signal lines which form an integrated part of the timing and control block 24 and the GO/NO-GO unit logic 34. All signal lines originating in the I/O logic unit 2 are pulse operated and limited in pulse width value by requirements of the test system timing. All lines originating in the analog subassembly 3 logic are DC operated and are asynchronomously reset by the I/O logic unit 2.

Figure 9:
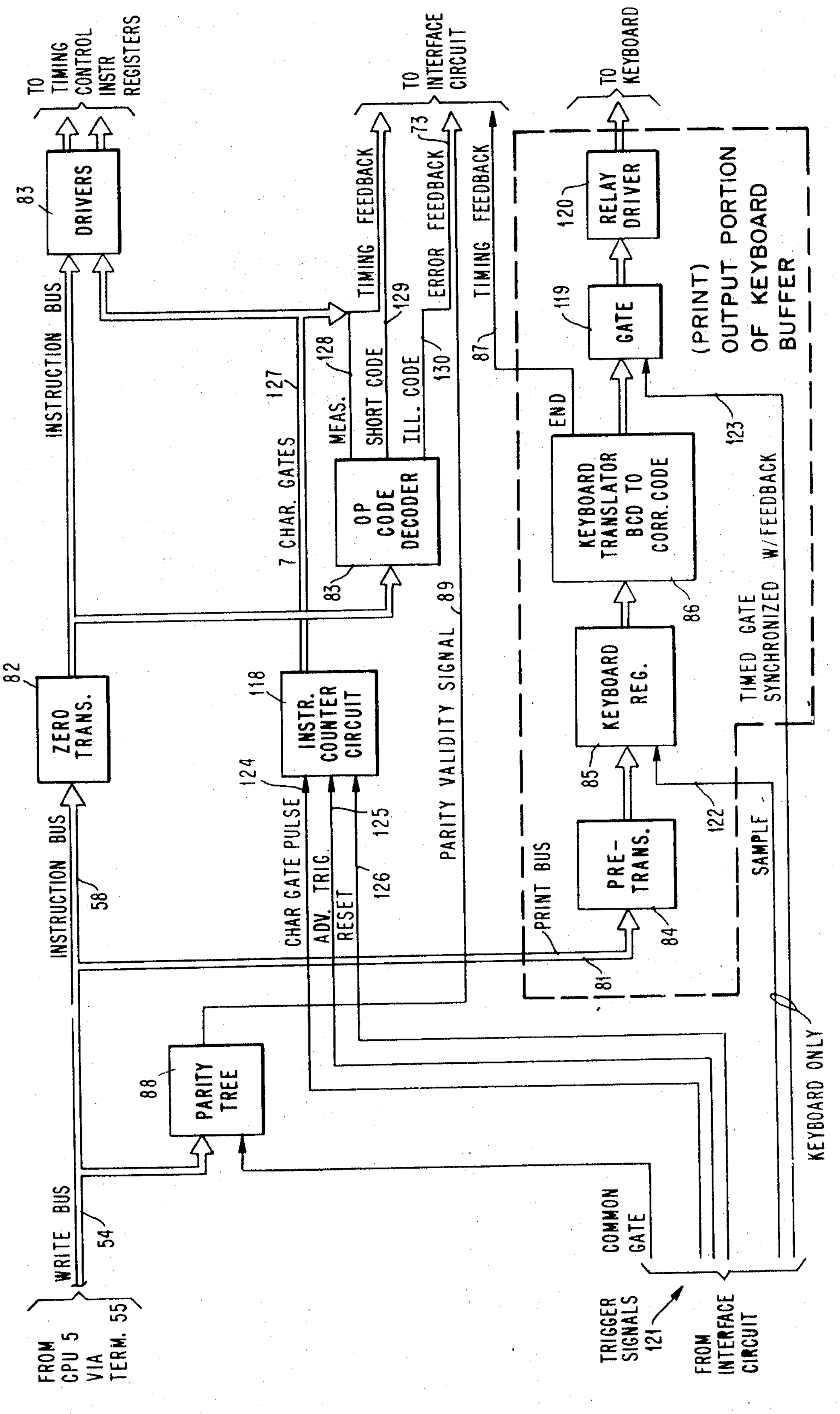
FIG. 9 illustrates and expands the organization of the output buffer circuit shown in FIG. 3.

Details of the output buffer 50 are shown in FIG. 9. The output buffer 50 forms the interface between the write bus 54, and the instruction and print busses 58 and 81, respectively. The output circuit 50 acts as a channel through which computer 5 document information passes en route to either the analog subassembly 3 or the keyboard control 6. In operation, the output buffer circuit 50 functions to perform the following data processing: (a) in-line translation, (b) in-line storage, (c) off-line decoding and (d) off-line parity checking. Seven lines in the write bus 54 enter the circuit as six bit lines and one line for odd parity. Fourteen lines exit the circuit with six lines forming the instruction bus 58 to the analog subassembly 3 logic and eight lines forming the keyboard control print bus 81. In-line translation of zero code from 8, $\overline{4}$, 2, $\overline{1}$ to $\overline{8, 4, 2, 1}$ is done parallel in time with off-line decoding of connect and measure, Op Codes, in zero translating block 82. The outputs of translator 82 are fed through the Op Code decoder section 83 for feeding back to the interface circuit 52 to form the gating for the generation of the write disconnect signal after the third character has been transmitted. In general, in the embodiment illustrated, the computer 5 transmits information parallel by bit and serially by character (BYTE). The analog subassembly 3 logic, however, transmits parallel, by bit and character. For this reason, the instruction bus buffering therefor includes storage resistors in the driver section 83 which holds the computer 5 characters until an analog subassembly 3 "word" totaling three or seven characters can be gated in parallel.

For print bus 81 buffering, in-line translation is first performed for the print bus in two stages. A first or pretranslator 84 operates only on the $\overline{8, 4, 2, 1}$ code selectively cued by the B–A zone bits as follows:

| Pretranslator Input | Pretranslator Output |
|---|---|
| B A 8 4 2 1 | B A 8 4 2 1 |
| 0 0 0 0 0 0 | 0 0 0 0 0 0 |
| 0 1 0 0 0 0 | 0 1 1 0 1 0 |
| 1 0 0 0 0 0 | 1 0 1 0 1 0 |
| 1 1 0 0 0 0 | 1 1 1 0 1 0 |

The pretranslator 84 operates on three codes as shown above, transforming them from normally uppercase keyboard characters to lowercase characters printable without shifting. The remainder of the legal codes printable are all lowercase. Thus the pretranslator eliminates shift operations entirely. In this regard, only the lowercase keyboard characters are permitted for transmission through the I/O logic unit 2 with four exceptions to wit: space, carriage return, dash (-) and Add (&). The following table lists all printable characters with the BCD code equivalents.

TABLE 8

| A B 8 4 2 1 | 1401 Designation | Keyboard Designation |
|---|---|---|
| 0 0 0 0 0 0 | NonBlank Storage Space | |
| 1 0 0 0 0 0 | | Carriage Return |
| 0 1 0 0 0 0 | – | – |
| 1 1 0 0 0 0 | & | & |
| 0 0 0 0 0 1 | 1 | 1 |
| 0 0 0 0 1 0 | 2 | 2 |
| 0 0 0 0 1 1 | 3 | 3 |
| 0 0 0 1 0 0 | 4 | 4 |
| 0 0 0 1 0 1 | 5 | 5 |
| 0 0 0 1 1 0 | 6 | 6 |
| 0 0 0 1 1 1 | 7 | 7 |
| 0 0 1 0 0 0 | 8 | 8 |
| 0 0 1 0 0 1 | 9 | 9 |
| 0 0 1 0 1 0 | 0 | 0 |
| 0 0 1 0 1 1 | # | # |
| 1 0 0 0 0 1 | 1 | 1 |
| 1 0 0 0 1 0 | S | S |
| 1 0 0 0 1 1 | T | T |
| 1 0 0 1 0 0 | U | U |
| 1 0 0 1 0 1 | V | V |
| 1 0 0 1 1 0 | W | W |
| 1 0 0 1 1 1 | X | X |
| 1 0 1 0 0 0 | Y | Y |
| 1 0 1 0 1 | Z | Z |
| 1 0 1 0 1 0 | Work Mark ( ≠ ) | Work Mark ( ≠ ) |
| 1 0 1 0 1 1 | ' | ' |
| 0 1 0 0 0 1 | J | J |
| 0 1 0 0 1 0 | K | K |
| 0 1 0 0 1 1 | L | L |
| 0 1 0 0 0 | M | M |
| 0 1 0 1 0 1 | N | N |
| 0 1 0 1 1 0 | O | O |
| 0 1 0 1 1 1 | P | P |
| 0 1 1 0 0 0 | Q | Q |
| 0 1 1 0 0 1 | R | R |
| 0 1 1 0 1 0 | Not Zero | – |
| 0 1 1 0 1 1 | $ | $ |
| 1 1 0 0 0 1 | A | A |
| 1 1 0 0 1 0 | B | B |
| 1 1 0 0 1 1 | C | C |
| 1 1 0 1 0 0 | D | D |
| 1 1 0 1 0 1 | E | E |
| 1 1 0 1 1 0 | F | F |
| 1 1 0 1 1 1 | G | G |
| 1 1 1 0 0 0 | H | H |
| 1 1 1 0 0 1 | I | I |
| 1 1 1 0 1 0 | Plus Zero | & |
| 1 1 1 0 1 1 | | . |
| 1 1 0 0 0 0 | Group Mark (‡) | None (end of message) |

The output of the pretranslator 84 is stored in a sampling-latch register 85 from where it enters a second-stage translator 86, developing the print bus signal lines. Three decoders operate, parallel in time, with the translator. Each decoder develops a single line, namely one per space character, one for a carriage return, and the last to signal the end of the message on line 87 to the interface circuit 52.

Information transmitted to both the instruction bus 58 and the print bus 81 are checked for odd parity by common off-line parity tree 88 whose output is fed back via line 89 to form part of the error feedback line 73 to the interface section 52 where gating is developed for generation of the command response signal and attention signal in the proper combination to indicate the validity of the parity check.

Figure 10:
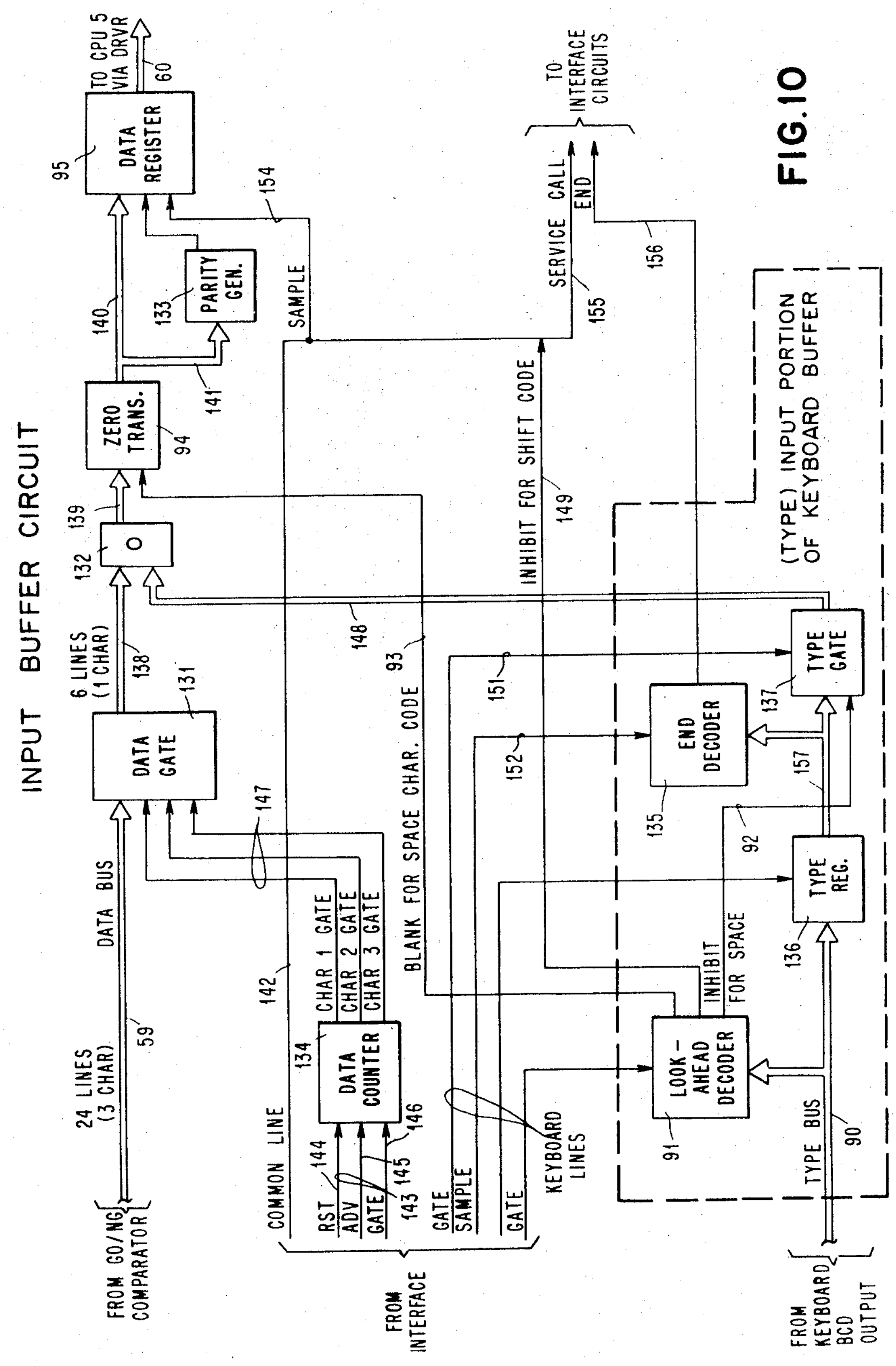
FIG. 10 illustrates and expands the organization of the input buffer circuit shown in FIG. 3.

The input buffer circuit 51 is shown in more detail in FIG. 10. The input buffer circuit 51 interfaces the data bus 59 and type bus 90 with the lead bus 60, and functions to pass data as follows: (a) in-line translation, (b) in-line storage, (c) off-line look-ahead decoding and (d) off-line parity generation. Thirty lines enter the input buffer circuit 51 with 24 bit lines originating from the GO/NO-GO comparator block 34 in the analog section 3 and six bit lines in the type bus 90 communicating with the keyboard control unit 6. Seven lines exit the input buffer circuit 51 as six bit lines and one for odd parity, forming the computer read bus 60. In the input buffer circuit 51, look-ahead decoding is performed in off-line decoder 91 on the keyboard-type bus 90. If a space character is decoded, the normal passage on information through the input buffer circuit 51 is interrupted via lines 92 and 93, and all zero bits are forced on the read bus 60 indicating to computer 5 that a word space is present.

In-line translation of the zero code from $\overline{8, 4, 2, 1}$ to 8, $\overline{4}$, 2, $\overline{1}$ is done, in translator 94 parallel in time with the off-line generation of an odd-parity bit. All seven bits for the read bus 60 are then stored in the main read register 95 until the fall of the data sync signal.

With reference to the interface circuit (FIG. 8), the operating mode discriminator 96 provides decoding and set the latches to discriminate the operating mode of the tester, which in conjunction with the timing feedback signals on line 97 provides and sets the signal times at which to take the next character.

The busy signal line 98 to the operating mode discriminator 96, indicates when the tester is executing an instruction. The presignal lines "end signal" 99, reset line 100, and end of transmission line 101, control and/or indicate end of serial transmission, reset the timing discriminator and interrogate the error discriminator. Discriminator 102 comprises a decoder with latches and timing signal shots which with its associated cam feedbacks, end of line 103, actuates the cam closures from the typewriter keys. Trigger signal line 104 loads the output buffer, and start line 105 signals receival of the full word. Trigger signal line 106 loads the input buffer, and the I/O data sample 107 loads the test results to the GO/NO-GO comparator. The DC enable line 108 powers the various relays of the tester, and the operator in-line 109 provides the necessary power-on indication for the computer.

Inhibit gate line 110 inhibits output from the analog section to the computer, and the inhibit-all which together with the branch inhibit-all line 111 inhibits all but the systems select 2 and 8 by line 112. The request reset line 113 resets the analog request line, and completion line 114 sets the error line to the computer. The request set line 115 requests the next character for operation, and the DC-gate 116 gates the set by line 111 and the line drivers are controlled on line 117.

In the output buffer circuit (FIG. 9) the instruction counter circuit 118 comprises a binary counter which together with gates 119 ("AND" circuits), relay driver 120, provide appropriate control to the keyboard control. Appropriate gating of words to the key word control or to the analog section is effected on signal line 121, which with its branch sample line 122 loads the keyboard control word under control of the end-time gate line 123 which gates the coded keyboard control word. The character gate pulse line 124 interrogates status of the instruction counter with appropriate advance of the counter on trigger line 125, and a comparable resetting of the counter by reset line 126. The gate line 127 loads the character memory and the timing and control module of the analog section. Also the measure signal on the measure line 128 sets the measure latches, and the short code line 129 sets the short code latch. In addition, identification of a legal code is effected along the illegal code line 130.

In the input buffer circuit, (FIG. 10), data gates 131 comprise AND circuits and the OR-circuits 132 comprise logical three-way OR circuits over an exclusive-OR 3 parity generator 133. Included within the input buffer circuit is a two-binary counter 134, and an end decoder 135 which decodes the end character from the keyboard control. Also included is a type register 136 which holds the information to be typed, and in type gate 137 comprises AND circuits which in conjunction with the six-bit data bus portions 138, 139, 140, and 141, the common line 142 and the analog section lines 143 load the read bus register and sets the service request latch, via lines 154 and 155. Reset line 144 is a pulse containing three lines which resets the data counter, and the advance line 145 accommodates the signal for advancing the data counter. The gate line 146 interrogates the counter status and the character 1 through 3 gates, gate the counter output where the character code line 148 forces a blank on the right bus if a space was typed. Also the inhibit shift code line 149 prevents transmission of a shift code. Also, gate line 151 gates the typed character into the zero translator, and a sample line 152 interrogates the status of the end decoder. In addition, end line 156 provides a trigger end signal to the six-character type bus portion 157.

In operation, a start signal is given by the I/O logic unit 2 in the form of a pulse which starts the test logic clock 84A after the fall of the data sync line for the last instruction character. The start line indicates to the timing logic that the instruction registers have been filled. A not-busy signal is normally given by the timing logic 86A as a DC level indicating that the analog section 3 clock is stopped. When a not-busy signal on line 98 is down, the service request line is inhibited. Control for the instruction character gates in logic block 24 (FIG. 1), is made by the I/O logic unit 2 as a suitable pulse to fill the timing unit instruction registers (timing, control and instruction registers logic block 24). To this purpose, seven gates are developed sequentially, one for each instruction character. The instruction bus 58 is used for sending instruction information to the instruction registers in the timing-control-instruction buffers module 24. The instruction bus consists of six bit lines, each fanned down to the seven instruction character registers in the indicated buffer block 24. Generally, for the embodiment shown, information is relayed on the instruction bus 58 from the rise edge of the start pulse until the rise edge of the not-busy signal on line 98. The data bus 59 is used for sending information (test data) to the I/O logic control unit 2 from the GO/NO-GO comparator 34 in the analog section 3. The data bus consists of 24 bit lines fanned into the I/O logic unit 2 input register 90A for computer 5. Information is now on the data bus 59 from the fall of the not-busy signal on line 98 to the rise edge of the I/O data sample signal on line 107.

The I/O data sample signal is brought up on the rise edge of the not-busy signal on line 98 following a measure instruction on line 128. The print bus 81 is used to send information to the keyboard control 6 and is comprised of seven lines, e.g., six bit lines and one for odd parity. The parity bit is used only when all other lines are down during transmission to constitute a trigger for the print cam in the absence of other valid signals. Information is valid on a print bus with the rise edge of the data sync signal until the print cam releases the character pickup magnet. Type bus 90 is used for sending typed information to the I/O logic control unit 2, and comprises six bit lines. Information is valid on the type bus from the rise edge of a service request on line 57 to the fall edge of the data sync signal on line 56. A character feedback signal on line 103 is generated by the keyboard print cam one line gate as it pauses after a printable character has been identified by the keyboard correspondence decoder 21. An operational feed back signal is generated on and fed to type register 136 by the keyboard print cam as a pulse subsequent to identification of an operational character (e.g., space, shift, etc.) by the keyboard correspondence decoder 91. A keyboard-unlock feedback signal is also generated by the keyboard lock relay contacts on line 103 as a DC level when a lock magnet of the keyboard is released. A carriage return interlock signal is generated by the keyboard character return relay contacts transmitted on line 103 as a DC level while the carriage is in motion. An end-of-line signal is generated on line 103 by the keyboard end of line microswitch contacts as a pulse when the carriage reached a preset end tap. The end-of-line signal is used to initiate an automatic carriage return in the I/O logic control unit 2.

All optional operating modes are controlled from a remote control unit 150 and are initiated by the operator with three select switches. The automatic mode is a normal operating mode for the I/O logic control unit without manual intervention required. All information transmission is initiated from the computer program and response lines brought up automatically with the interface circuit 52.

The semiautomatic mode is used when the operator wants a readout of failure test data for immediate reference. This mode may be initiated by the operator at any time by momentarily depressing the fail stop select switch 151. The release of the fail stop switch 151 enables a fail data decoder 152 and lights the fail stop switch. When the fail data decoder detects a failure being transmitted from the GO/NO-GO comparator 34 in the analog section 3, a pulse is developed setting a fail stop latch 153. The fail stop latch set inhibits the I/O unit's service request signal (on line 57) for the four data characters and lights the restart switch on the control unit 150. The last four characters are at this time locked in the data register 154. Restart of the system may be effected by momentarily depressing restart switch. Depression of the restart switch 155 generates a service request signal on line 57, for the fourth data character and the system continues automatically until the next failure bit is decoded.

To return to automatic operation, the operator may momentarily depress the fail stop switch 151. Release of the fail stop switch 151 will disable the fail data decoder 156 to turn out the light on the fail stop switch 151.

The manual mode is used when the operator wants to single-step the data through the I/O logic control unit 2 one instruction at a time, without using any external control switch. This mode may be initiated at any time by momentary depression of the single-step select switch 156. The release of the single-step switch inhibits the automatic generation of the service request signal on line 57 and lights a lamp in the single-step switch. Service request signal is, at this time, under control of the advance switch 157 which may be gated on by the analog section 3 timing/control block 24 via line 98, and inverted signal level on the service response line 157. The advance lamp-on indicates to the operator that both system clocks are stopped and a service request signal is required to advance the next information character. One service request in generated for each operation of the advance switch until an end signal is brought up in the I/O logic control unit 2. In this manner, the computer 5 program is allowed to advance automatically until the next information character is passed through the I/O logic control unit 2. Thus a service request generated on the last character of a measure instruction would result in the transmission of that character plus the transmission of the first data character. This procedure makes possible manual control of transmission without interrupting the indicated supervisor program. The advance lamp is gated off while information is moving through the I/O logic control unit 2, and during the transition switching between read and write modes.

To return to automatic operation, the operator momentarily depresses the single-step switch 156, with release of the single-step switch enabling the automatic generation of the service request signal on line 57 while turning off the light in the single-step switch. If the I/O logic control unit 2 is returned to automatic mode during data movement, the generation of the next service request signal is automatic. If the I/O logic control unit 2 is returned to automatic mode, both system clocks are stopped as it will be necessary to momentarily depress the restart switch to generate the first service request.

Figure 11:
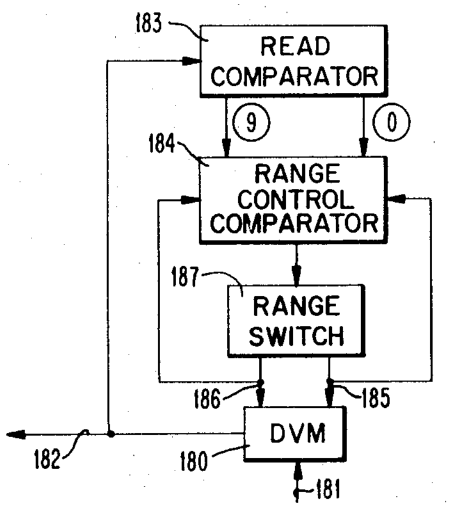
FIG. 11 is a system's block diagram of an autoranging system for controlling the scale of a digital voltmeter.

Comprehended within the use of the analog subassembly 3 is the use of an autoranger for automatic control of the scaling of a digital voltmeter. The general concept and the specific modifications thereof are shown in FIGS. 22 to 24. As shown in FIG. 11, the autoranger comprises a digital voltmeter 180 having an analog input 181 and a BCD output 182 which is sensed in a first read comparator 183. Read comparator 183 determines the presence of all nines in the output digits of the digital voltmeter, and also for the presence of a zero in the most significant digit in the output of a digital voltmeter. The result is further compared in a second range control comparator 184, with the status of the meter-scaling lines 185 and 186 which determine the active scale of digital voltmeter 180. This second comparison provides a select signal to the range switch 187 which will, as required, maintain the active scaling of the digital voltmeter, up-range the scaling or down-range the scaling as required. In the general concept, a determination of all nines in the binary-coded decimal output of the digital voltmeter 180 will up-range the digital voltmeter 180 if not already in its highest range and the presence of a zero in the most significant digit of the output of the digital voltmeter will down-range the digital voltmeter 180 if not already in its most sensitive range.

Figure 12:
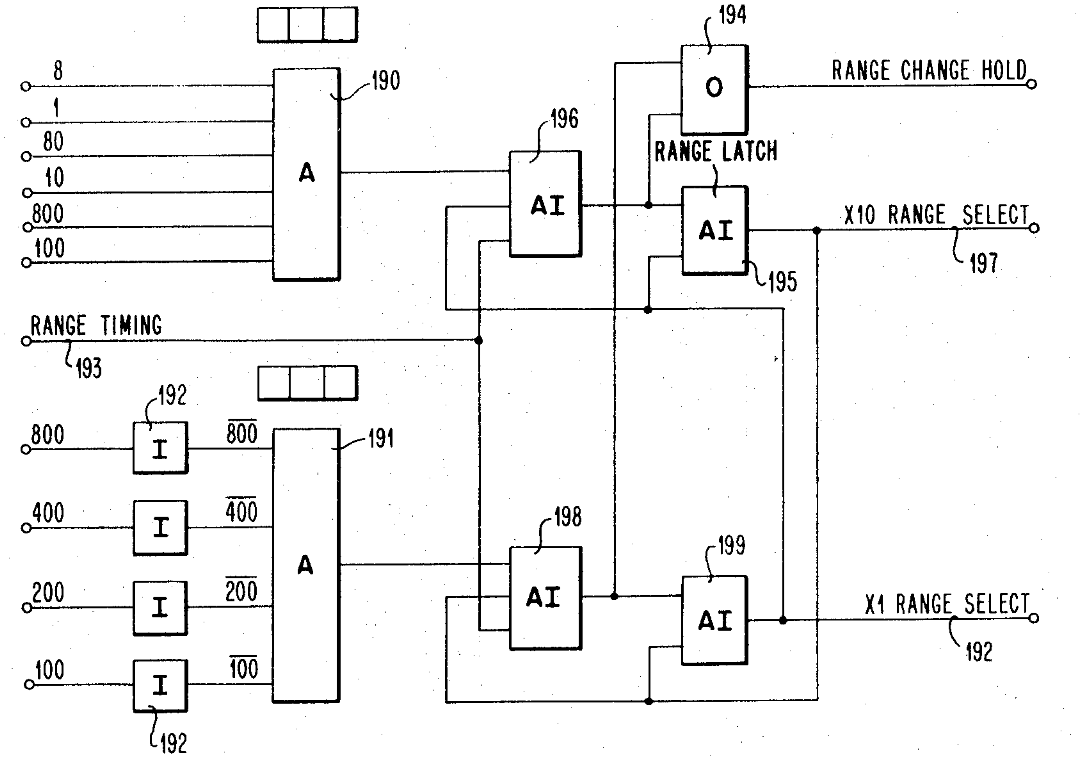
FIGS. 12–14H detail the logic organization and operation of the autoranger system of FIG. 22.

Details of the logic employed in the autoranger are shown in FIG. 12 which is adapted for response and control of a digital voltmeter BCD output having units, tens and hundreds digits with a dual 10× scale and I× scale. The specific auto-ranging logic shown includes an up-range AND logic circuit 190 having inputs connected to the one and eight bits of the units, tens, and hundreds digits in the BCD output of the digital voltmeter 180. Also included is a down-range AND-logic 191 which is connected through invertors 192 to the 1, 2, 4, 8 bits of the most significant digit in the BCD output of the digital voltmeter. In substance, the down-range AND-logic 191 senses the complements of the 100, 200, 400 and 800 bits. The output of the up-range AND circuit 190 is compared with the current status of a −×1 range select line 192 during a range timing signal on line 193 in the AND-INVERT (AI) circuit 196 to provide an output to an OR-circuit 194 and to a range latch comprised of an AND-INVERT circuit 195 and 199. This output is compared in the range latch 195 with the current condition of the −×1 select line 192 to provide an up-range signal, if required, on the −×10 range select line 197.

Conversely, the output of the down-range circuit 191 is compared in the down-range AND-INVERT circuit 198 with the current status of the −×10 range select line 197 during a range-timing signal on line 193 to provide a resultant output to a down-range latch comprised on an AND-INVERT circuit 199 and 195 where it is compared with the current status of the −×10 range select line 197, with a down-range output signal, if called for, provided on the −×1 range select line 192. Concurrently, the output from the AND-INVERT circuit 198 is also connected to the OR-circuit 194. As will be apparent, any input to the OR-circuit 194 will produce an output signal indicating that a current comparison of the digital voltmeter output requires a change in the scaling thereof, with appropriate arresting of the sequence of the testing cycle until appropriate ranging of the digital voltmeter scale is made.

Figure 12A:
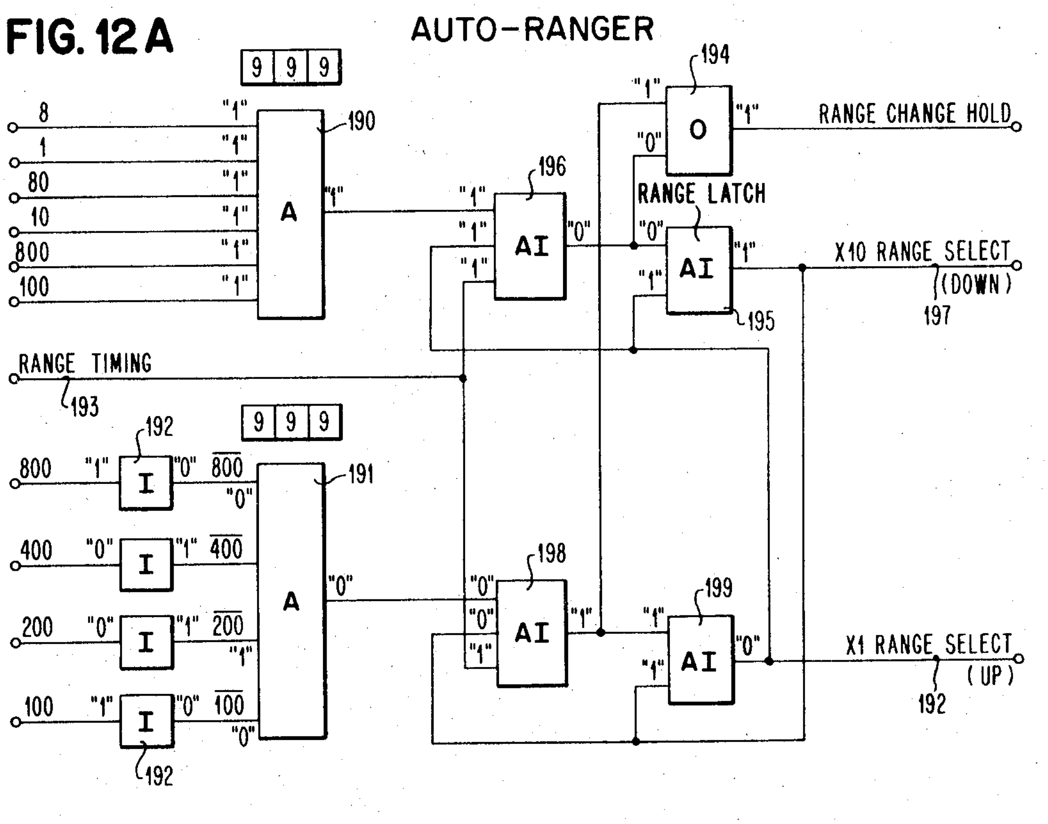
Figure 12B:
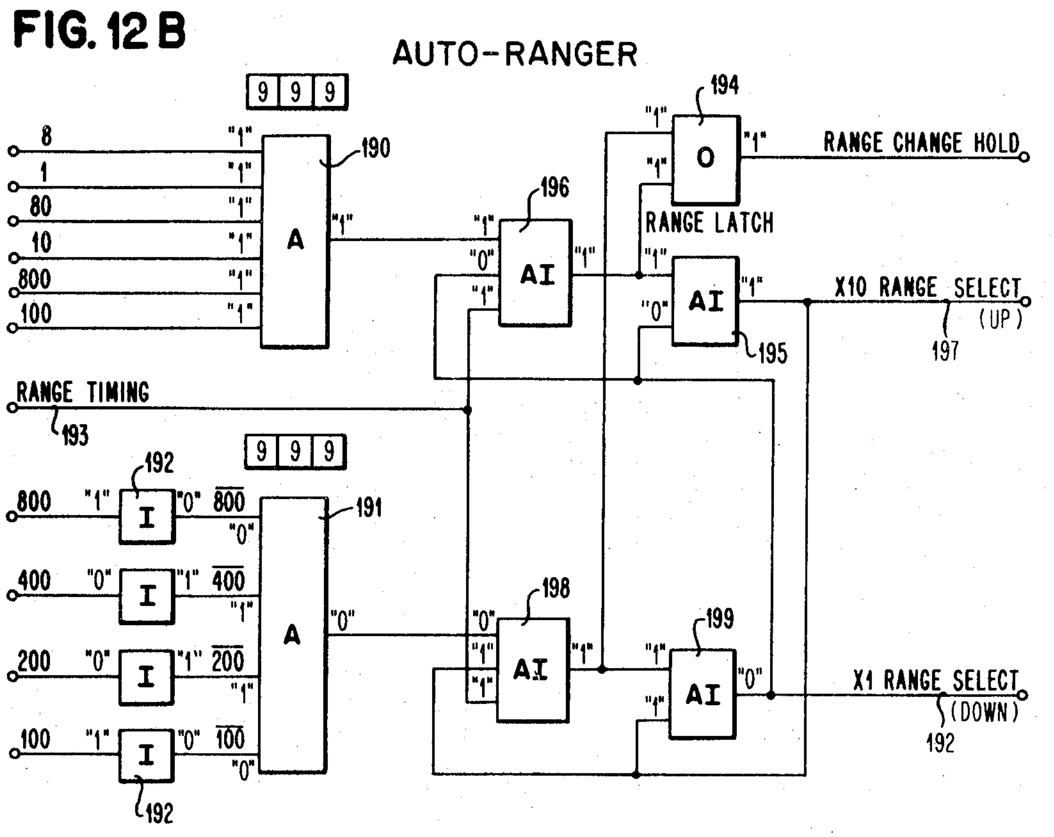

The operation of this embodiment of the autoranger is illustrated in FIGS. 12A to 12F. Referring to FIG. 12A and FIG. 12B, the operation of the autoranger is shown for a digital voltmeter output reading 999 (three significant digits). In FIG. 12A the −×1 range line is shown up for this 999 reading, with the −×10 range select line down. For this 999 reading each of the 1 and 8 bits in the units, tens and hundreds digits will be up in their input to the up-range AND-circuit 190 to provide a "1" output to the up-range AND-INVERT circuit 196. With the −×1 range line up a second input to the AND-INVERT circuit 196 is also up which together with the timing signal on line 193 will provide a down or "0" output from the AND-INVERT circuit to the range latch 195 which together with the down condition of the up or "1" condition of the −×1 range select line results in an up or "1" signal to activate the −×10 range select line. Similarly for a 999 reading, the 1 and 8 bits of the hundreds digit will be up, and the 2 and 4 bits thereof down. This provides, through the invert circuit 192, up signals for the 2 and 4 complements to the down-ranged AND-circuit 199, in conjunction with down or "0" signals for the 1 and 8 complements of these hundreds digits. This input to the down-range AND-circuit 199 results in a zero output which together with the down or "0" condition of the −×10 range select line is inputted to the AI circuit 198 to provide during a timing signal, a "1" or up output from the AI circuit 198. This "1" output is inputted together with the down or "0" condition of the −×10 range select line to the range latch 199 to provide a tentative up or "1" signal, for a tentative and apparent activation of the −×1 range select line in conflict with the activation of the −×10 range select line. However, this condition is referenced to the prior condition of the −× 10 range select line, which after the autoranging processes, provides a "1" or up signal to the down-range latch 199 for correction thereof into a down or "0" signal for deactivating the previously up −×1 range select line. As will be noted, this autoranging switched the range select lines from a previous −×1 range select up to the present −×10 range select up.

As will be noted, during this autoranging, the prior condition of the ×1 range select line up and ×10 range select line down was switched to an active condition of the ×10 range select line up and the ×1 range select line down. Further, concurrently with the autoranging; a "1" or up signal from the down range AI circuit 198 was inputted to the OR-circuit 194 to provide an up-output indicating that a range change determining is being made so as to arrest the test signal to enable the completion of the indicated autoranging.

FIG. 12B illustrates the function of the autoranger for the same digital voltmeter reading of 999 with the −×1 range select line down and the ×10 range select line up. With these current select line conditions, the inputs to the up-range AI circuit 196 are changed to "1," "0," and "1" levels to provide a "1" output from the AI circuit as an up or "1" input the up-range latch 195. This up input together with the current down or "0" condition of ×1 range select line provides an up or "1" output from the range latch 195 indicating the activation of the ×10 range select line for this comparison and no change therefor. Conversely, the inputs to the down-range AI circuit 198 is changed to "0," "1" and "1" resulting in an up or "1" output to the down-range latch 199 which when inputted together with the up condition of the X10 range select line results in a down or "0" output showing that the ×1 range select line should remain deactivated. Again as previously, during the autoranging up signals are inputted from the up-range and down-range AI circuits respectively, 196 and 198, to the OR-circuit 194 again arresting the test sequence during autoranging.

Figure 12C:
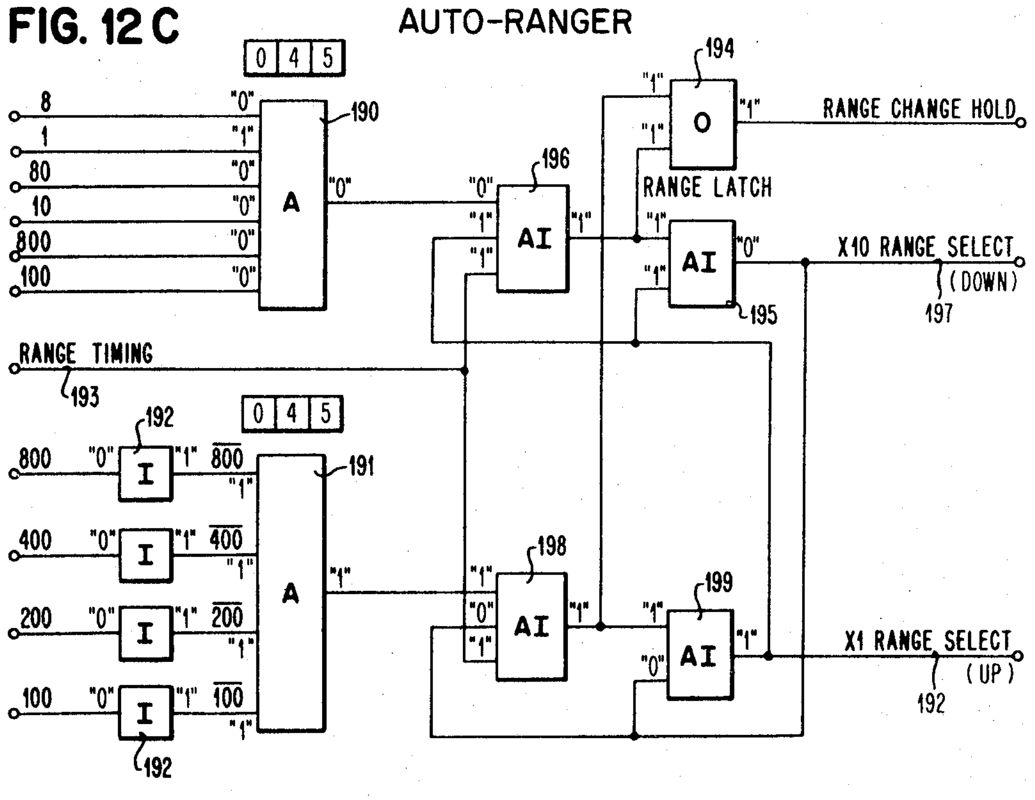

FIG. 12C illustrates the logic function during autoranging for a digital voltmeter BCD output of 045, e.g., containing a zero in the hundreds digit thereof and having the ×10 range select line and ×1 range select line configured, respectively down and up. For this reading only the one bit in the units digit will be up in the inputs to the up-range AND-circuit 190 to provide a zero output therefrom to the up-range AI circuit 196.

This condition of the inputs to the up-range AND-circuit 190 provides a zero output which when inputted to the up-range AI circuit 196 together with the up condition of the −×1 range select line and the range timing signal provides an up or "1" output to the up-range latch 195 where it is ANDed with the up condition of the ×1 range select line to provide a "0" or down output for the ×10 range select line.

Conversely, the "0" or down conditions of the 1, 2, 4, 8 bits in the most significant digit of the digital voltmeter are inverted to provide the complements of the bits to the down-range AND-circuit 191 which provides an up condition as an input to the down-range AI circuit 198 in conjunction with the zero or down condition of ×10 range line, provides during the range timing signal a "1" or up output which is inputted with the down condition of the ×10 range select line to the down-range latch 199 resulting in a "1" or up output to maintain the current up condition of the X1 range select line.

Figure 12D:
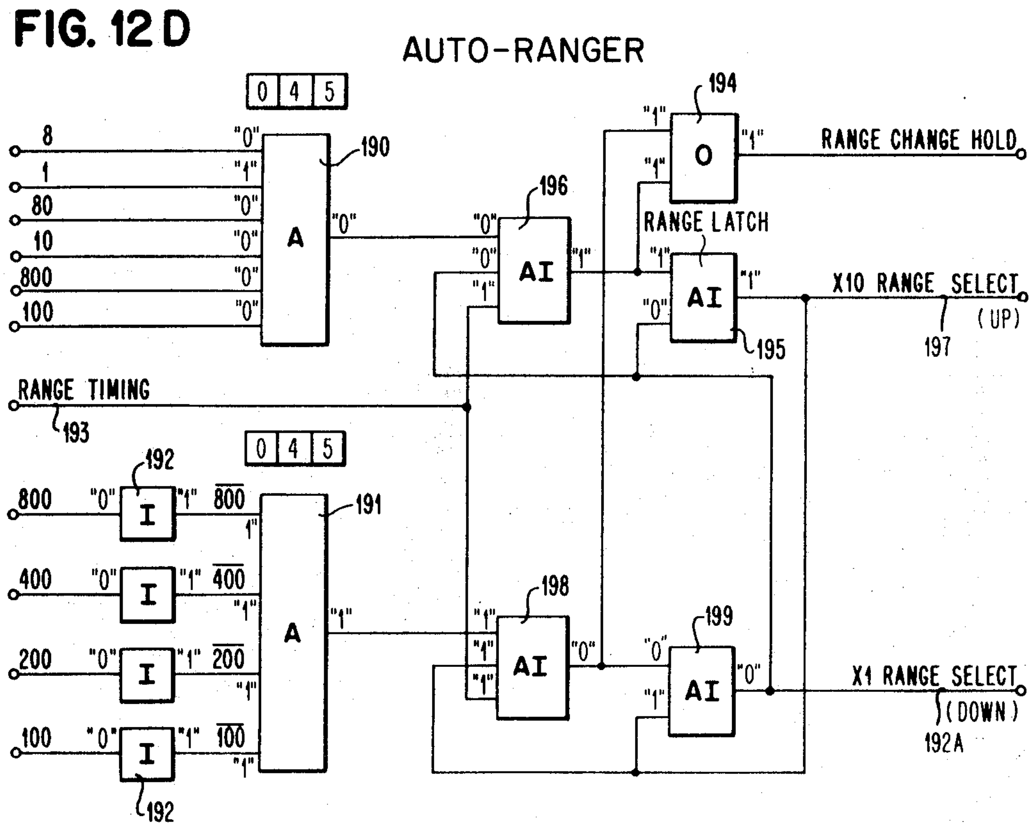

FIG. 12D shows autoranging for a digital voltmeter reading of 045 with the the 10 × range select line up and the 1×range select line down. The functioning of the autoranging circuit is similar to the foregoing examples. Variation in this autoranging is tested in that the down-range condition of the 1× range select line is initially inputted to the up-range latch to provide a tentative "1" or up output for an apparent up-ranging in condition of the ×10 range select line but which, however, is reinputted to the down-range latch 199, whose "1" or up output is applied to the up-range latch 195 to correct its output to a zero and to down-range the ×10 range select line. As will be evident, the original times range for the scale of the digital voltmeter (e.g., ×10 scale) is now down-ranged to the ×1 scale.

Figure 12E:
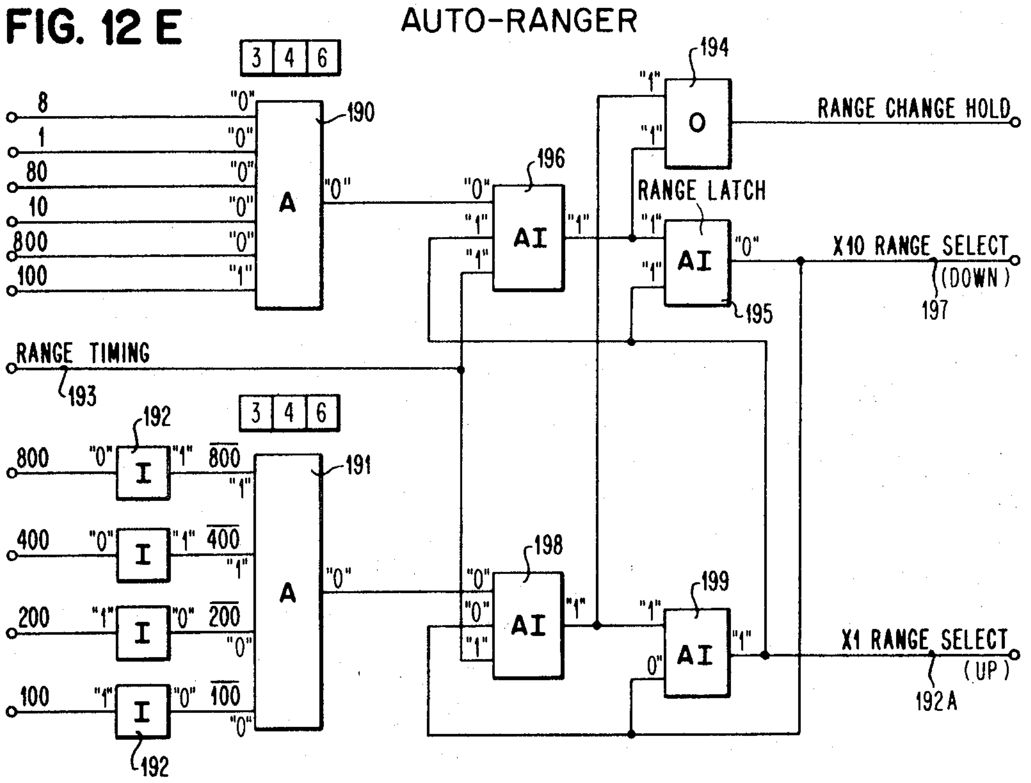
Figure 12F:
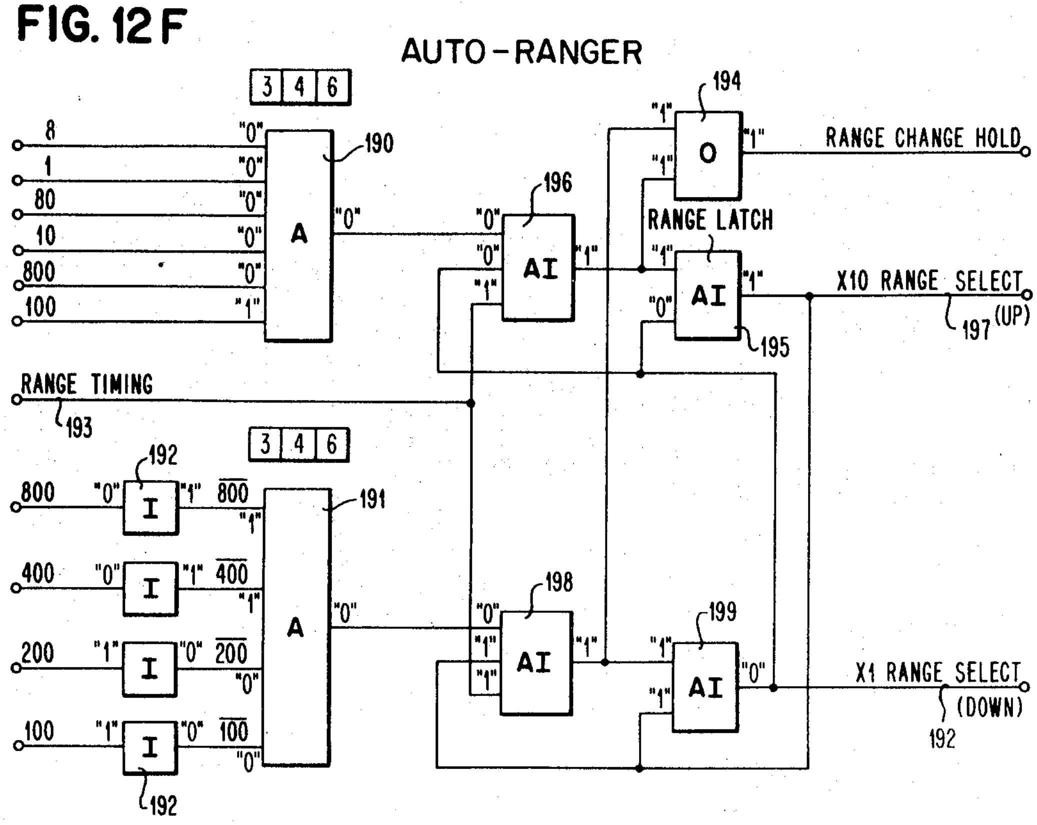

FIGS. 12E and 12F show, respectively, the autoranging for a digital voltmeter reading of 346 with the digital voltmeter being scaled, respectively, with the ×1 range select line up and the ×10 range select line up. As will be evident, the current scale for the digital voltmeter is maintained in each example.

Figure 13:
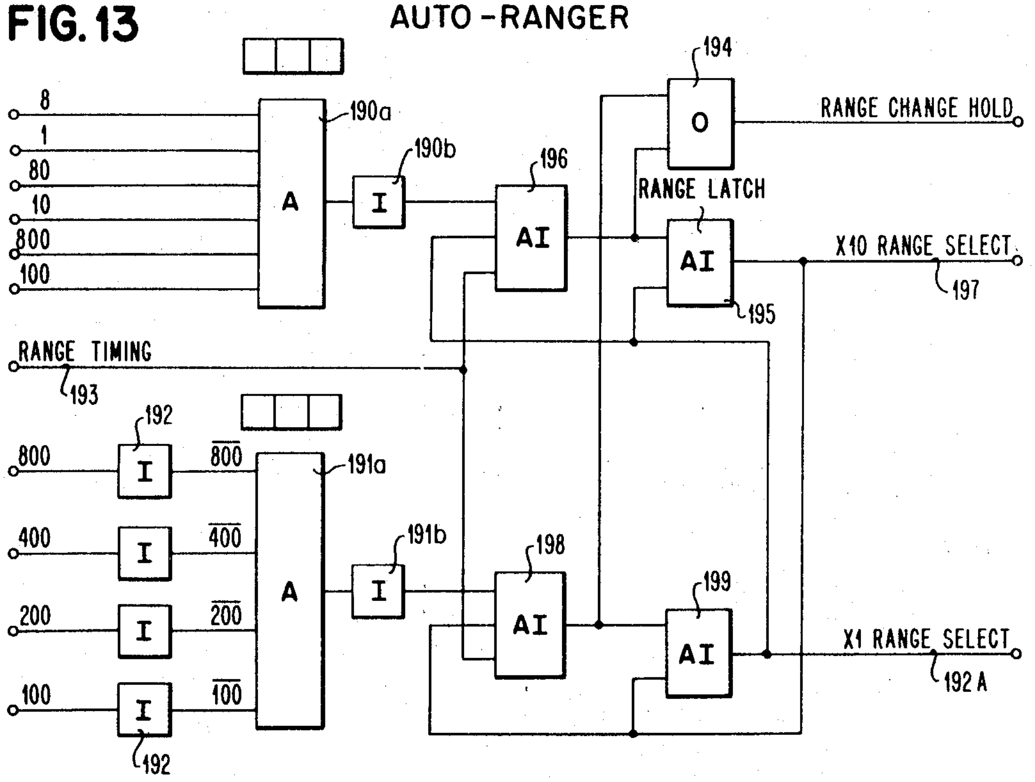

FIG. 13 shows a modification of the autoranging circuit in which the up-range circuit 190 can be expanded into an AI circuit 190A and an INVERT circuit 190B. Similarly the down-range AND-circuit 191 is likewise expanded to AND-circuit 191A and an INVERT circuit 191B. As will be readily seen, the combination of the AND-INVERT circuits function identically to the AND circuits of the preceding examples.

Figure 14:
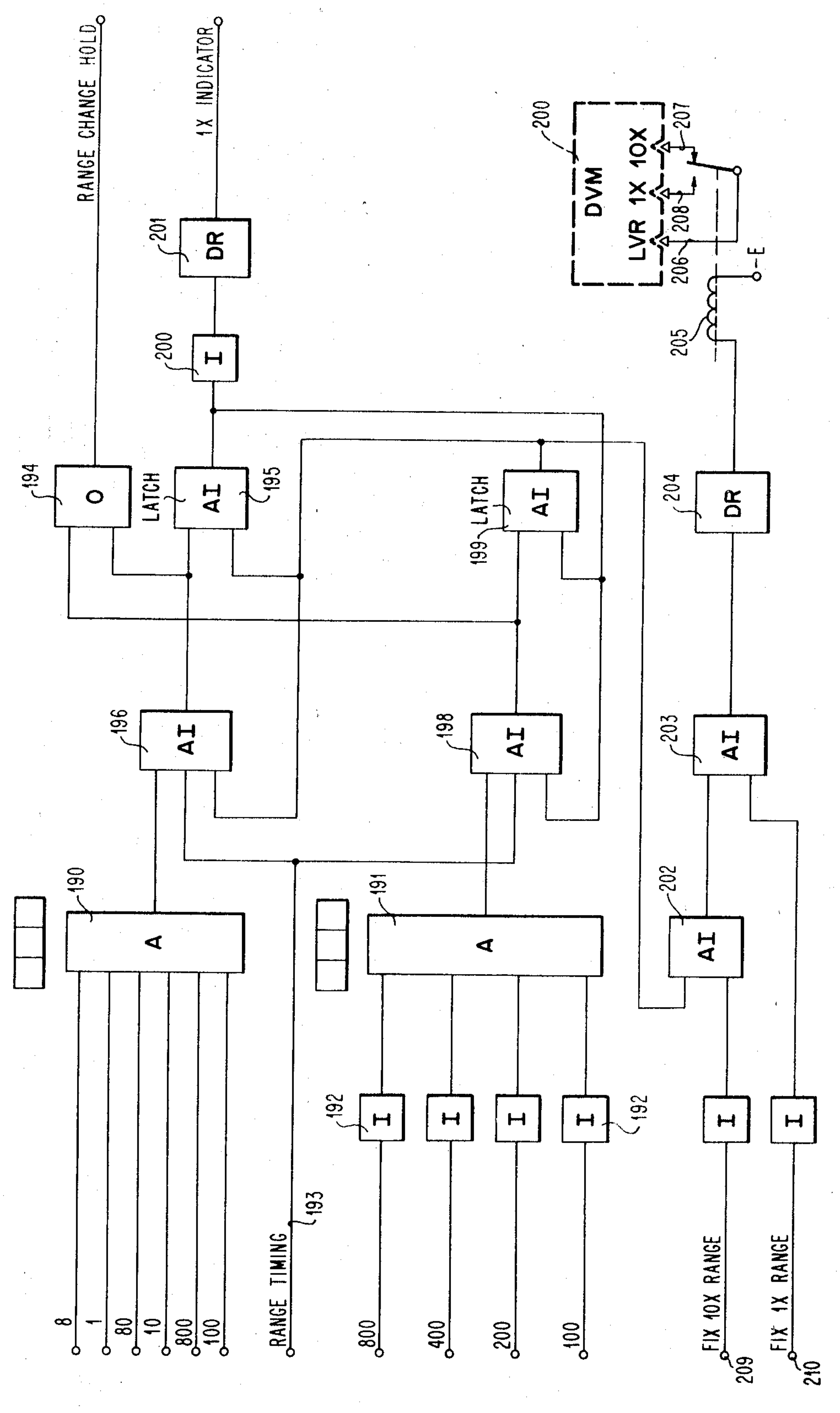

FIG. 14 illustrates the incorporation in the autoranging circuit of an override control system in conjunction with the modification of the autoranging circuit which permits the utilization of a single signal for scaling of the digital voltmeter 200. In this modification, the output of the up-range latch 195 is inputted to the INVERT circuit 200 for activating a driver 201 controlling a 1×indicator which may comprise a visual lamp on the operator's panel. For the override control of this autoranging circuit, only the output of the down-range latch is employed to the override autoranging control section which is under control of override signals on the FIX—1× and FIX—10× lines. The output of the down-range latch 199 is inputted to an override AND-INVERT circuit 202 of a signal, as from a manual switch on the operator's panel signifying that the 10× range select line of the digital voltmeter is to be activated and held.

The output of this AI hold circuit 202 is inputted to a second AND-Invert hold circuit 203 together with the complement of the presence or absence of a signal signifying that the 1× scale of the digital voltmeter is to be activated and held regardless of the decision of the autoranging. The output of this second AI hold circuit 203 is inputted through a driver 204 for actuation of a relay 205 to switch a low-voltage return line 206 from its normally closed contact with the 10× scale input 207, into closure with the 1× scale input 208 of the digital voltmeter 200.

Figure 14A:
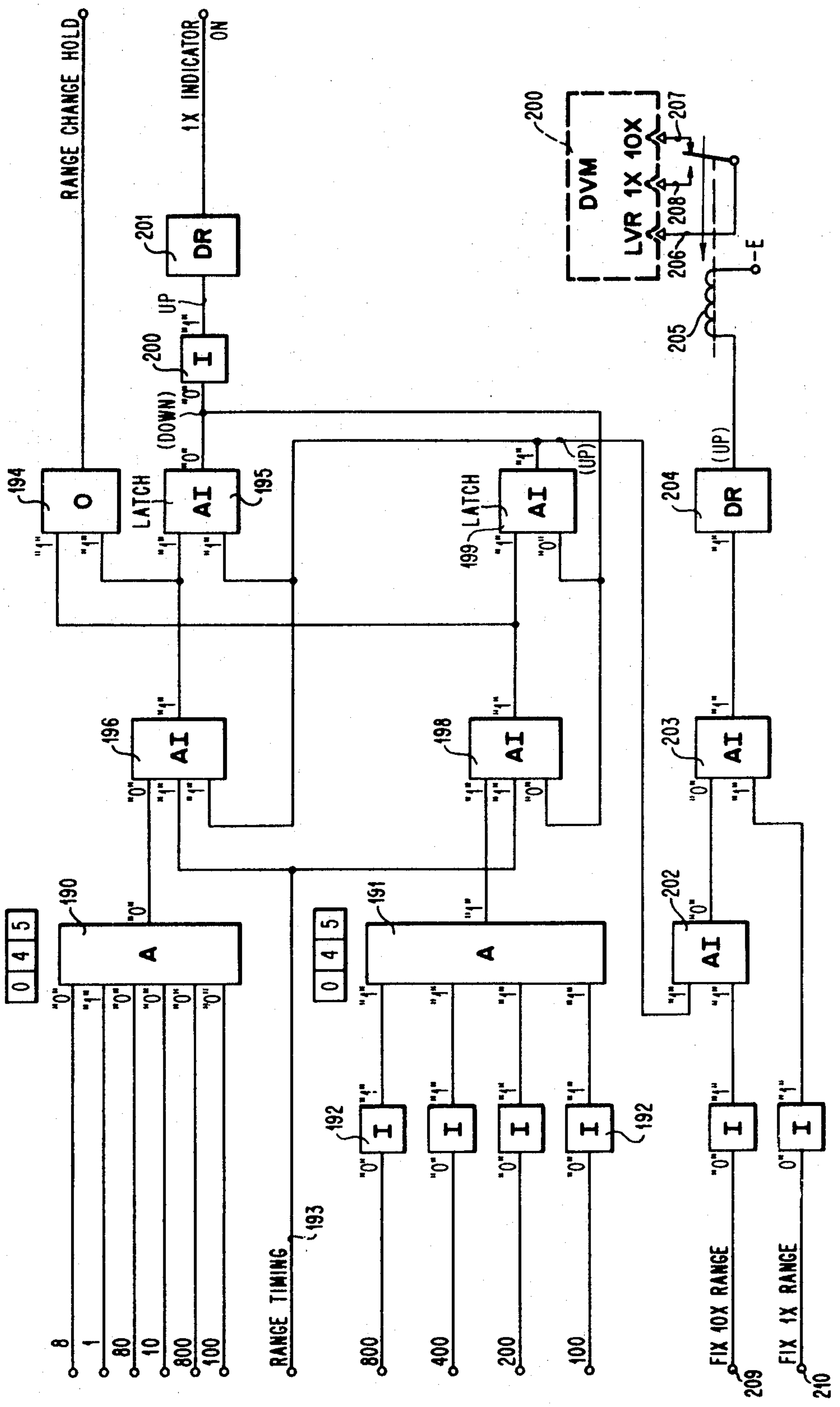

FIG. 14A illustrates the autoranging circuit for a digital voltmeter reading of 045 with the 10× range line down and the 1× range line up in the absence of any override signals on the fix-range inputs 209 and 210. The current condition of the lines is indicated in parenthesis. Upon processing of a digital voltmeter reading (of 045) the 1× range line at the output of the down-range latch 199 remains up and is inputted as one together with the complement of the "0" (indicating the absence of a FIX—10× range signal) to the AI hold circuit 202 to provide a "0" or up output which is inputted to the second AI hold circuit 203 together with the complement of a "0" signal (indicating the absence of a FIX—1× range) to provide a "1" or up output to the driver 204 which leaves relay 205 in the picked condition.

Figure 14B:
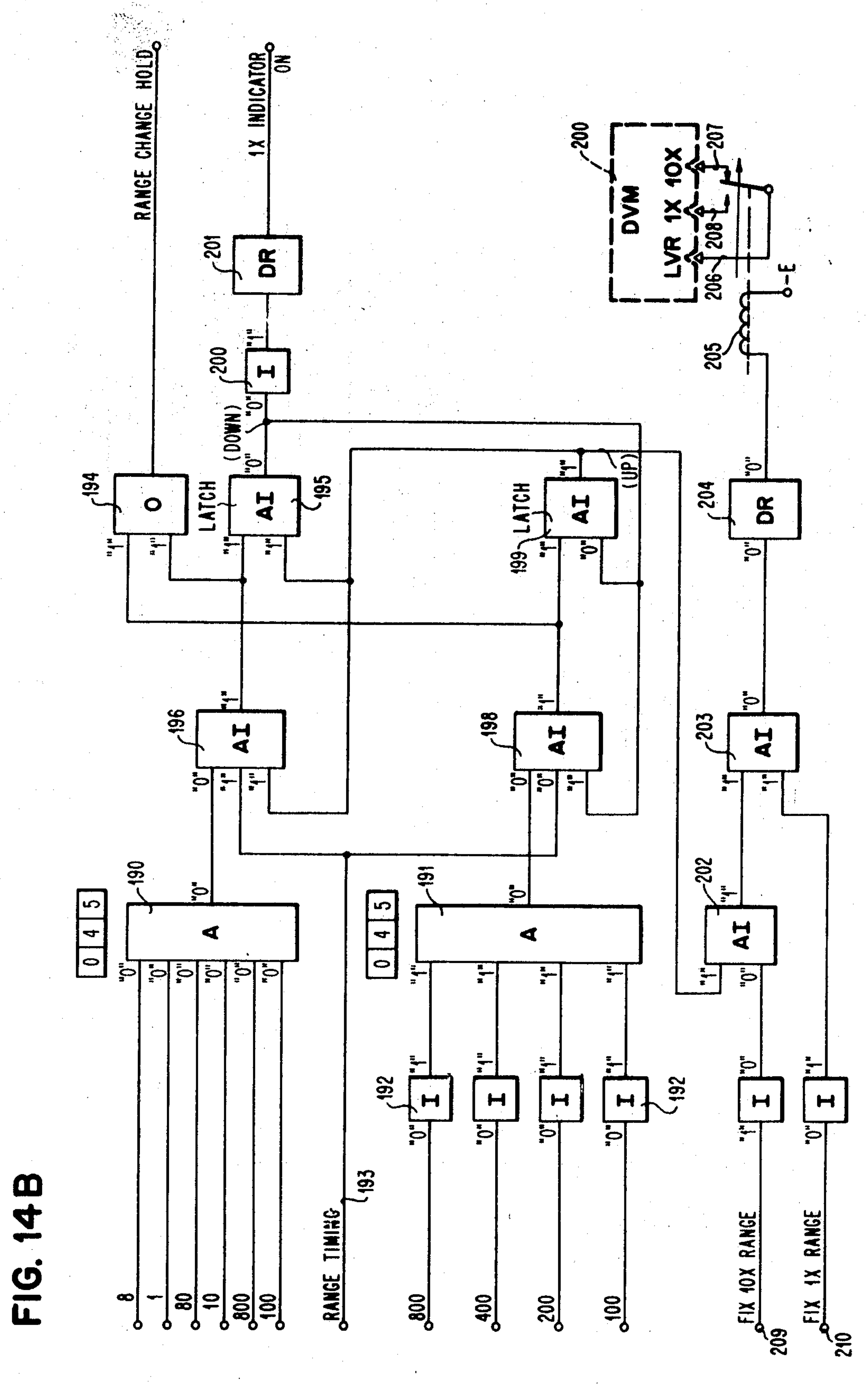

A similar illustration for a digital voltmeter reading of 045 is shown in FIG. 14B where the current condition of the 1× to 10× range select lines is identical to the preceding example. However, in this example, a fixed 10× range signal for digital voltmeter 200 is applied at the input 209. Thus, an up-fixed 10× signal at input 209 is inverted as a "0" input to the override AI circuit 202 which in conjunction with an up signal of the 1× select line provides a "1" or up output to the second override AI circuit 203 which this time provides a "0" output to driver 204 to release relay 205 and connect lines 207 to 206 and fix the ×10 range.

Figure 14C:
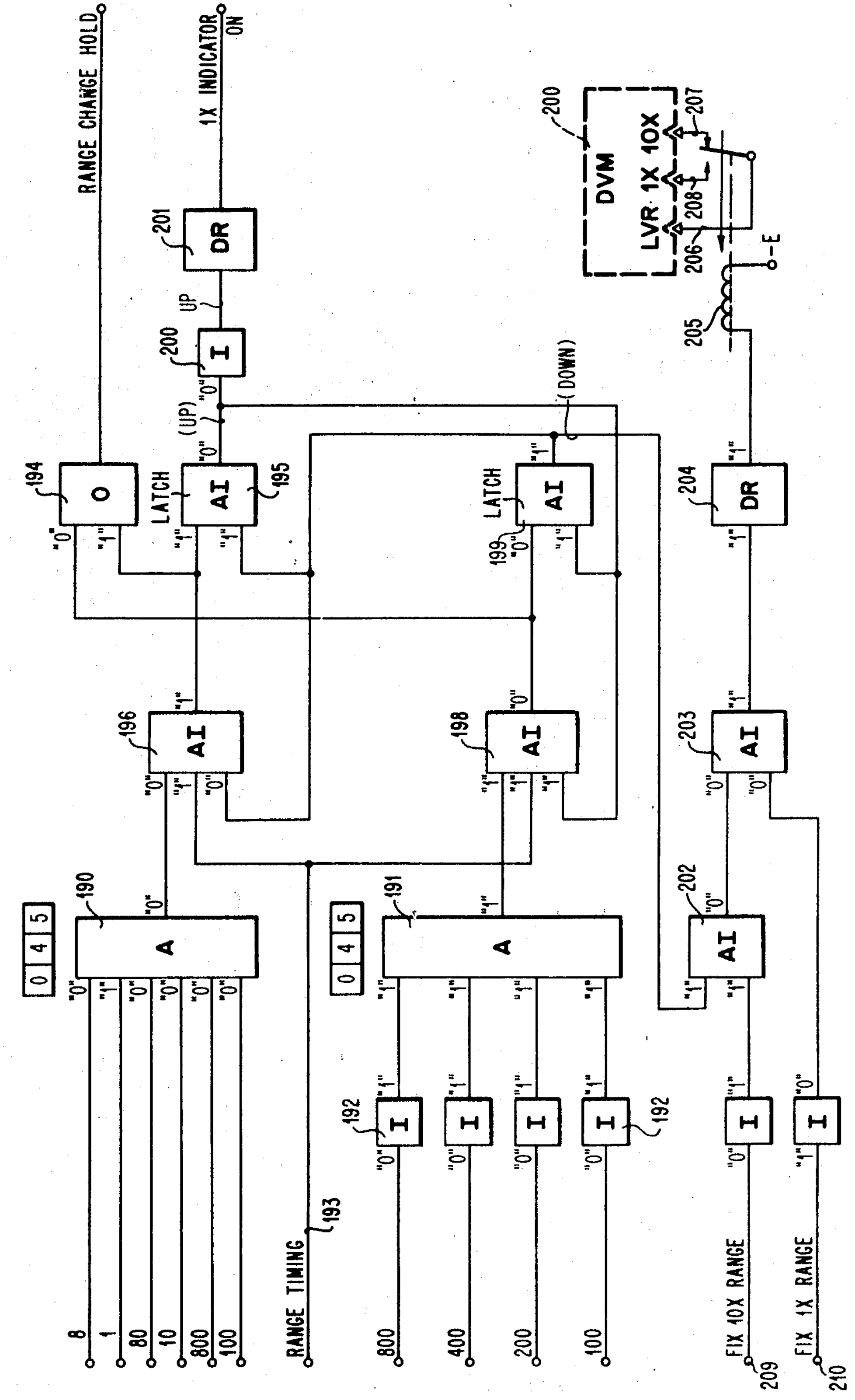
Figure 14D:
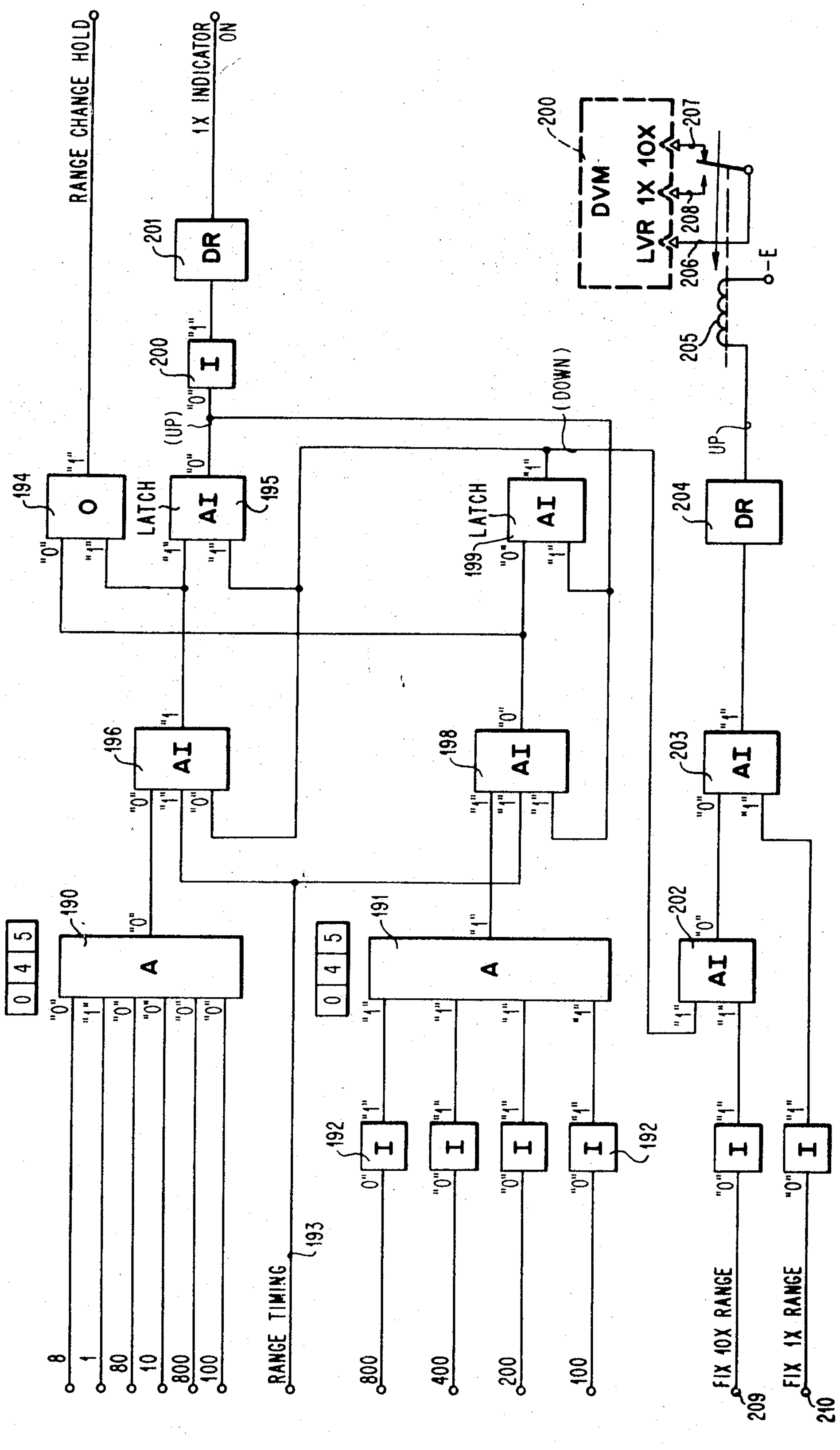
Figure 14E:
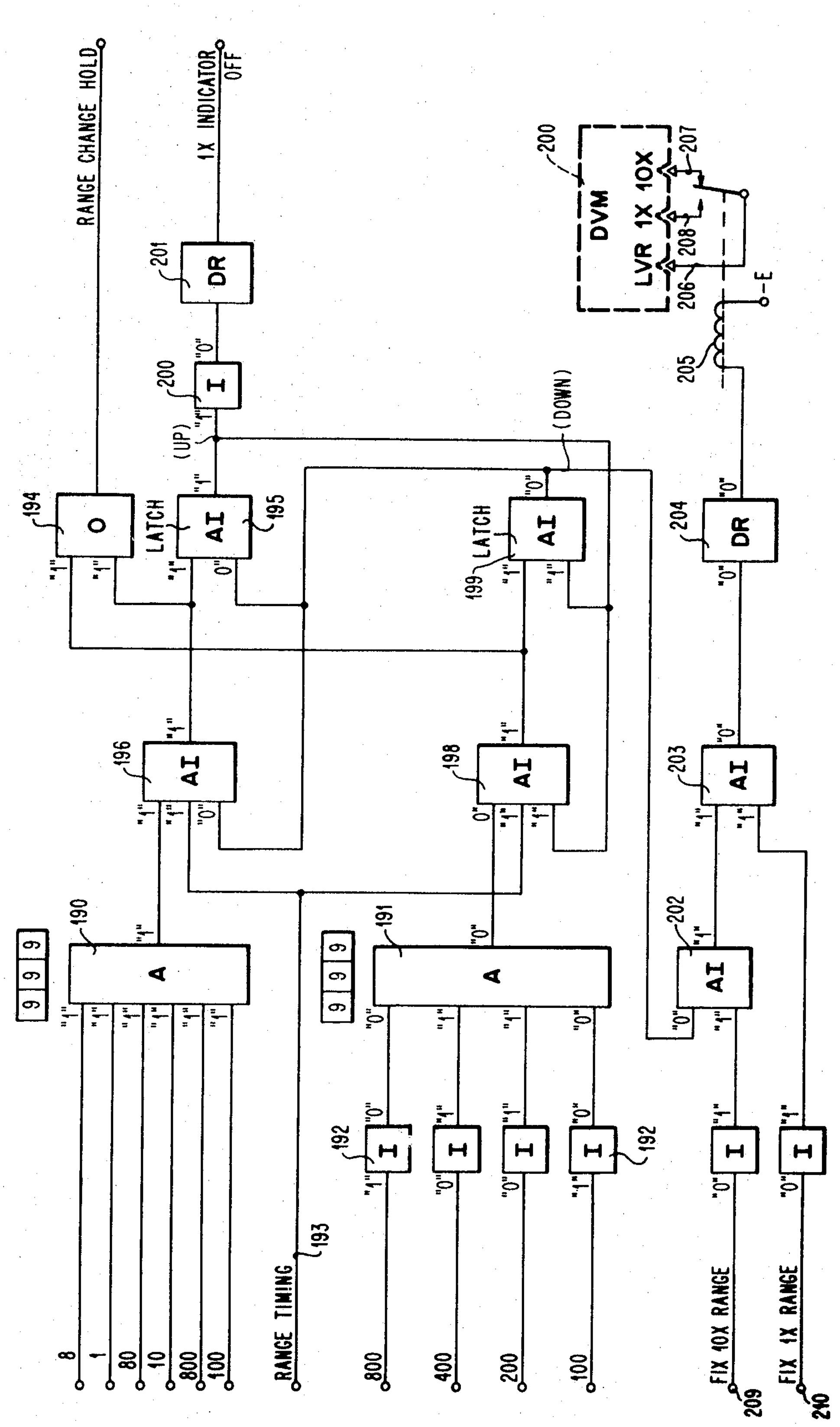
Figure 14F:
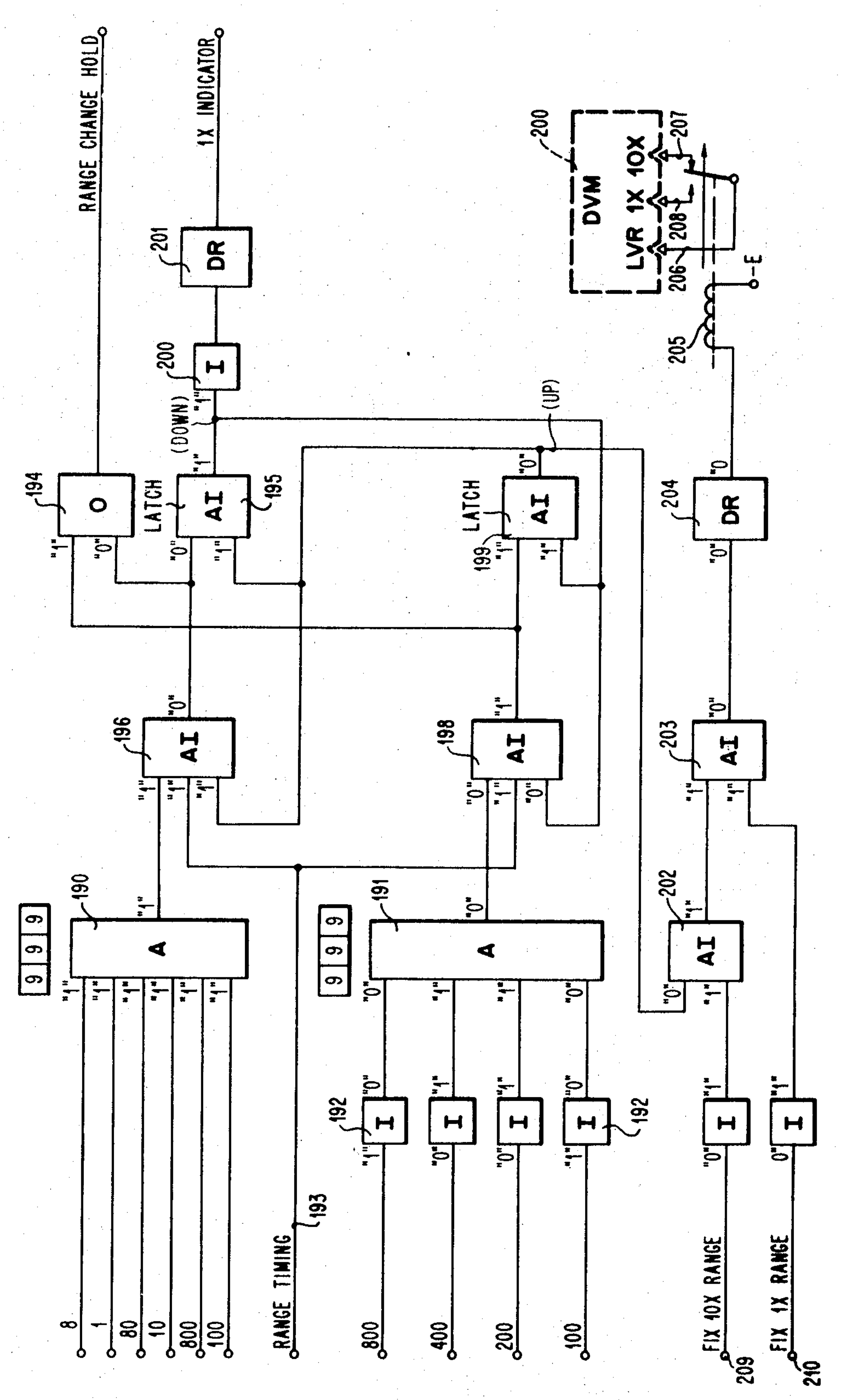
Figure 14G:
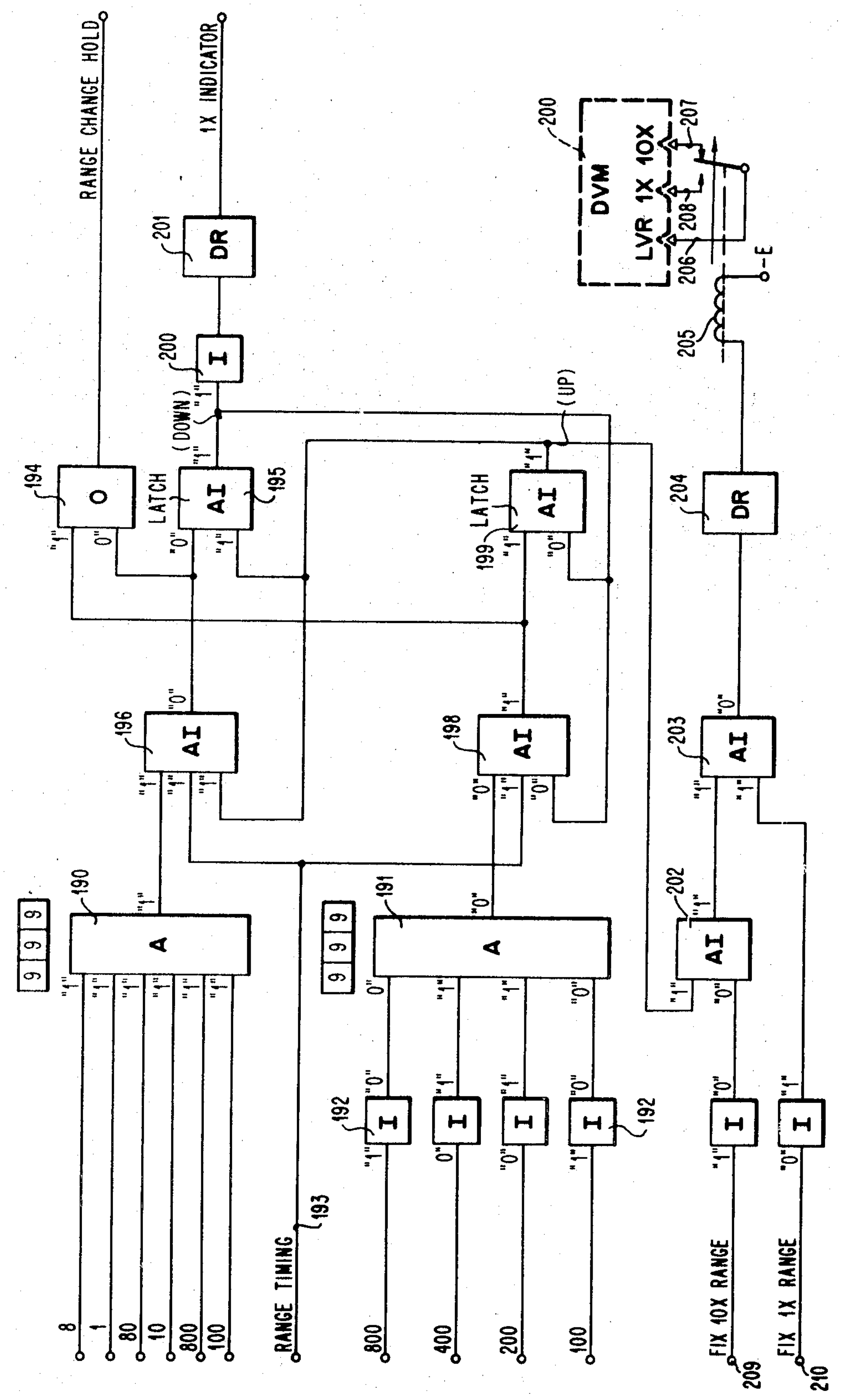
Figure 14H:
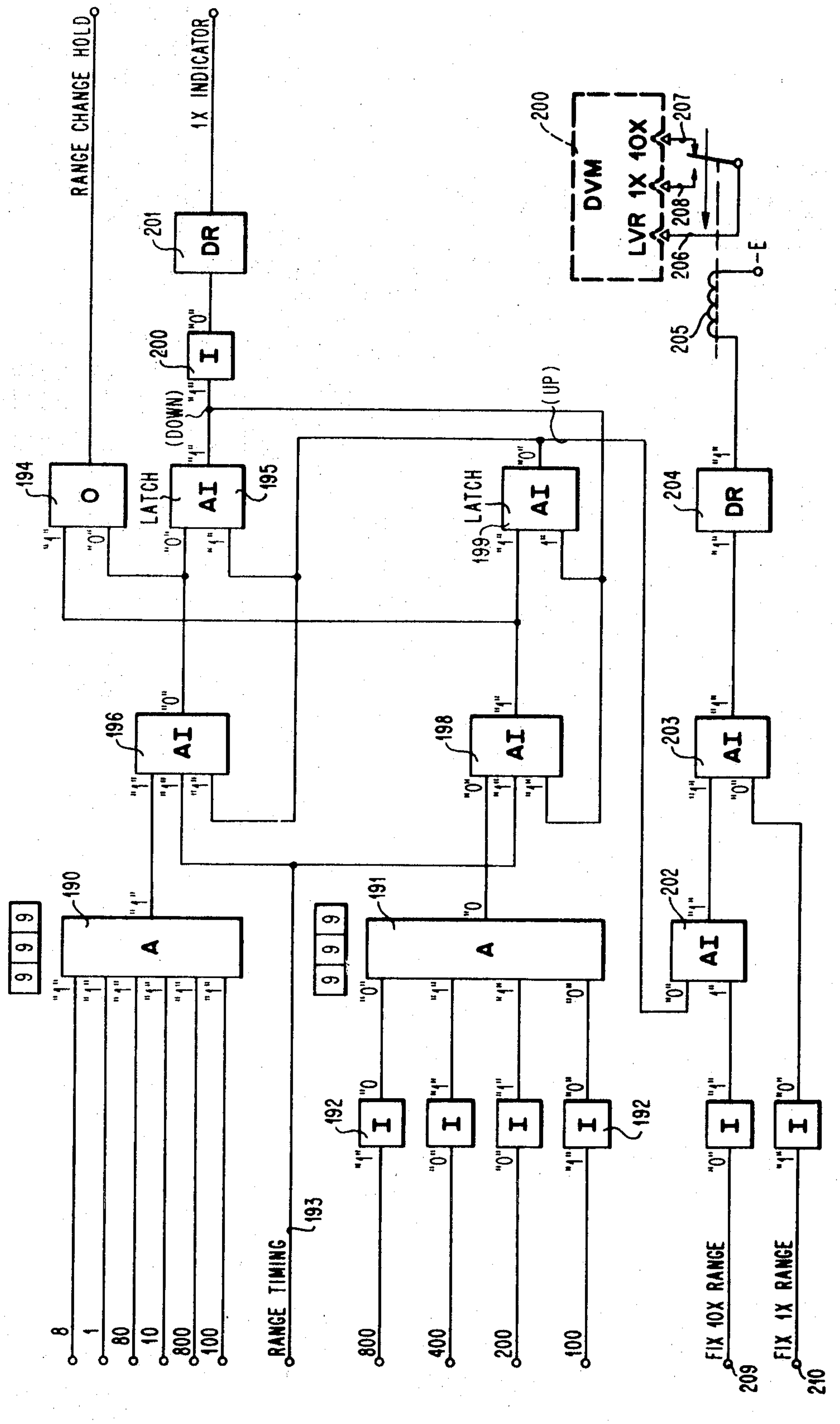

FIG. 14C illustrates the same example with a FIX—1× override signal applied to the fix-range terminal 210 overriding on autoranging call for a ×10 range for a 045 range command. Upon inversion, this fixed 1× signal is inverted as a zero input to the override AI circuit 203 which, together with the zero signal from the previous override AI circuit 202, is outputted as a "1" to driver 204 for actuation of relay 205 to close the low-voltage return line 206 against the 1× scale input 208 of the digital voltmeter 200. FIG. 14D illustrates the autoranging function of this circuit for the same digital voltmeter reading of 045 where the current condition of the 10× select line was up and the 1× select line was down.

FIGS. 14E to 14H illustrate the autoranging of the circuit for digital voltmeter reading of 999 for various conditions of the 10× and 1× range select lines with and without application of overriding signals on the FIX—10× and FIX—1× inputs 209, 210.

Figure 15:
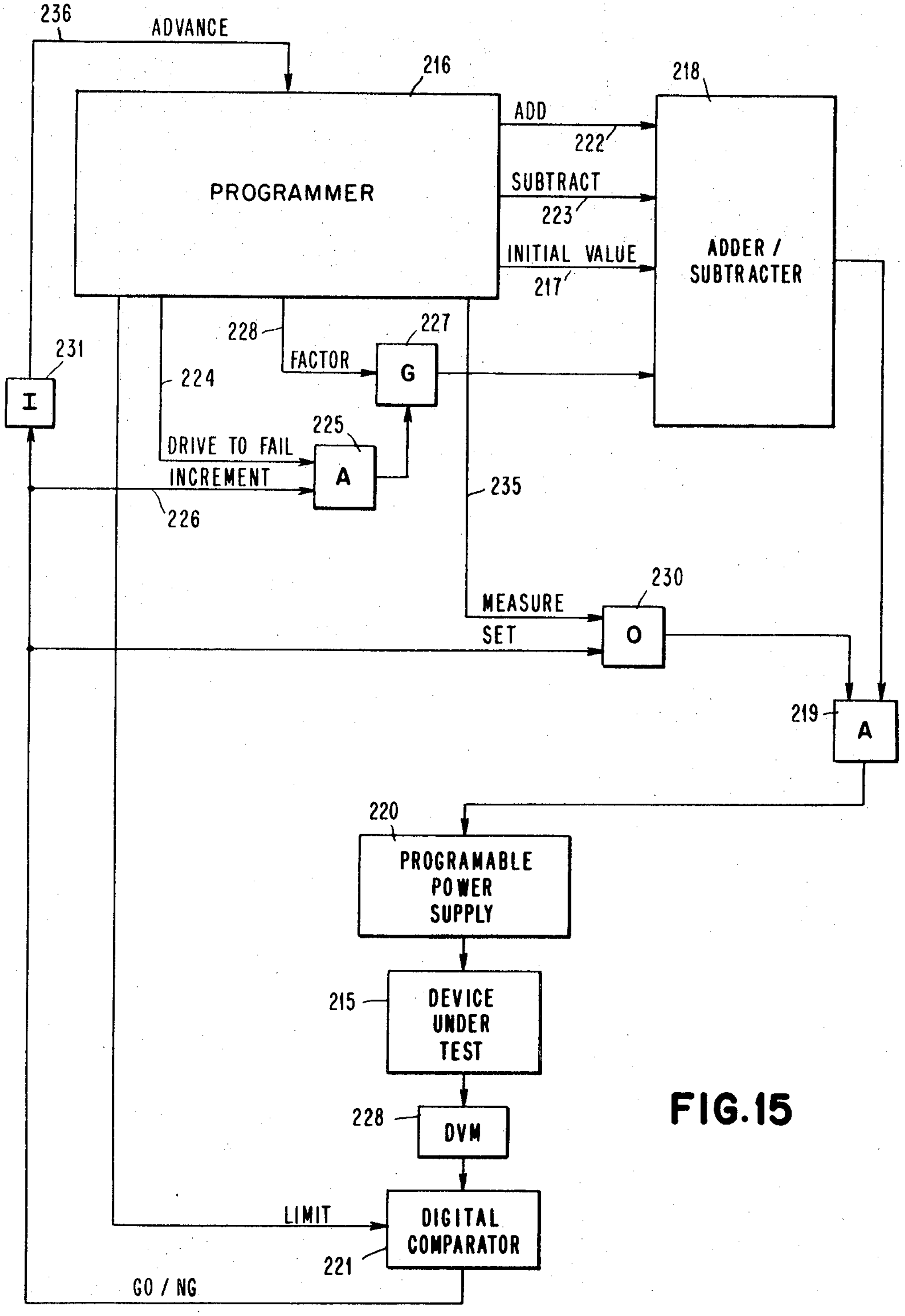
FIG. 15 is a system block diagram of the restructuring of the tester of this invention for marginal testing of components.
Figure 16A:
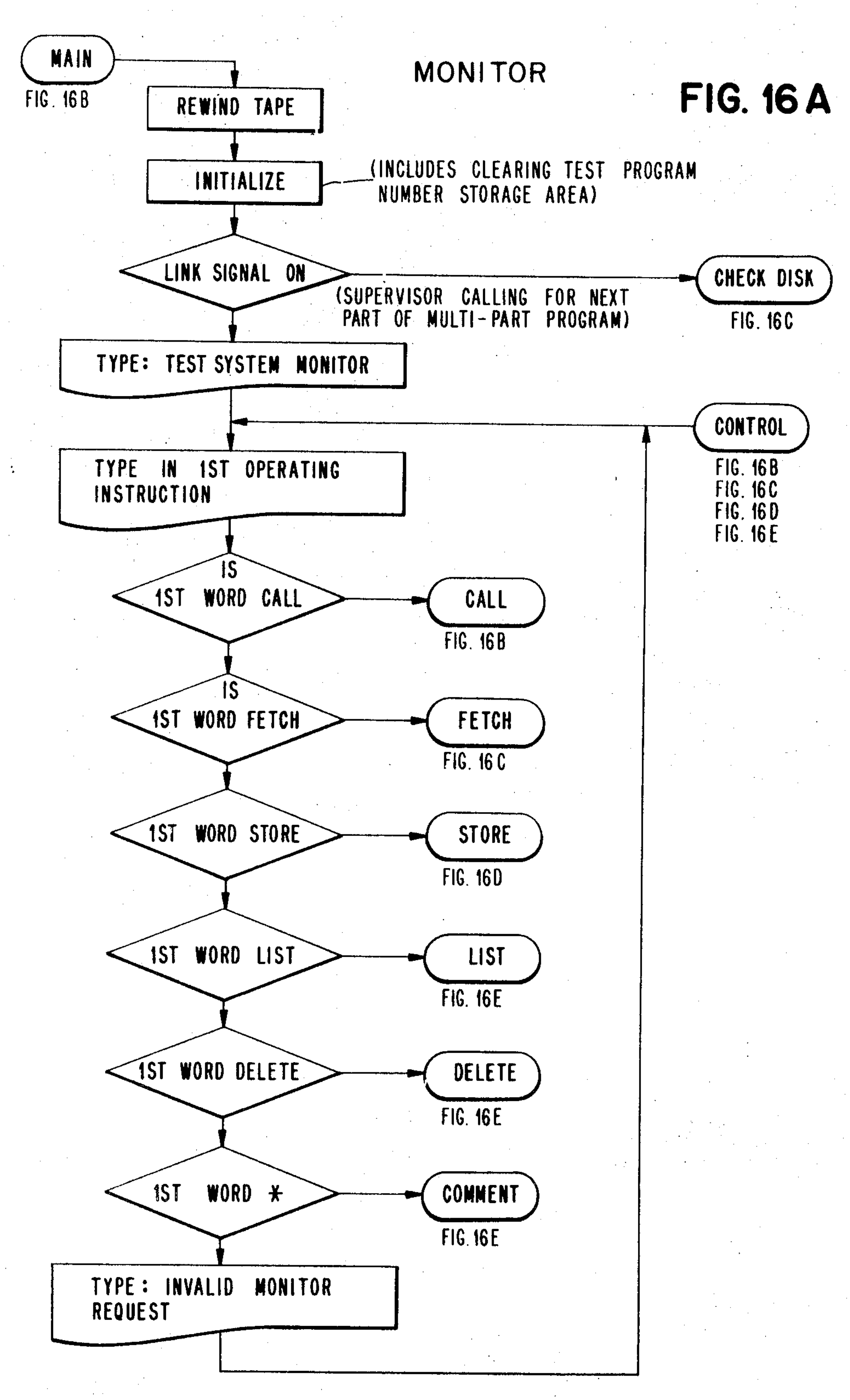
FIGS. 16A–17H are flow charts illustrating and defining the test system of this invention.
Figure 16B:
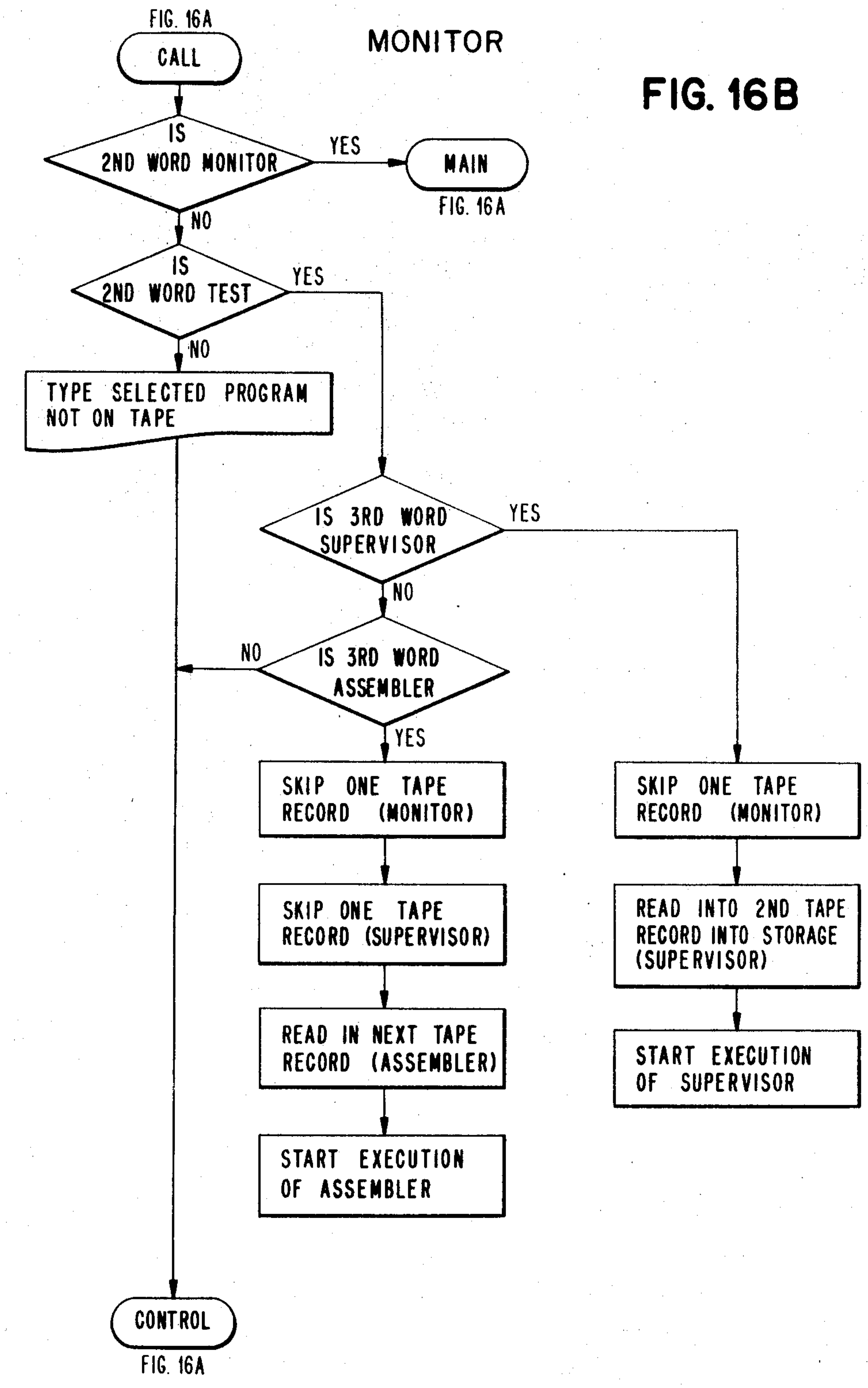
Figure 16C:
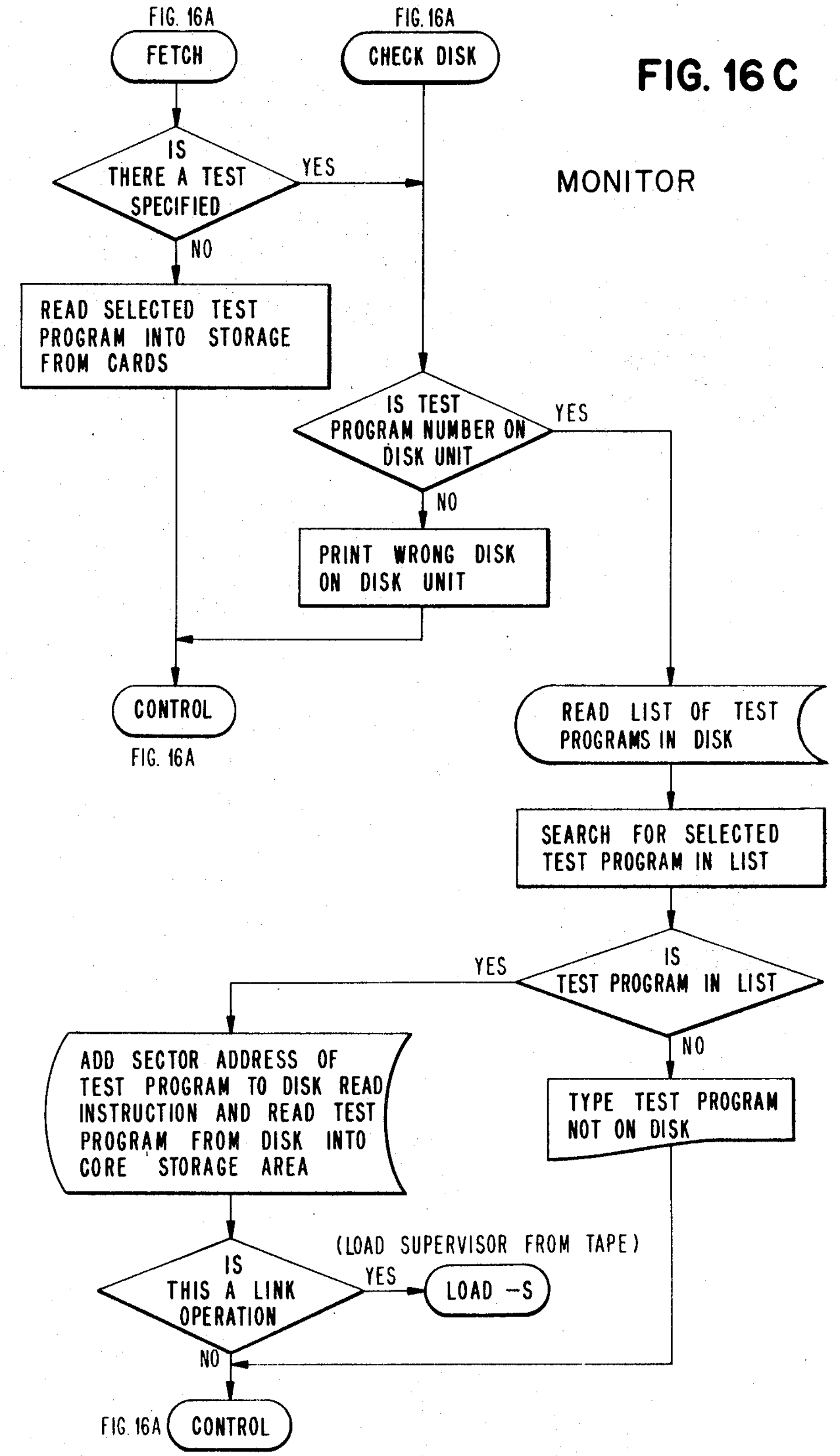
Figure 16D:
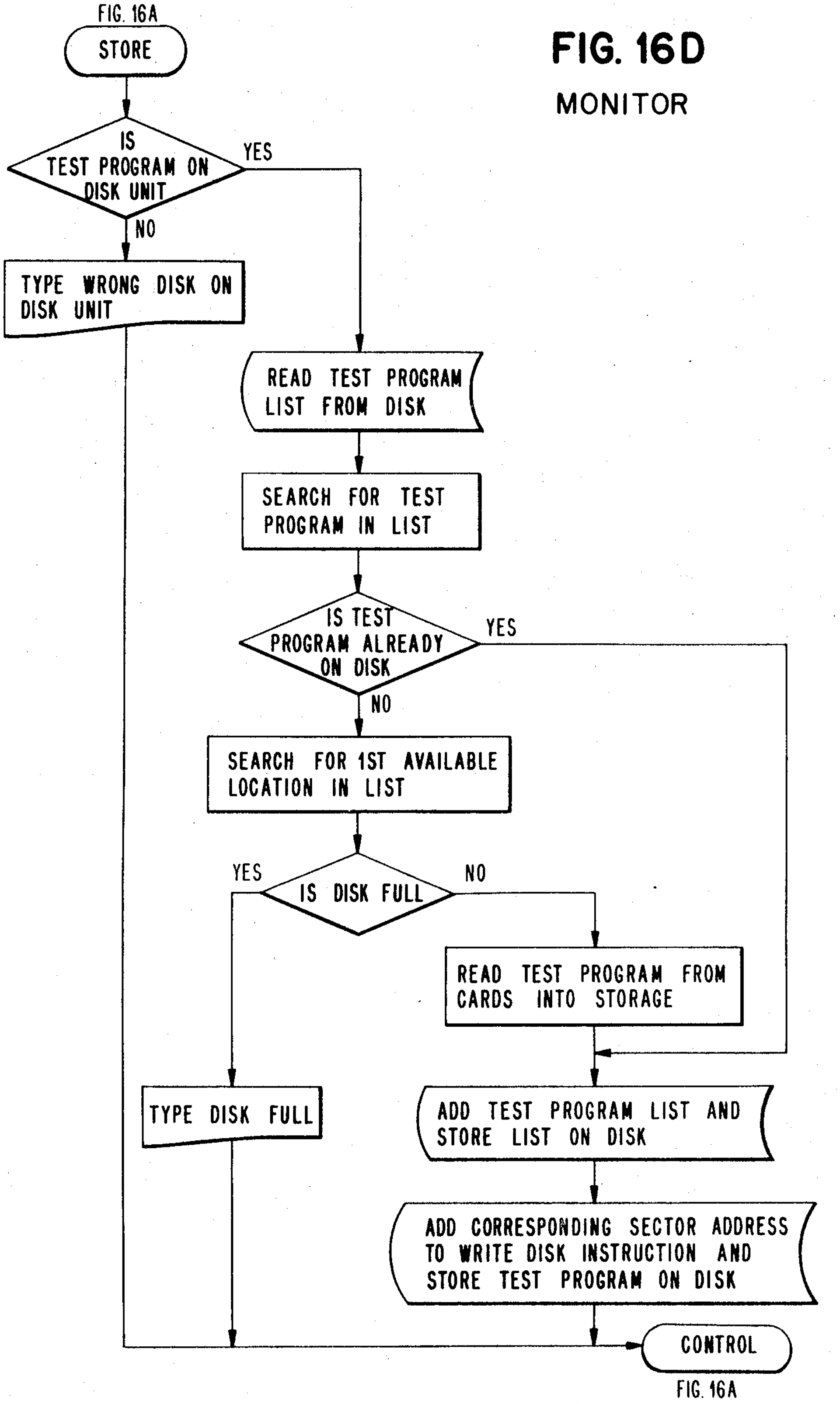
Figure 16E:
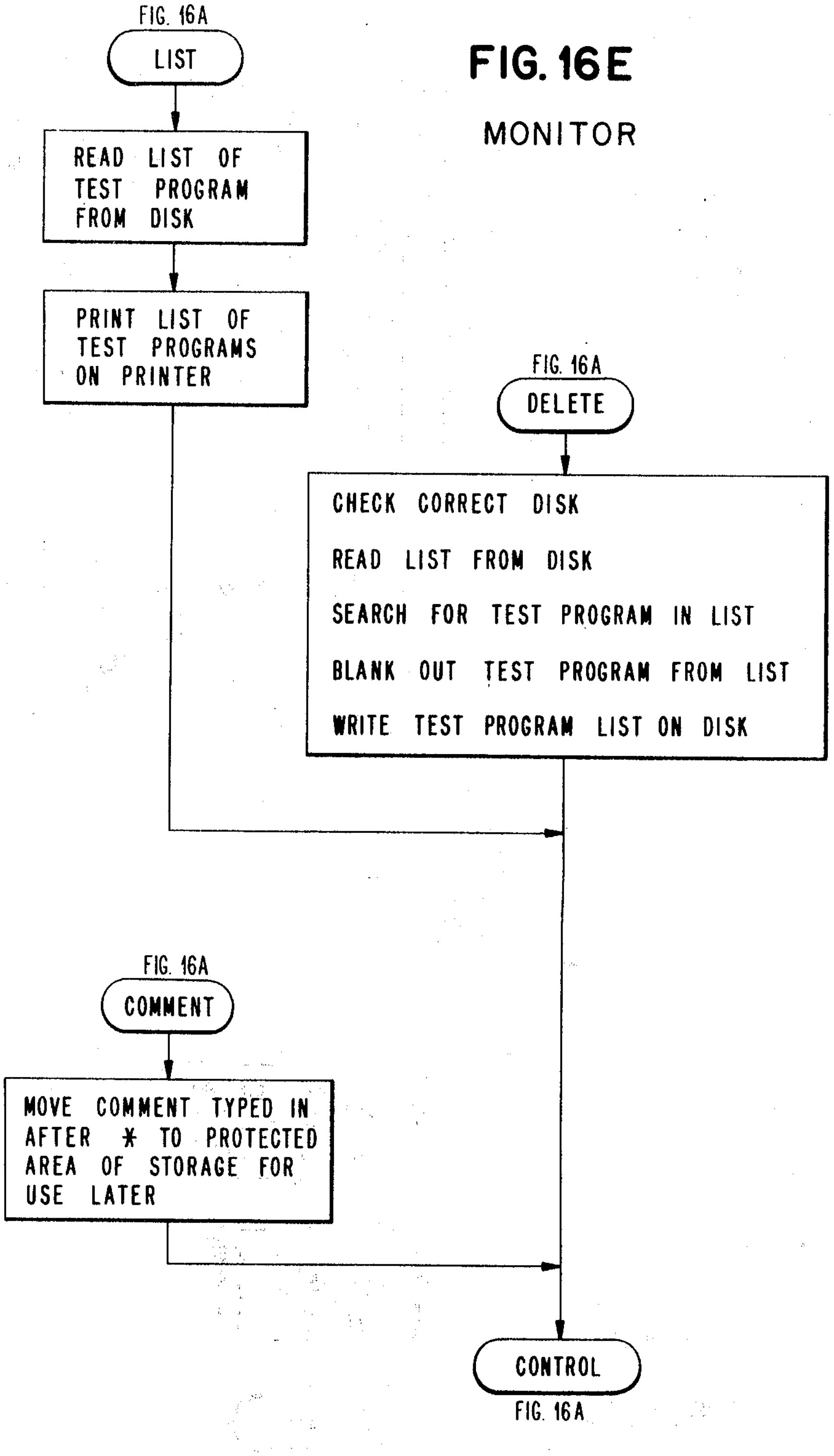
Figure 17A:
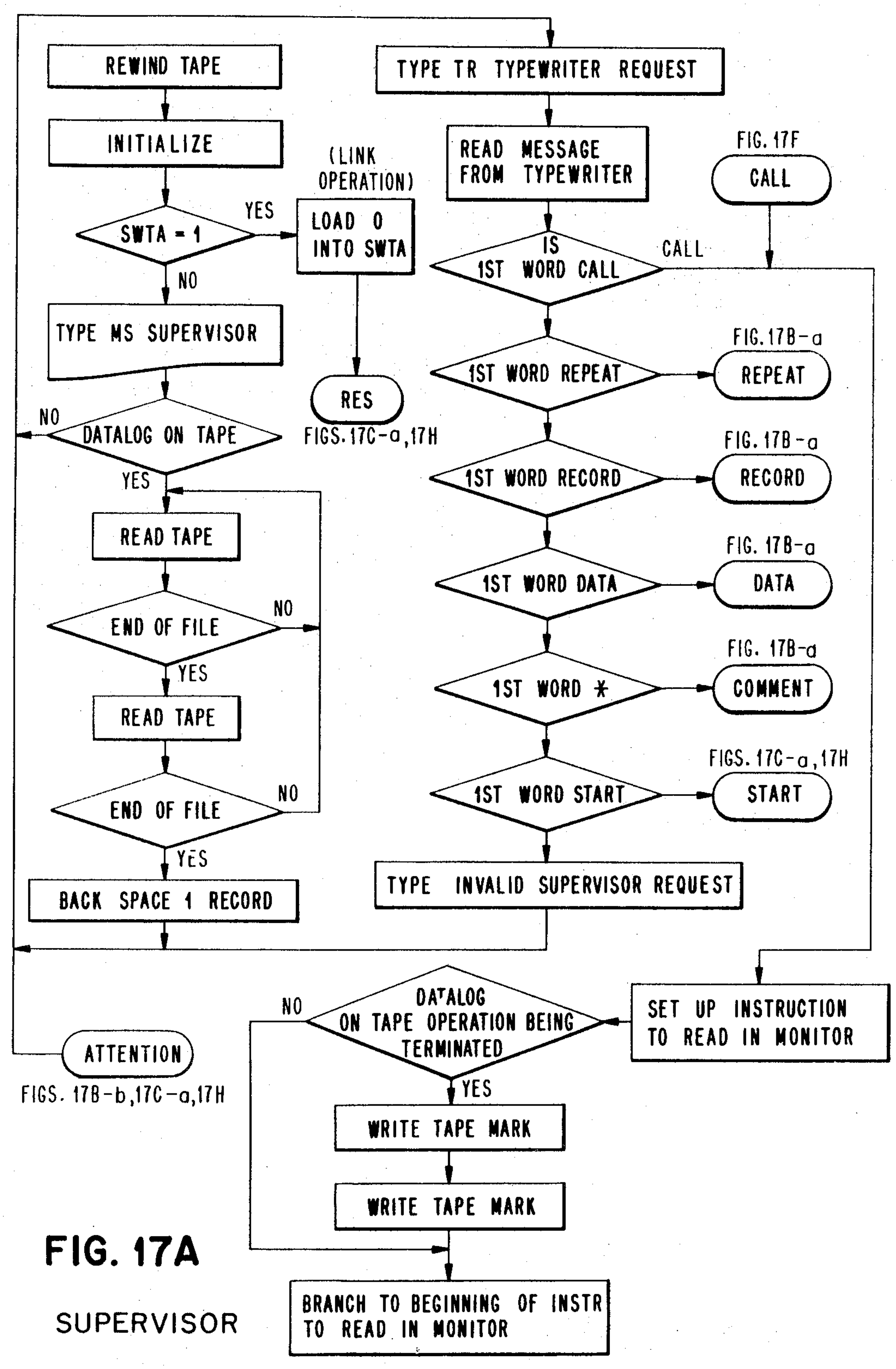
Figure 17B:
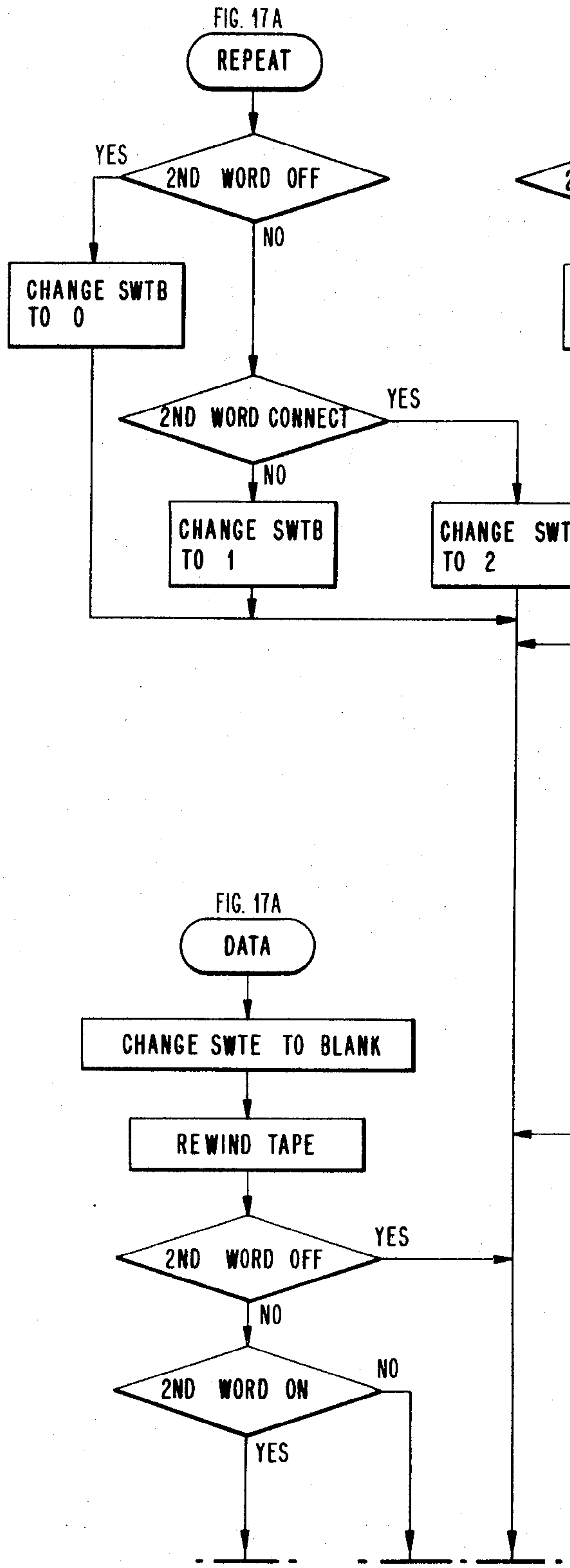
Figure 17B:
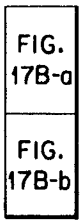
Figure 17D:
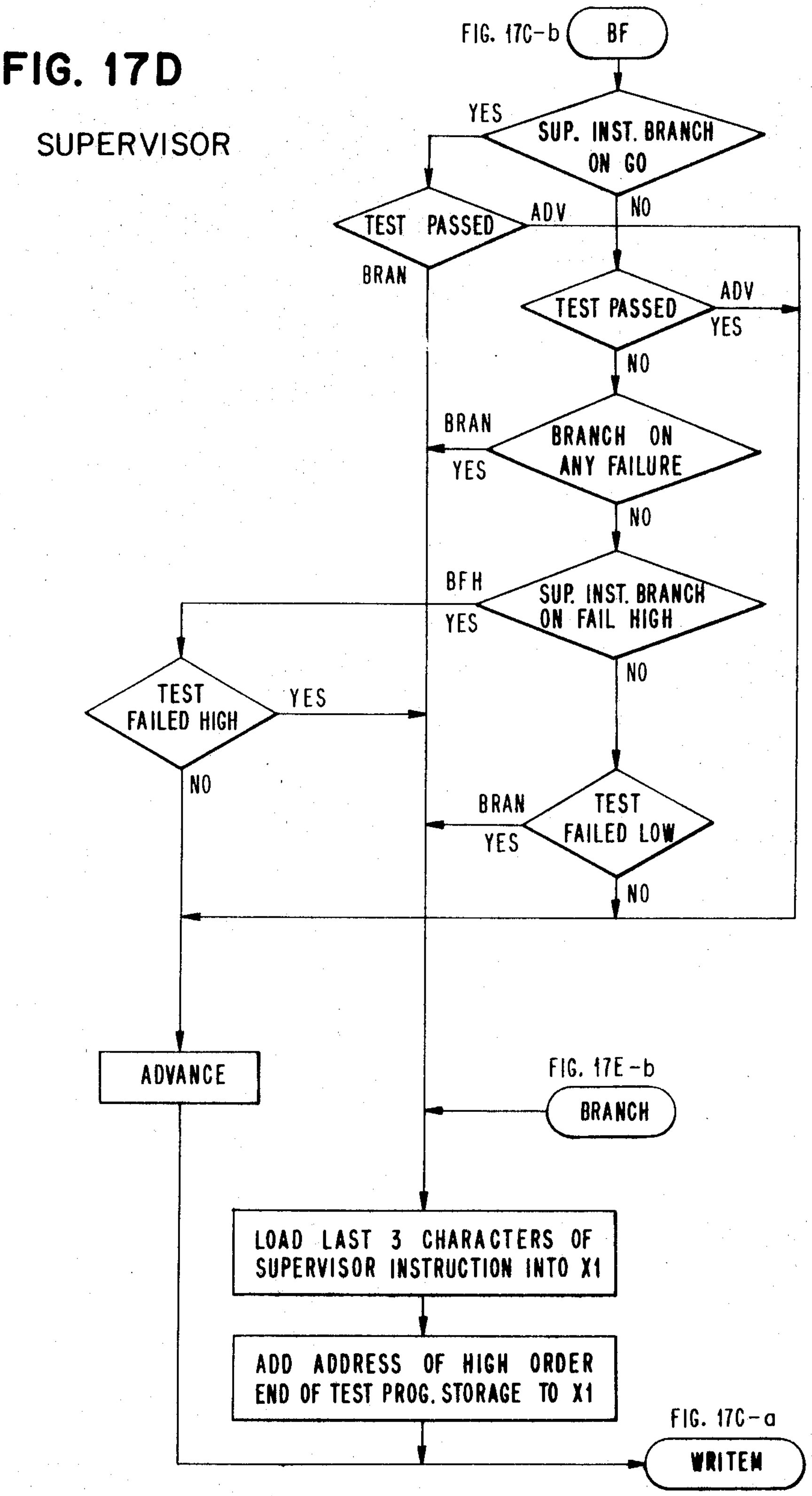
Figure 17F:
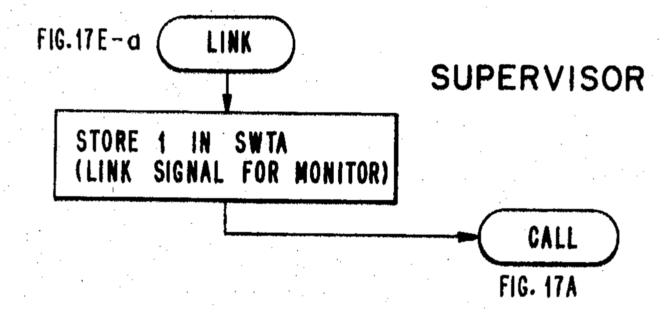
Figure 17G:
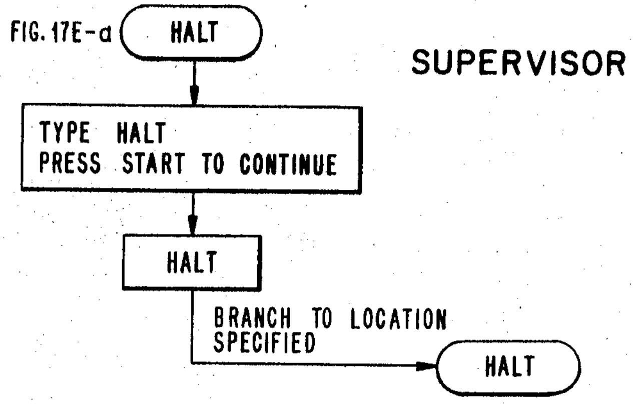
Figure 17H:
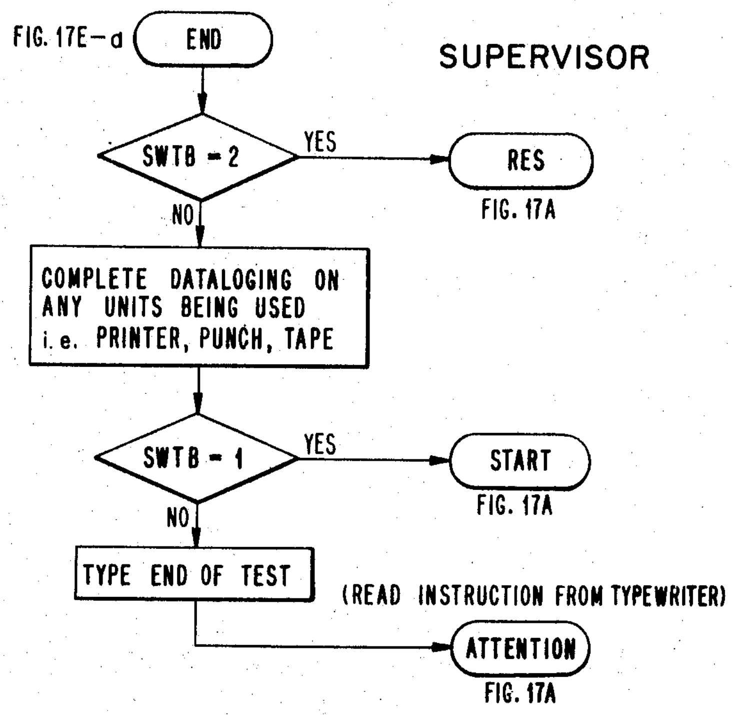

Also comprehended within the test system of this invention is a drive-to-fall circuit using conventional units of logic shown in FIG. 15 in which one or more voltage levels to a device under test 215 are sequentially incremented, upon a favorable comparison for the test until the device is caused to fail.

As shown in the drawing, a conventional programmer (as described above or other) 216 provides an initial value on line 217 to an ADDER/SUBTRACTOR unit 218 through an AND-circuit 219 for suitable programming of a power supply 220 to a level desired exercising a device under test 215. Concurrently, a reference limit is stored in a digital comparator 221, together with suitable signals on lines 222 and 223 for placing the ADDER/SUBTRACTOR unit 218 in either an ADD or SUBTRACT mode. For the device under test 215 to be exercised in a drive-to-fail operation, an appropriate signal line 224 is ANDed in the AND-circuit 225 with a GO signal on line 226 (from the digital comparator 221) for opening a gate 227 to channel the desired increment or factor by which the programmable power supply 220 is to be incremented through the ADDER/SUBTRACTOR unit 218. The digital comparator 221 compares the readings of the digital voltmeter 228 which senses the response of the device under test 215 and provides a GO/NO-GO signal which forms an increment signal to the AND-circuit 225, as indicated above, and also provides both a set signal to the OR-circuit 230 and an advance signal through the INVERTER circuit 231 to the programmer 216.

In operation, the programmer 216 restores the desired reference limit in digital comparator 221, and concurrently stores the initial signal level for the device, under test 215, in the ADDER/SUBTRACTOR unit 218. At the time of the test, a measure signal on line 235 is inputted to the OR-circuit 230 to the AND-circuit 219 for ANDing the initial value to the programmable power supply 220 which applies the programmed level to the device under test 215. The response to the device under test is sensed by the digital voltmeter 228 for comparison in the digital comparator 221. Upon a favorable comparison, a GO signal is outputted from digital comparator 221 which is inverted in the INVERT circuit 231 as a down signal on line 236 to keep the programmer 216 from advancing. Concurrently, the GO signal 15 ANDed in the AND-circuit 225 with the drive-to-fail signal on line 224 to open gate 227 so as to channel the factor on line 228 into the ADDER/SUBTRACTOR unit 218. With the signal line 222 placing the ADDER/SUBTRACTOR unit 218 in the "add" mode, the factor, on line 228, is added to the initial programmed value via line 217 and ANDed to the AND-circuit 219 together with the GO signal inputted through the OR-circuit 230. This increments the programmable power supply by the programmed factor so as to increase the signal level to the device under test. This cycle is repeated and the programmable power supply incremented the requisite number of times until a fail or NO-GO signal is outputted from the digital comparator 221 which, when inverted in the invert circuit 231, advances the programmer 216 in the test sequence.

Conversely, with a signal on line 223 placing the ADDER/SUBTRACTOR unit 218 in the subtractor mode, the program factor is subtracted from the initial value or level programmed to the programmable power supply 220 so as to reduce the signal level to the device under test. With the ADDER/SUBTRACTOR unit in the subtractor mode, the signal level to the device under test 215 is repeatedly reduced by the programmed factor until a failure of the device under test is sensed by the digital voltmeter 228 as determined by the comparison in the digital comparator 221.

The test system of the invention is a completely automatic system with provisions for manual intervention and/or modification of a test program in process. In general, this system utilizes three subprograms, which as identified above are: an assembler subprogram, a monitor subprogram and supervisor subprogram. Basically, the test instructions for the system originate from a general test language (GTL) card deck consisting of one instruction per card. Each GTL instruction is then converted by the assembler subprogram into a system's test language (STL) card deck consisting of a maximum of 23 instructions per card. The system test language instructions are then entered into the test system under control of a monitor subprogram which transfers control of the instructions to a supervisor program. The supervisor program determines which system test language instructions are to be executed in the computer 5 and which system test language instructions are to be forwarded to the analog subsection 3 for execution.

To initiate a set of test instructions for a one test program, English abbreviations are normally employed to describe the desired test, for example "SET N PS—3 3480" where "N" indicates a normal timing cycle, PS—3 indicates a power supply—3 and 3480 is 3.48 volts expressed in millivolts. The coding sheet for the general test language would be divided into eight fields as shown in the following table.

TABLE 9

| Fields | Name |
|---|---|
| 1 | Operation |
| 2 | Timing Cycle |
| 3 | Operand |
| 4 | First Data Field |
| 5 | Second Data Field |
| 6 | Third Data Field |
| 7 | Fourth Data Field |
| 8 | Comments |

The card format for the general test language is shown in the following table.

TABLE 10

Under a GTL Format

| | |
|---|---|
| 1 | C= Comment (whole card is treated as a comment only) |
| 2–6 | Symbolic address |
| 7–11 | Op Code (Instruction) |
| 12 | Instruction timing (W = wait; blank = normal) |
| 13–18 | Operand |

| | | |
|---|---|---|
| 19–24 | First possible data field | First blank field ends data |
| 25–30 | Second possible data field | |
| 31–36 | Third possible data field | |
| 37–42 | Fourth possible data field | |
| 43–72 | Comments | |
| 73–75 | Program ID | |
| 76–77 | Coding sheet page number | |
| 78–80 | Coding sheet line number | |

The implementation and execution of the series of instructions of a test program under control of the monitor and supervisor subprograms is illustrated in the flow diagram of FIGS. 16A to 16E and FIGS. 17A to 17H, respectively.

The translation of the general test language to the system test language will be described in conjunction with FIGS. 18A to 18E which illustrate logic and data flow within the system. In the environment described, the assembler program is contained on tape in conjunction with the monitor and supervisor programs, with the program separated by a tape mark from a section of the tape reserved for data logging. Generally, the data sets are separated by tape marks and the last data set is terminated by a double tape mark. The tape storage is identified as a first storage 325 in FIG. 18A with the assembler shown as contained in section 300 of the tape. A "Call Assembler" instruction at keyboard 301 is encoded in encoder 302 through an appropriate AND circuit in the AND-matrix 303 to bring line ⑥ up which is inputted to an AND circuit 304 to bring the assembler subprogram into a first core storage 305 wherein its contents are identified by the ⑳, also partially duplicated in FIG. 18D. For purposes of correlation with FIGS. 18A to 18D, the keyboard 301, encoder 302, and AND matrix 303 are shown to be sectionalized, although actually constituting a unitary element. Suitable instructions from the keyboard control to "Start" the translation activates line ㉑ which initiates the processing of the general test language on cards 317A into the system test language, which may (under appropriate keyboard instructions of "Punch" and "List") on lines identified by ㉒ and ㉓ be printed out in the system test language (STL) by a suitable printer 316, or punched on cards as indicated at 317. Concurrently, under keyboard instruction for storage (e.g., "Store") of the translated program (FIGS 18A and 18B), the translated test program may be routed to a second storage medium 318 which in the form employed, comprised the aforeindicated disc pack. During operation, the "assembler" takes each field of the general test language, in turn, and compresses it, leaving out all blanks and right justifying each field. Translation is done by table look-up. First the timing cycle field is scanned and the bit $A_2$ of the instruction word is set accordingly. Then, the operation code is scanned and bits $B_1$, $B_2$, $A_1$ are set in the instruction word. The operation code is used to determine which of the four operand conversion tables will be scanned. At the conversion of the operand field, the first of the data fields are inspected. The operation code also determines which of two possible tables is searched to convert the data fields. Each data field containing data is searched in turn. No blank fields are permitted to appear between nonblank fields.

One complete test program comprises a series of multiple instructions for a device to be tested. Such a (complete) test program is contained on the disc pack or second storage 318 in conjunction with a plurality of other complete test programs corresponding to a like number of different devices to be tested. Generally, up to 199 test programs have been stored on the disc, with each test program being limited to 10,000 characters in length. Each test program in the second storage 318 is identified for access by appropriate addresses which are contained in the index matrix portion 318*a* of the second storage unit. A list of various test operations in the general test language form together with the system test language and the description of each operation as shown in the following tables 11 to 16.

TABLE 11.—CNCT OPERATION

| GTL | | | STL | | |
|---|---|---|---|---|---|
| Field | Column | Code | Code | Bit character | Test description |
| Op code | 7–11 | CNCT | 0 | $Z_1$, $B_2$ | Connect. |
| Timing | 12 | W/blank | 0/1 | $A_2$ | Wait/Normal. |
| Operand | 13–18 | 1 ↓ 50 | 001 ↓ 050 | $N_{1\,2\,3}$ | Pin Address. |
| Data a | (*) | blank<br>Vn<br>REF<br>BUSm | 0<br>n<br>5<br>(5+m) | $N_4$ | Do nothing.<br>Vn to pin: n=1–4.<br>V& drive return to pin.<br>Bus m to pin: m=1, 2. |
| Data b | (*) | blank<br>GND<br>GNDR<br>DVR | 0<br>1<br>2<br>3 | $N_5$ | Do Nothing.<br>Gnd to pin.<br>Gnd through R to pin.<br>Driver to pin. |
| Data c | (*) | blank<br>DVMR<br>DVM | 0<br>1<br>2 | $N_6$ | Do Nothing.<br>Minus DVM thru R to pin.<br>Minus DVM to pin. |
| Data d | (*) | blank<br>Rn | 0<br>n | $N_7$ | Connect Data a to pin.<br>Connect Data a thru $R_n$ to pin: n=1–7. |

*Data a, b, c, d can be applied in any sequence to columns 19–24, 25–30, 31–36, 37–42; starting with columns 19–24. The first blank field stops the data.

TABLE 12.—SET OPERATION

| GTL | | | STL | | |
|---|---|---|---|---|---|
| Field | Column | Code | Code | Bit character | Test description |
| Op code | 7–11 | SET | 1 | $Z_1$, $B_2$ | Set. |
| Timing | 12 | W/blank | 0/1 | $A_2$ | Wait/Normal. |
| Operand | 13–18 | Vn<br>MN<br>LN<br>LP<br>MP<br>MNLIM<br>LNLIM<br>LPLIM<br>MPLIM | 00n<br>*1<br>*1<br>*1<br>*1<br>0–11<br>0–12<br>0–12<br>0–14 | $N_{1\,2\,3}$ | Set Vn to data: n=1–4.<br>Set MN level to data.<br>Set LN level to data.<br>Set LP level to data.<br>Set MP level to data.<br>Set MN limit to data.<br>Set LN limit to data.<br>Set LP limit to data.<br>Set MP limit to data. |
| Data 1 *2 | 19–24 | ±abcd | efgh | $C_{4\,5\,6\,7}$ | m volts. |

*1 One or two separate instructions are generated per GTL code to SET $V_{5,6,7,8}$ according to equations indicated in LEV operation. (See TABLE 13)

*2 Data Field Format:

| GTL | STL | | Description |
|---|---|---|---|
| a | e | $B_4$ | Range: 0=x1mv./1=10mv. |
| | | $N_4$ | 1,000's digit |
| b | f | $N_5$ | 100's digit |
| c | g | $N_6$ | 10's digit |
| | | $B_7$ | Polarity: |
| d | h | $A_7$ | |
| | | $N_7$ | 1's digit |

| $B_7$ | $A_7$ | Polarity |
|---|---|---|
| 0 | 0 | + |
| 0 | 1 | + |
| 1 | 0 | − |
| 1 | 1 | + |

TABLE 13 LEV OPERATION

| GTL | | | STL | | |
|---|---|---|---|---|---|
| Field | Column | Code | Code | Bit character | Test description |
| Op code | 7–11 | LEV | 4 | $Z_1$, $B_2$ | Apply level. |
| Timing | 12 | W/blank *3 | 0/1 | $A_2$ | Wait/normal. |
| Operand | 13–18 | 1 | *2 | $N_{1\,2\,3}$ | Pin 1. |
| | | 2 | | | Pin 2. |
| | | ↓ | | | ↓ |
| | | 49 | | | Pin 49. |
| | | 50 | | | Pin 50. |
| Data 1 | 19–24 | MN | *1 | $C_{4\,5\,6\,7}$ | MN Level. |
| | | LN | | | LN level. |
| | | LP | | | LP Level. |
| | | MP | | | MP Level. |
| Data 2, 3, 4 | 25–42 | Blank | | | |

*1 data format (for pins 1–10; same for other sets):

| $B_4$ | $A_4$ | $8_4$ | $4_4$ | $2_4$ | $1_4$ | $B_5$ | $A_5$ | $8_5$ | $4_5$ | $2_5$ | $1_5$ | $B_6$ | $A_6$ | $8_6$ | $4_6$ | $2_6$ | $1_6$ | $B_7$ | $A_7$ | $8_7$ | $4_7$ | $2_7$ | $1_7$ |
|---|---|---|---|---|---|---|---|---|---|---|---|---|---|---|---|---|---|---|---|---|---|---|---|
| $a_1$ | $b_1$ | | $a_2$ | $b_2$ | $a_3$ | $b_3$ | $a_4$ | | $b_4$ | $a_5$ | $b_5$ | $a_6$ | $b_6$ | | $a_7$ | $b_7$ | $a_8$ | $b_8$ | $a_9$ | | $b_9$ | $a_{10}$ | $b_{10}$ |

where:

| $a_i$ | $b_i$ | Level applied | | | | |
|---|---|---|---|---|---|---|
| 0 | 0 | MN= | —V5 | | | |
| 1 | 0 | LN= | —V5 | —V6 | | |
| 0 | 1 | LP= | —V5 | —V6 | —V7 | |
| 1 | 1 | MP | —V5 | —V6 | —V7 | —V8 |

*2 LEV's are accumulated into groups of ten and executed prior to the next MSUR in the following sets:

| $N_1$ | $N_2$ | $N_3$ | Pina |
|---|---|---|---|
| 0 | 1 | 0 | 1–10 |
| 0 | 2 | 0 | 11–20 |
| 0 | 3 | 0 | 21–30 |
| 0 | 4 | 0 | 31–40 |
| 0 | 5 | 0 | 41–50 |

(Only those decades which have been modified since the last MSUR instruction will be assembled and then in order of increasing decades.)

*3 The W is assembled only in the last pin mentioned within the decade in the GTL Statements.

TABLE 14 MSUR OPERATION

| GTL | | | STL | | |
|---|---|---|---|---|---|
| Field | Column | Code | Code | Bit character | Test descripriion |
| Op code | 7–11 | MSUR | 6 | $Z_1$, $B_2$ | Measure and compare. |
| Timing | 12 | Blank | | | |
| Operand | 13–18 | 1 | 001 | $N_{1,\,2,\,4}$ | Pin Address. |
| | | 2 | 002 | | Do. |
| | | ↓ | ↓ | | |
| | | 49 | 049 | | Do. |
| | | 50 | 050 | | Do. |
| Data 1 | 19–24 | 1/0 | 1/0 | $A_2$ | Test for ones/zeros. |
| Data 2, 3, 4 | 25–42 | XXXX | XXXX | $N_{4,\,5,\,6,\,7}$ | Not used in test. Assembler assigns XXXX or MSUR number in unused data fields in STL. |

TABLE 15.—CTRL Operation

| GTL | | | STL | | |
|---|---|---|---|---|---|
| Field | Column | Code | Code | Bit character | Test description |
| Op | 7–11 | CTRL | 7 | $Z_1$, $B_3$ | Control. |
| Timing | 12 | W/blank | 0/1 | $A_3$ | Wait/Nromal. |
| Operand | 13–18 | Vn ON | 00n | $N_{1\,3\,4}$ | V supply n on: n=1→8. |
| | | ALL ON | 009 | | All V supplies on. |
| | | Vn OFF | 01n | | V supply n off: n=1→8. |
| | | ALL OFF | 019 | | All V supplies off. |
| | | RESET | 041 | | Reset all registers. |
| | | FIX 1 | 042 | | Fix 1v DVM range. |
| | | FIX 10 | 043 | | Fix 10v DVM range. |
| | | UNFIX | 044 | | DVM auto-range. |
| | | | 081 | | AC measurement 1. |
| | | | 082 | | AC measurement 2. |
| | | | 083 | | AC measurement 3. |
| Data 1–4 | 19–42 | blank | blank | | Not used. |

TABLE 16.—MODIFIED OPERATIONS

| | GTL | | STL | | |
|---|---|---|---|---|---|
| Field | Column | Code | Code | Bit character | Description |
| Op code | 7-11 | ILEV | 4 | $Z_1, B_2$ | Same as LEV except Pin addressed is immediately accumulated into the proper group of 10 and executed. |
| Do | 7-11 | *1 CNCTN | 0 | $Z_1, B_2$ | Same as CNCT except data fields mentioned are connected on without changing any other data previously connected. |
| Do | 7-11 | *1 CNCTF | 0 | $Z_1, B_2$ | Same as CNCT except data fields mentioned are disconnected without changing any other data previously connected. |

*1 A CNCT to the pin must precede a CNCTN or CNCTF.

Forming part of the test program are additional instructions which are employed to control the operation of the supervisor subprogram only. These are not transmitted to the analog section 3 of the test system but are processed within computer 5. These instructions are identified by a comma in the first character of the system test language instruction. They may appear at the beginning of a program, after another supervisor instruction or after a measure instruction. These supervisor instructions are identified and discussed below, wherein any columns not specified (except Columns 1–6) are ignored, e.g., treated as comments.

ADD

The algebraic value of the data field will be added to the location specified in the operand field. The addition is algebraic and the units, tens, hundreds, and thousands position will be added to locations aaa, aaa–1, aaa–2, and aaa–3 respectively. The only zone checked and changed as required is in location aaa.

| | GTL | | STL | |
|---|---|---|---|---|
| Field | Columns | Code | Code | Position |
| Opcode | 7–11 | ADD | A | $C_{1,2}$ |
| Operand | 13–18 | ac*1 | aaa*2 | $C_{5,6,7}$ |
| Data | 19–24 | ±nn | ± nn | $C_{3,4}$ |
| Unconditional Branch | | | | |

| | GTL | | STL | |
|---|---|---|---|---|
| Field | Columns | Code | Code | Position |
| Opcode | 7–11 | B | ,BOO | $C_{1,2,3,4}$ |
| Operand | 13–18 | AC | aaa | $C_{5,6,7}$ |

*1 Symbol Address Constants

*2 Address Location

BRANCH UNDER COUNT CONTROL

A transfer will be made if the counter is nonzero. If a transfer is made, the value of the counter is reduced by one.

| | GTL | | STL | |
|---|---|---|---|---|
| Field | Columns | Code | Code | Position |
| Opcode | 7–11 | BC | ,BCO | $C_{1,2,3,4}$ |
| Operand | 13–18 | ac | aaa | $C_{5,6,7}$ |

BRANCH ON COUNTER HIGH

If the counter is higher than the absolute value of the operand field of this instruction, the supervisor will skip over one instruction.

| | GTL | | STL | |
|---|---|---|---|---|
| Field | Columns | Code | Code | Position |
| Opcode | 7–11 | BCH | ,BCH | $C_{1,2,3,4}$ |
| Operand | 13–18 | nnn | nnn | $C_{5,6,7}$ |

BRANCH ON COUNTER LOW OR EQUAL

If the counter is less than or equal to the absolute value of the field of this instruction, the supervisor will skip over one instruction.

| | GTL | | STL | |
|---|---|---|---|---|
| Field | Columns | Code | Code | Position |
| Opcode | 7–11 | BCL | ,BCL | $C_{1,2,3,4}$ |
| Operand | 13–18 | nnn | nnn | $C_{5,6,7}$ |

BRANCH IF GO INDICATOR ON

A transfer will be made if the last MSUR instruction resulted in a go condition.

| | GTL | | STL | |
|---|---|---|---|---|
| Field | Columns | Code | Code | Position |
| Opcode | 7–11 | BC | ,BFX | $C_{1,2,3,4}$ |
| Operand | 13–18 | ac | aaa | $C_{5,6,7}$ |

BRANCH W FAIL INDICATOR ON

A transfer will be made if the last MSUR instruction turned on the no-go indicator.

| | GTL | | STL | |
|---|---|---|---|---|
| Field | Columns | Code | Code | Position |
| Opcode | 7–11 | BF | ,BFO | $C_{1,2,3,4}$ |
| Operand | 13–18 | ac | aaa | $C_{5,6,7}$ |

BRANCH IF FAIL HIGH

A transfer will be made if the last MSUR instruction turned on the fail high indicator.

| | GTL | | STL | |
|---|---|---|---|---|
| Field | Columns | Code | Code | Position |
| Opcode | 7–11 | BFH | ,BFH | $C_{1,2,3,4}$ |
| Operand | 13–18 | ac | aaa | $C_{5,6,7}$ |

BRANCH IF FAIL LOW

A transfer will be made if the last MSUR instruction turned on the fail low indicator.

| | GTL | | STL | |
|---|---|---|---|---|
| Field | Columns | Code | Code | Position |
| Opcode | 7–11 | BFL | ,BFL | $C_{1,2,3,4}$ |
| Operand | 13–18 | ac | aaa | $C_{5,6,7}$ |

BRANCH UNDER SENSE SWITCH CONTROL

A transfer will be made if the 1401 Sense Switch tested is up.

| | GTL | | STL | |
|---|---|---|---|---|
| Field | Columns | Code | Code | Position |
| Opcode | 7–11 | BSS | ,BS | $C_{1,2,3}$ |
| Operand | 13–18 | ac | aaa | $C_{5,6,7}$ |
| Switch | 19–24 | B,C,D,E,F, or G | B,C,D,E, F, or G | $C_4$ |

COUNTER TO STORAGE

The current contents of the counter will be stored in the operand field of the address location appearing in the operand of this instruction. The numeric portion of the counter will be stored in the address specified, the tens and hundreds portion of the counter will be located at aaa–1 and aaa–2 respectively. Zone bits are not affected.

| | GTL | | STL | |
|---|---|---|---|---|
| Field | Columns | Code | Code | Position |
| Opcode | 7–11 | CTRS | ,CSO | $C_{1,2,3,4}$ |
| Operand | 13–18 | ac | aaa | $C_{5,6,7}$ |

END

This must be the last instruction in every program.*

| | GTL | | STL | |
|---|---|---|---|---|
| Field | Columns | Code | Code | Position |
| Opcode | 7–11 | END | .E00000 | $C_{1,2,3,4,5,6,7}$ |

*The assembler precedes this instruction with a dummy MSUR O instruction to insure supervisor recognition of the END instruction.

EQUIVALENT SYMBOLS

The address field and the operand field are declared to be equivalent symbols. The symbol in the operand field must be a standard GTL symbol; i.e., a system pin number, resistor name, voltage limit, etc. The address field must not be a system reserved symbol. An EQU instruction must occur before any appearance of the symbol in the address field.

| | GTL | | STL |
|---|---|---|---|
| Field | Columns | Code | No Instruction Generated |
| Address | 2–6 | New Symbol | |
| Opcode | 7–11 | EQU | |
| Operand | 13–18 | Old Symbol | |

HALT AND BRANCH

The CPU will stop. When the CPU start button is depressed, a transfer will be made to the location specified in the operand field. The data field is used to identify a particular halt instruction.

| | GTL | | STL | |
|---|---|---|---|---|
| Field | Columns | Code | Code | Position |
| Opcode | 7–11 | HALT | ,H | $C_{1,2}$ |
| Operand | 13–18 | ac | aaa | $C_{5,6,7}$ |
| Data | 19–24 | nn | nn | $C_{3,4}$ |

LOAD COUNTER

The numeric portion of the contents of the operand field are placed in the counter. Zone bits are not affected.

| | GTL | | STL | |
|---|---|---|---|---|
| Field | Columns | Code | Code | Position |
| Opcode | 7–11 | LCTR | ,CL0 | $C_{1,2,3,4}$ |
| Operand | 13–18 | nnn | nnn | $C_{5,6,7}$ |

LOAD NEXT LINK OF PROGRAM

Link *n* of the test program is loaded and a transfer is made to the first location in the link. The link number is a device test number which may be a modification of the main test number.

| | GTL | | STL | |
|---|---|---|---|---|
| Field | Columns | Code | Code | Position |
| Opcode | 7–11 | LINK | ,LO0 | $C_{1,2,3,4}$ |
| Operand | 13–22 | xxx. . . | xxx. . . | $C_{5,6,...14}$ |

MOVE SYSTEM RESPONSE

The last measurement read from the device under test is stored at location aaa–3 to location aca. The zone bits are only set over the units position (location aaa).

| | GTL | | STL | |
|---|---|---|---|---|
| Field | Columns | Code | Code | Position |
| Opcode | 7–11 | MVR | ,MO0 | $C_{1,2,3,4}$ |
| Operand | 13–18 | ac | aaa | $C_{5,6,7}$ |

ASSIGN DEVICE TEST

Allows the designation of device test number to the program. This must be the first instruction in the program. The device test number must be left justified in the operand field and must contain no blanks. A maximum of 10 characters are allowed.

| | GTL | | STL | |
|---|---|---|---|---|
| Field | Columns | Code | Code | Position |
| Opcode | 7–11 | PRTNO | ,PO0 | $C_{1,2,3,4}$ |
| Operand | 13–22 | xxx. . . | xxx. . . | $C_{5,6,...14}$ |

ASSIGN TEST NUMBER

The portion of the program following the TEST instruction 15, declared to be test nnnnn. All MSUR instructions within test nnnnn will be sequenced starting from 1.

| | GTL | | STL | |
|---|---|---|---|---|
| Field | Columns | Code | Code | Position |
| Opcode | 7–11 | TEST | ,T | $C_{1,2}$ |
| Operand | 13–18 | nnnnn | nnnnn | $C_{3,4,5,6,7}$ |

SYMBOLIC ADDRESS CONSTANTS

A symbolic address can be written in the following forms:

| Symbol* | Description |
|---|---|
| nnnnn | Unsigned decimal number. This refers to an absolute point in the STL program. |
| ±nnnnn | Signed decimal number. This refers to an absolute point in the STL program. If the sign is minus, location 16000–nnnn is used. |
| aaaa±n | Symbol reference. The symbol aaaa refers to the location of an instruction which has previously appeared in the program. |
| *(±)nnnn | Relative decimal number. This refers to a point in the STL program location ±nnnn relative to the address of the first character of the instruction in which it is used. The asterisk before the number designates relative addressing. |

*The total number of characters defining the symbolic address must not exceed six.

Supervisor program is a selective-type program which performs only those services that are survey requested by the operator. These services may be requested by inserting control cards into a card reader or by instructions via the keyboard control unit prior to initiation of the testing operation. Examples of control instructions are:

REPEAT
RECORD ALL
DATA ON TAPE, PRINTER
DATA OFF
CHANGE aaa to XXXXXX
START and in general execute the instructions of a test program, including processing within computer 5 and transmission of appropriate portions of the test program to the analog subsection 3 through the I/O interface subassembly 2. Upon completion of the test program, the supervisor program generally turns control over to a program called "Monitor." By use of the supervisor program, the operator can cause the test system to record output data on tape, record only GO/NO-GO data, print all output data, print all output data, print only GO/NO-GO data and execute a program from cards, and execute a program without data logging. The contents of the supervisor program are shown to be contained in the portion of the first storage or tape unit 325 identified as 346.

Figure 18A:
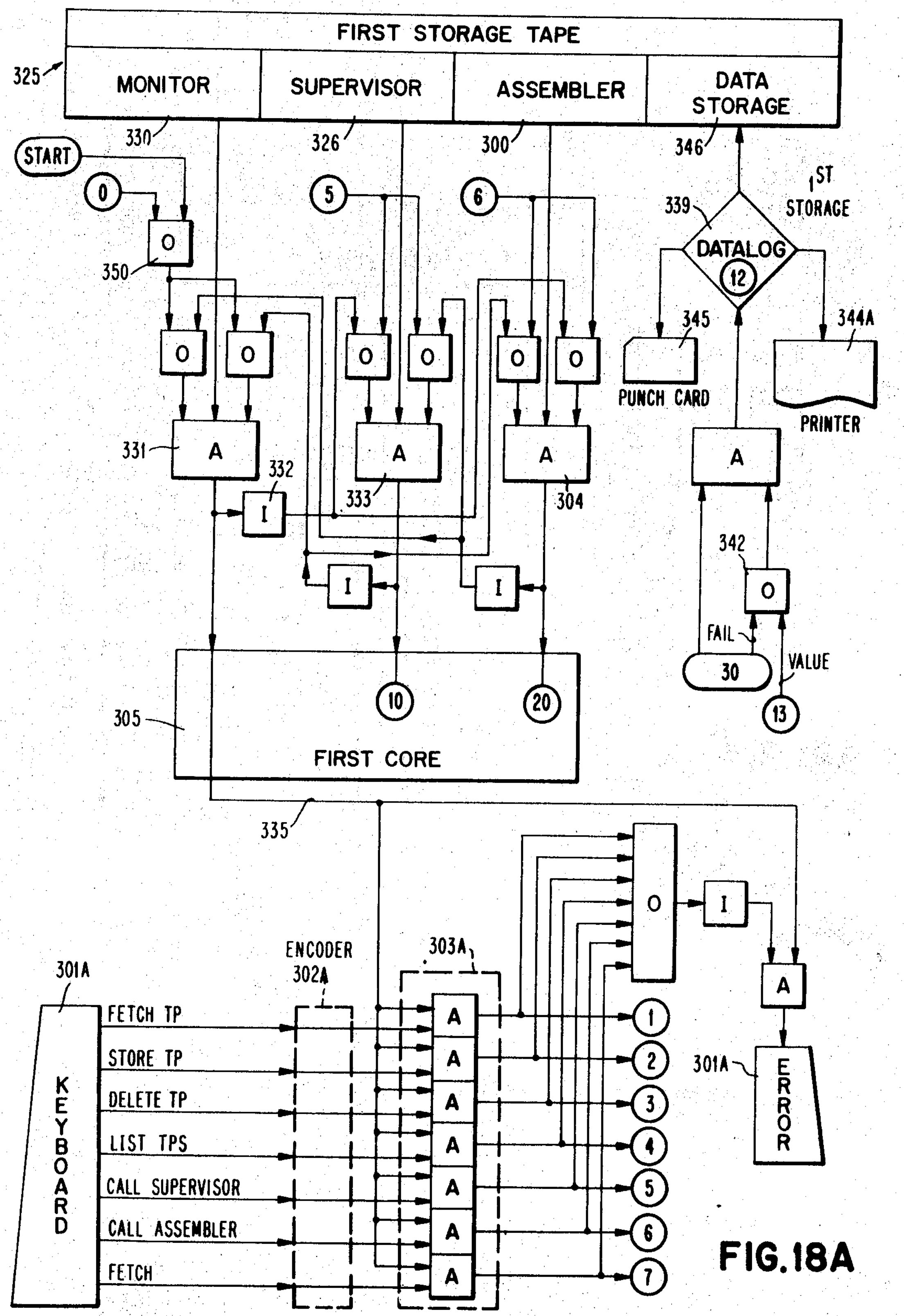
FIGS. 18A–18E illustrate the logic organization and flow in the test system of this invention.

The third or "monitor" subprogram calls in any of the system's programs, and turns control over to the program called. At the completion of the test program, or as directed by keyboard 301B, control is turned back to the monitor program. Any sequence of tests start with the monitor subprogram which then calls in the supervisor subprogram for executing the actual test program. In FIG. 18A, the storage of the monitor program is located in the section 330 of the first storage tape 325.

To initiate tests, the button "Start" (FIG. 18A) is pressed to the AND-circuit 331 (through the OR circuit 350) to load the monitor program in the first core storage 305, with appropriate signal through invert circuit 332 to inhibit the AND-circuits 333 and 304, and thus prevent access of the supervisor and assembly subprograms into the core storage 305 and also disabling entry on lines (11) to (18) and (21) to (23) while the monitor subprogram is in operation. Only one of the subprograms may reside in core storage 305 at one time.

Concurrently, loading of the monitor subprogram into core storage 305 activates line 335 which is inputted to each of the AND gates in the AND-matrix 303A thus allowing entry of any commands involving the monitor. With the monitor subprogram in core storage 305, the appropriate test program for a specific device to be tested may be brought in at the keyboard 301A by typing in the appropriate identification thereof which will activate the line (1) to open the AND-gate 336 (FIG. 18B) and thus bring in the test program from its storage on the disc pack. Information on line (1) is also set in the index matrix 318A allowing the selection of the proper test program. In this manner, the selected test program is loaded into the second core storage 337.

It is noted, that the test program can be loaded in this second core storage 337 from cards 340 containing the instructions in suitable system test language through the AND-circuit 341 to which is also inputted, via line seven (7) a "-FETCH" instruction from the keyboard control 301A (FIG. 18A).

Deletion of a test program from the disc storage 318, if desired, can be effected by activation of the "DELETE" instruction, line (3) at keyboard 301A which is inputted to the index matrix 318A (of the disc storage or pack 318) which restructures the matrix so as to delete the address therein of the test program indicated. In this respect, it is noted that although the specific test program still exists on the disc pack 318, access to it prevented in view of the deletion oı its address in the index matrix 318A. If a printout of all test programs is desired, a corresponding instruction "LIST TPS" at keyboard 310A brings up line four (4) to the AND-circuit 342, to list output of all the test programs together with their cross-references by which access to the test programs can be obtained. The flow of the test program list is through the second core storage 337 to a printer generally indicated as 344B on FIG. 18B.

In order to complete the flow of the test programs between the disc storage 318 and the second core storage 337, (FIG. 18B), any test program in the second core storage 337 (whether from the disc pack 318 or a new test program from cards 340), can be returned to the disc storage by activation of line two (2) by an appropriate instruction "STORE TP" at keyboard control 301A. If the test program in core storage 337 constitutes a new program from cards 340, the appropriate address thereof is loaded in the first empty section in the index matrix 318A and the test instructions of the program are loaded in the disc storage 318 in proper correlation to its address section in the matrix 318A. Where the address section in the index matrix 318A constitutes a previously deleted test program, the loading of this new test program will overlay the previous test program located in the associated section of the disc storage 318 proper.

Figure 18B:
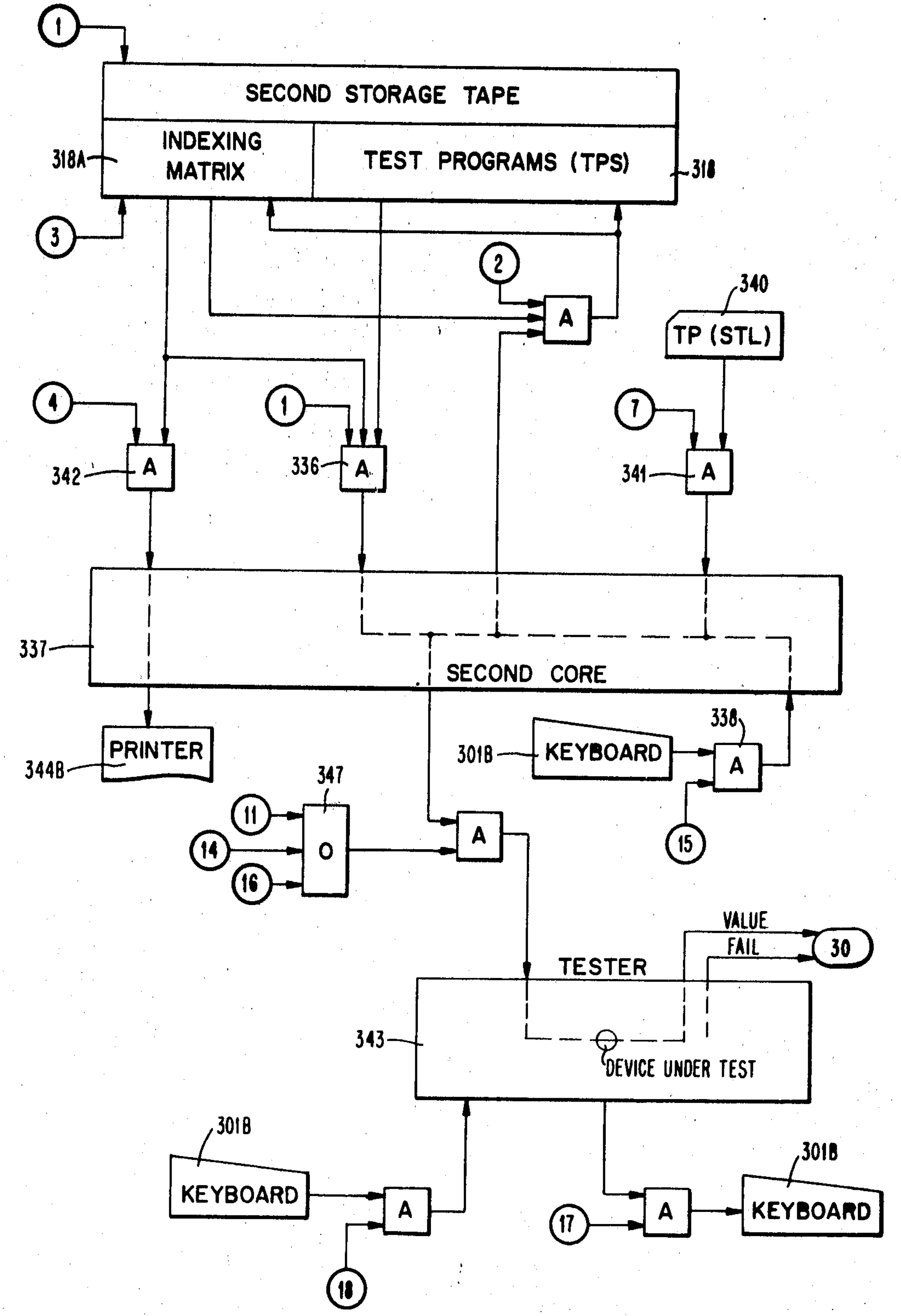
Figure 18C:
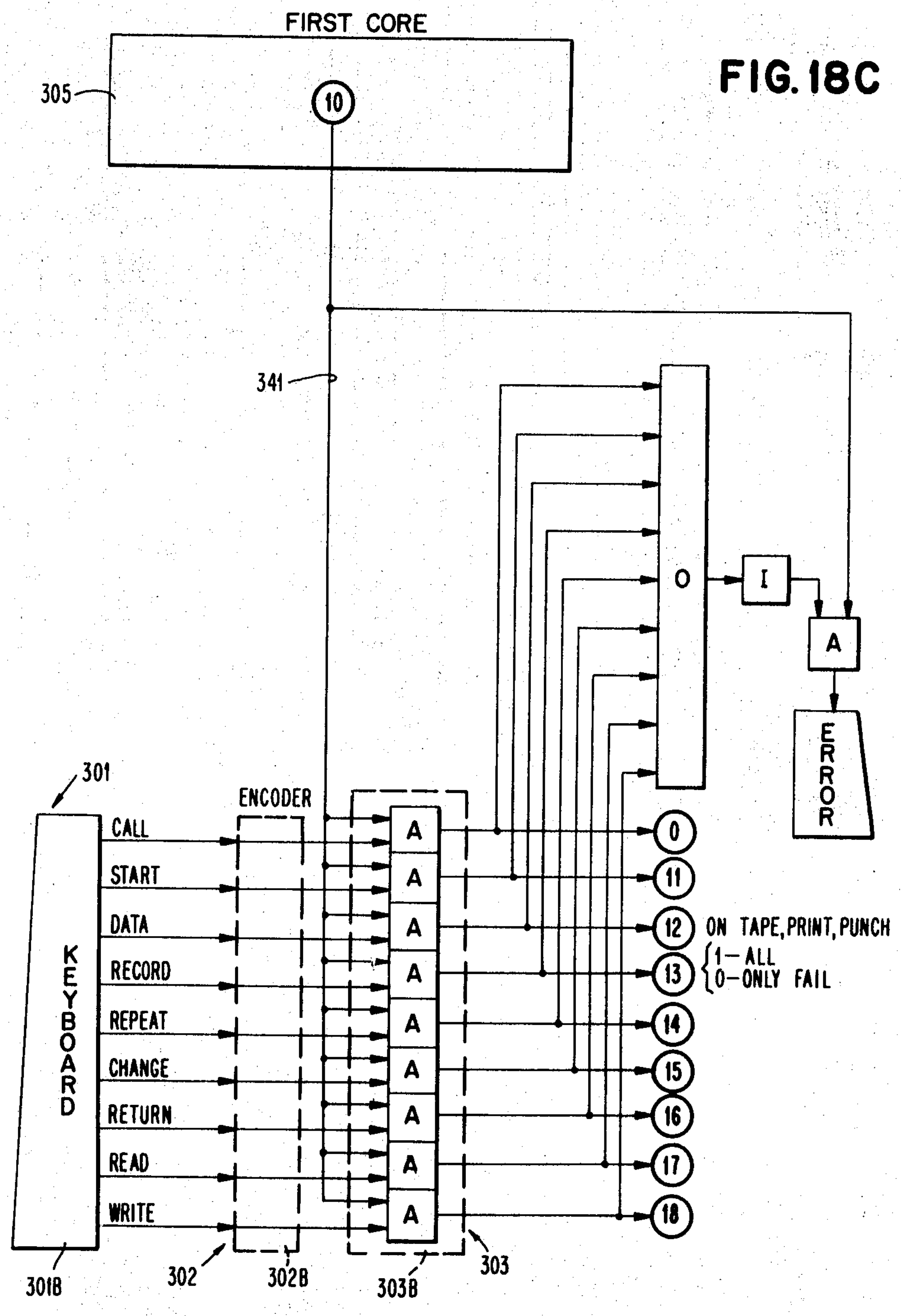
Figure 18D:
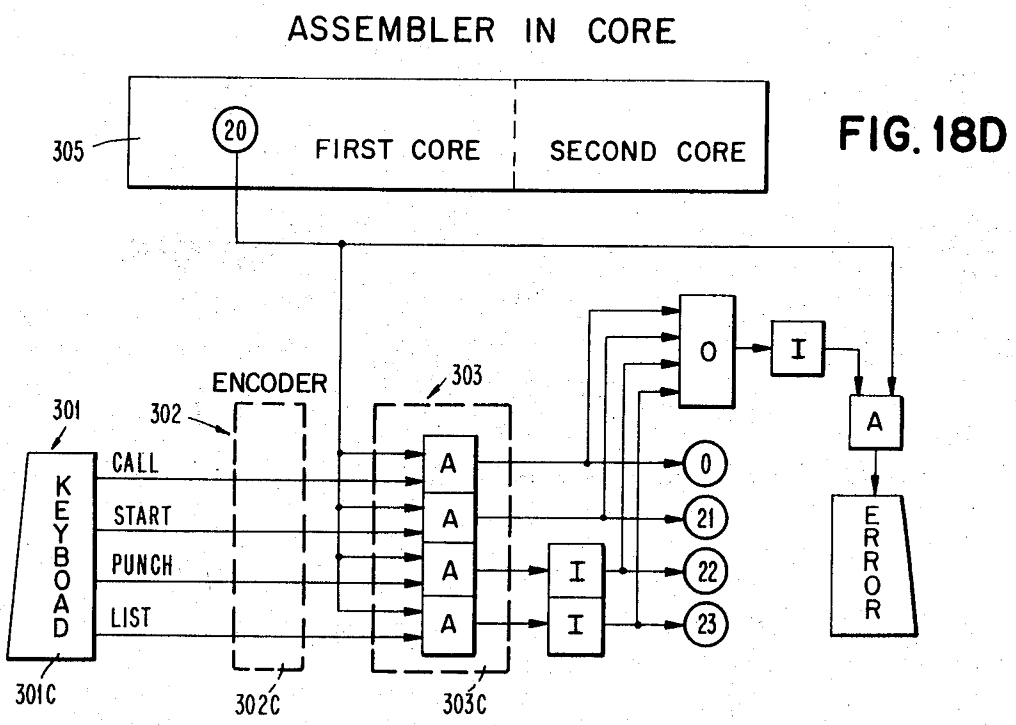
Figure 18E:
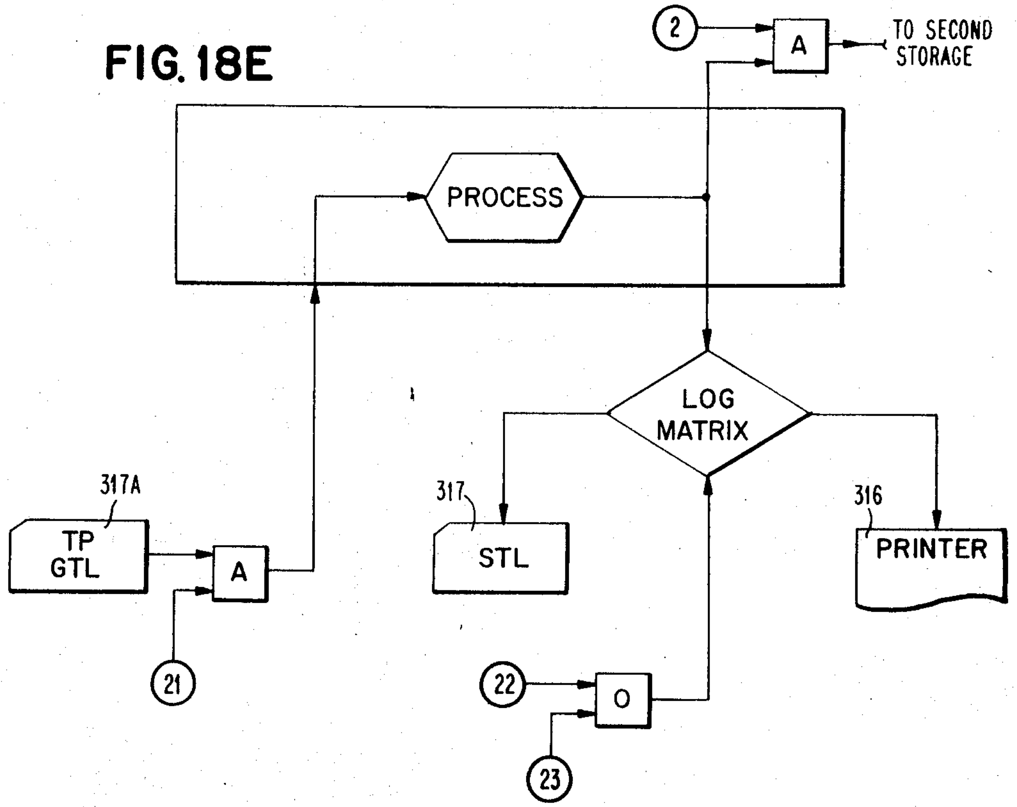

After the loading of the desired test program into the second core storage 337, the supervisor is overlayed over the monitor program in first core storage 305 by a "CALL SUPERVISOR" instruction at keyboard 310A which will activate line five (5) to the AND-circuit 333. The contents of the supervisor program in core storage 305 are identified by the ten (10) (FIGS. 18A and 18C). As will be noted on FIG. 18C, loading of the supervisor program in the first core storage 305 activates the common input line 341 to the AND circuits in matrix 303B and disables entry of commands in matrix 303A and 303C by tying down the output of AND-circuits 331 and 304 (FIG. 18A).

With the supervisor program in core storage 305, various modification in the format thereof or in the individual test instructions can be made by activation of the AND-circuit 338 to which is inputted, via line (15) a "CHANGE" instruction on keyboard 301B (FIG. 18C) and the desired modifications therein, as indicated by the keyboard symbol 301D. Selection of the type of test results desired for recording can be made by an appropriate "RECORD" instruction at keyboard 301B which can specify whether all test results are desired or only the fail results, simply by setting the line (13) (FIG. 18C) to either zero or one, which level is inputted to the OR-circuit 342 (FIG. 18A) together with any fail results of a test, e.g., via line (30) from the test device at the tester 343 (FIG. 18B).

The medium in which the test results are to be outputted from the system can be selected by the "DATA" instruction at keyboard 301B which can cause data logging to be outputted on a printer 344A, punch unit 345, or on the tape 325 in section 346 thereof. The selection is channeled on line twelve (12) to the data log matrix 339 shown in FIG. 18A.

If direct access to the analog section 3 is desired for any purpose, as for example, direct modification of the programmed levels of the power supply therein, this can be accomplished by the "WRITE" instruction at keyboard 301B while the status of the analog section 3 can be directly outputted to the keyboard by the "READ" instruction at keyboard control 301B. A recycling of a current test program in core storage 305 can be effected by the "REPEAT" instruction at keyboard control 301B which brings up the output of the OR-Circuit 347 automatically at the end of every test program, thereby restarting it. Also inputted to the OR-circuit 347 are the keyboard 301B instructions "START" and "RETURN." The "RETURN." instruction permits the operator to make provisional modifications in the tester via the "CHANGE" or "WRITE" instruction at keyboard control 301B, and then return to the interrupted portion of the test program by the "RETURN" instruction.

Also, with supervisor in the first core 305, the monitor can be overlayed over this supervisor program by the "CALL" instruction at keyboard 301B which activates the (0) line to the OR-circuit 350.

Illustration of the foregoing description of the test system is given in the following example, in which the analog section 3 is considered, for purposes of this discussion and examples, a large switch matrix, composed of both electromechanical switches (relays) an solid-state switches (operational amplifiers, gates, etc.). As will be understood, these switches required a "settling" time to assure correct levels for a measurement, and in the case of the relays, require power off so that the contacts are open and closed in a "dry" or no-current state. In general, the test instructions which effect the electromechanical switch operation are the "CONNECT" (CNCT), "CONTROL" (CTRL), and "SET LEVEL" (SET) instructions. These instructions are implemented only during a power-off state. The specific instructions for this example are shown in card format on FIG. 19A which illustrates the general test language format and usage. The test program shown in the drawing is discussed below.

| Line No. | Comments |
|---|---|
| 1 | A supervisor instruction which must introduce every program. |
| 2 | A supervisor instruction discussed below. |

3 Resets all registers in the analog subassembly 2. The reset instruction, by setting the registers to zero, turns off the service voltage supplies (V1-V2) and level supplies (V5-V8). The w in the 12 column calls for a test "Wait" condition to provide sufficient time for all voltages to reset before changing the status of the switches. A "Wait" is necessary when power is turned on (line 13) or off (lines 3 and 24) and just prior to power ON. A "Wait" is also necessary just prior to a measurement (line 19).

4 Sets the programmable power supply V1 to +5 mv.

5 Sets the programmable power supply V2 to −3000 mv.

6 Sets the most negative (MN) level of the programmable power supply 5 to −3,000 mv.

7 Sets the least positive (LP) level at programmable power supply 6 to +5 mv. The SET power supply instructions to (V1–V4) and set level instructions MN (most negative), LN (least negative), MP (most positive) and LP (least positive) instructions take one field of the meric data ranging from 0000 to 9999 mv. The assembler reads the fields in numerical sequence and completes the instructions at the first data field. Thus, all data is entered from left to right. However, within the field itself, the data is not necessary to be right or left justified. All SET data is positive unless preceded by a negative sign as in lines 5 and 6. Lines 4 and 7 are two different illustrations of programming a positive 5 mv.

8 Connects pin 1 to a driver.

9 Connects pin 2 to a driver. The CNCT (connect) instructions placing drivers on pins 1 and 2 permit high speed level switching to the pins designated in the operand field. Any pin which is to have level inputs must be connected to a driver.

10 Connects pin 3 to the programmable power supply V1.

11 Connects pin 4 to the programmable power supply V2. Pins 3 and 4 are connected to 0.005 v. and −3 v., respectively. If any other pin requires one of these service levels, programmable voltage supplies V3 and/or V4 should be implemented to insure that each service supply is applied to only one pin at a time.

12 Connects system to ground power supply reference and digital voltmeter return to pin 5. It should be noted that a CNCT (connect) instruction to a pin without any data will remove all previous connections to the pin.

13 Turns on the programmable service voltages (V1–V4) and the level reference voltage supplies (V5–V8).

14 Sets the most positive limit (MPLIM) to +7 mv.

15 Sets the least positive limit (LPLIM) to +3 mv.

16 Sets the most negative limit (MNLIM) to lines 3003 mv.

17 Sets least negative limit (LNLIM) to −2997 mv.

18 Applies the most negative (MN) level to pin 1.

19 Applies the least positive (LP) level to pin 2.

20 Measures pin 1 for a logical "zero."

21 Measures pin 2 for a logical "one."

22 Measures pin 3 for a logical one.

23 Measures pin 4 for a logical zero. The SET limits LEV (apply level) and measure and compare instructions are all accomplished through solid state switches, and as such can be implemented after the supplies are turned on. However, there is a wait in the instruction preceding the first measure instruction. If the preceding instruction was a LEV, the LEV must be the highest digit of the highest decade: e.g., if LEVs are to be applied to pins 37, 11, 18, 12, 48, 9, 6 and 30 prior to measuring an output pin, the LEV immediately preceding the MSUR instruction must be LEV W 48. The order of the preceding LEVs is immaterial. A Wait (W) must be part of the instructions since it precedes a measure. During encoding of the general test language to the systems test language, the assembler program bunches the LEVs into groups of ten and during the program, the entire group is executed prior to a measure instruction. If it is desired to assemble a single LEV of a decade for immediate execution via a special ILEV instruction is employed.

The measure instruction indicates means of the operand field, which pin to connect to the positive side of the digital voltmeter. The first data field takes either a one (1) or a zero (0) depending upon whether the digital voltmeter should fall within the Most Positive Limit and Least Positive Limit (i.e., a logical one) or the Most Negative Limit and Least Negative Limit (i.e., a logical zero). The comparison between the digital voltmeter reading and limits occur for each measurement, and thereby requires a one or zero in the first data field of the measure instruction. If the measurement does not fall within limits, the printout will denote a FAIL HIGH or FAIL LOW, e.g., if the MSUR on pin 1 reads −3004, it would have adjacent to it a FAIL LOW tag, similarly if the MSUR on pin 2 reads 0009 it would be tagged with a FAIL HIGH. If it is desired to label the printout in the measure number column with a designation other than the print number; the second field is filled in e.g., lines 20–23 would print in the measure columns:

01MN
0002
0003
04 respectively, where as will be noted, each readout has four characters. If only three characters are filled in the second field, as in line 23, the fourth character in the most significant position is filled in as a zero.

24 Turns off the programmable power supplies V1 through V8.

25 Informs the supervisor that the test is ended, and CTRL WALLOFF(Wait all off) End are always the last instructions of a program.

In the sample program discussed, voltages were measured at four pins and the example is intended as an illustration of all general test language instructions applicable to the test system. An exception to the common instruction usage is the case whereby a current is to be measured. Since the test system uses a digital voltmeter for measurements, a resistance of known value is inserted in the current path and a voltage across the resistor is measured, indicating the current flow. The sequence of instructions (using pin 6 as an example) would be as follows:

| | | | | |
|---|---|---|---|---|
| CTRL | WALLOFF | | | |
| CNCT | W6 | RI | W2 | DVMR* |
| CTRL | WALLON | | | |
| MSUR | 6 | 1 | 06UA | |

*digital voltmeter return.

These foregoing instructions cause the test system to apply the programmable voltage V2 to resistor R1 from the resistor matrix 165 (FIG. 4). The DVMR (digital voltmeter return line) in the third data field tells the test system to connect the digital voltmeter return to the resistor which is normally selected to be 1k. value. The last instruction connects the positive lead of the digital voltmeter to pin 6, which is the other side of the resistor. The digital voltmeter reading is normally read in millivolts, and for this reason the 06UA printout adjacent to the digital voltmeter denotes a microamphere reading at pin 6. If it is desired to tie pins 6 and 7 together and then measure their current, the instruction sequence would be as follows:

| | | | | | |
|---|---|---|---|---|---|
| CTRL | WALLOFF | | | | |
| CNCT | 6 | BUS 1 | | | |
| CNCT | 7 | BUS 1 | | | |
| CNCT | 7 | BUS 1 | | | |
| CNCT | 25 | BUS 1 | DVR | R7 | DVMR |
| CTRL | WALLON | | | | |
| LEV | W25 | MN | | | |
| MSUR | 25 | 0 | 06MA | | |

These foregoing instructions apply a level (MN, e.g., most negative) through a resistor (R7) to an unused pin (pin 25) which is then bussed (bus 1) to pins 6 and 7. If R7 is assumed to be one, then the digital voltmeter readout of millivolts will imply milliamps. The 06MA in the second data field of the MSUR instructions will print out accordingly. The CNCT's to pin 25 use all four data fields of the instruction.

As indicated above, the supervisor program, as its name implies, supervises or oversees the execution of a program assembled in the system test language. As such, the supervisor program "inspects" each instruction and determines whether it should be passed on to the analog section 3 directly, or acted upon in the computer 5 and then passed on to the analog section 3. The supervisor also controls the flow of data at the various data recorders (printers, punch, tape) associated with the system.

As previously indicated, the PRTNO (test number), TEST and END instructions are instructions which the supervisor requires in order to "run" the system properly. It is believed that the foregoing function of the supervisor is illustrated in the following two additional examples:

EXAMPLE 2

In this example the difference in voltage output readings is measured when inputs to a device (e.g., an integrated logic circuit) are turned on in sequence. The program illustrated in FIG. 19B accomplishes this by using the results of a MSUR instruction to program an unused power supply. In this case, the measurement, (line 13) is moved by the MVR instruction (line 14) to set the programmable supply V3 (line 17). This particular set V3 instruction in general test language is converted by the assemble into seven (system test language) characters. In this regard, it is noted that all general test language instructions are assembled in seven characters except the control (CTRL) instruction which is assembled into 3 characters. The last four characters of each instruction are the data which sets V3. The symbolic labels (in this case A) always take the address of the first character. Thus, the instruction:

MVR A+6 takes the digital voltmeter reading and places it in the least significant digit portion which sets V3. The more significant digits (A+5, A+4, A+3) are filled in automatically. The digital voltmeter return is then removed from pin 3 (line 18) by means of a special connect instruction CNCTF (illustrated in FIG. 19B-*a*). This permits the removal of a specific item from a pin without disturbing any other connections to that pin. In this case, GND (ground) and REF (reference potential) remain connected to pin 3. The digital voltmeter return is connected to pin 1 by the special connect instruction CNCTN which connects a specific item to a pin without disturbing any previous connections. Thus, the drive (line 6) remains connected to pin 1. If the instruction:

CNCT 1 DVM was used, then the DVR (driver) would have been inadvertently disconnected from the pin. With the digital voltmeter between pins 1 and 2 (with reference to FIG. 19B–*b*) the reading is the difference between MP (800 mv.) used to program the power supply V3 and the LP (600 mv.) applied to pin 1. The instructions to terminate the program, "CTRL base,""-WALLOFF" and "END" are not shown.

EXAMPLE 3

In this example, a base current is measured which requires a minimum $V_{be}$ of 730 mv. If the base is open, the applied voltage is not to exceed 900 mv. This example, for which the instructions in general test language are shown in FIG. 19C, is one test used for monolithic devices. The test is labeled 01501, Test 15 (015), current flow (01). In operation, the program applies a voltage (V3) through a resistor R5 to a transistor base (pin 1). The base voltage (to ground) is monitored and when the minimum level (230 mv.) is reached, the digital voltmeter is placed across the resistor and the digital voltmeter output denoting microamperes is recorded. In the event that the program is recycled, the power supply V3 has to be restored to its initial state of 730 mv. This is accomplished by the second and third instructions. Since the power supply increments are 10 mv. and is not to exceed 900 mv., the counter is set to 17 (Line 4 ). After the proper limit settings and connects, the voltage between base (pin 1) and ground (pin 16) is measured and compared to the most positive and least positive limits. If it fails low (BFL) the supervisor suppresses the printout of the measurement (with a BFL instruction) and branches to the location of the 14th succeeding characters from the first assembled character of the BFL instruction. Since the BFL (Branch Fail Low) and B (Branch) instructions are assembled into seven characters each, the next instruction operated on by the supervisor is the ADD on Line 17. This instruction adds 10 mv. to the setting of the programmable voltage V3. As in the preceding example for the MVR instruction, the ADD instruction needs only be addressed to the least significant system test language character (A+6), the most significant digits are automatically carried. If the counter is not zero, the BCL (branch counter low) instruction is now implemented. The BC (branch under counter) instruction then decrements the counter contents by one and branches back to the SET instruction and the process is repeated. If the counter reaches zero, (i.e., V3 is set to 900 mv.) or the measure of a "1" at pin 1 doesn't fail, the supervisor branches to C (line 20). These last instructions move the digital voltmeter across the resistor to measure the base current.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An autoranging system for a digital voltmeter providing an output value signal of a current analog input value and having a plurality of drive lines corresponding to and controlling the operative ranges of said digital voltmeter comprising:

A. a comparator means including
   a. a first means for determination of the presence of decimal 9 values in all of the digits in the output value signal of said digital voltmeter and providing an up-range signal in the event of an occurrence of said decimal 9 values and
   b. a second means for determining the presence of a decimal 0 value in the most significant digit of the output value signal of said digital voltmeter and providing a down-range signal in the event of an occurrence of said decimal 0; and
B. means responsive to said comparator means for comparing the current range status of said drive lines with each of said up-range and down-range signals and for
   a. up-ranging said digital voltmeter in the event of non-concurrence of the current range with said up-range signal, and
   b. down-ranging said digital voltmeter in the event of non-concurrence of the current range with the down-range signal; and wherein
C. said switching means normally connects one of said drive lines of said digital voltmeter and including
D. an override control means including
   a. a first control means normally providing a first positive signal passive to said autoranging circuit,
   b. a second control means normally providing a second positive signal passive to said autoranging system, and
   c. select means for optionally converting one of said first and second positive signals to, respectively,
      i. a first negative override signal for selection of and maintaining connection of said one drive line of said digital voltmeter, and
      ii. a second negative override signal for selection of and maintaining connection of another of said drive lines of said digital voltmeter irrespective of the decision of said autoranging system;
E. a first override AND/INVERT logic circuit means having
   a. a first input connected to the range select line corresponding to the other of said drive lines, and
   b. a second input connected to said first control means and responsive to said first override signal;

F. a second override AND/INVERT logic circuit means having a. first input connected to the output of said first override AND/INVERT logic circuit, b. a second input connected to said second control means and responsive to said second override signal, and c. providing a switch signal in the event of a coincidence of said second override signal with the output of said first override AND/INVERT logic circuit means; and G. drive means responsive to said switch signal for actuation of said switching means to connect the other of said drive lines of said digital voltmeter.

2. An autoranging system for a digital voltmeter providing an output value signal of a current analog input value and having a plurality of drive lines corresponding to and controlling the operative ranges of said digital voltmeter comprising:

A. a comparator means including a. a first means for determination of the presence of decimal 9 values in all of the digits in the output value signal of said digital voltmeter and providing an up-range signal in the event of an occurrence of said decimal 9 values and b. a second means for determining the presence of a decimal 0 value in the most significant digit of the output value signal of said digital voltmeter and providing a down-range signal in the event of an occurrence of said decimal 0; and B. means responsive to said comparator means for comparing the current range status of said drive lines with each of said up-range and down-range signals and for a. up-ranging said digital voltmeter in the event of non-concurrence of the current range with said up-range signal, and b. down-ranging said digital voltmeter in the event of non-concurrence of the current range with the down-range signal; and wherein C. said switching means normally connecting one of said 1× and 10× drive lines of said digital voltmeter;

D. an override control means for optionally providing one of a. a first negative override signal for maintaining connection of said one-drive line of said digital voltmeter, and b. a second negative override signal for maintaining connection of the other of said drive lines of said digital voltmeter;

E. a first override AND/INVERT logic circuit means having a. a first input connected to the range select line corresponding to the other of said drive lines, and b. a second input responsive to said first override signal;

F. a second override AND/INVERT logic circuit means having a. a first input connected to the output of said first override AND/INVERT logic circuit means, b. a second input responsive to said second override signal, and c. providing a switch signal in the event of coincidence of said second override signal with the output of said first override AND/INVERT logic circuit means; and G. drive means for actuation of said switch means in response to said switch signal to connect the other of said drive lines of said digital voltmeter.

3. An autoranging system for a digital voltmeter providing an output value signal of a current analog input value and having a plurality of drive lines corresponding to the 1× and 10× operative ranges of said digital voltmeter comprising:

A. a comparator means including a. a first means for determination of the presence of a decimal 9 value and all of the digits in the output value signal of said digital voltmeter and providing an up-range signal in the event of the occurrence of said decimal 9 values and b. a second means for determining the presence of a decimal 0 value in the most significant digit of the output value signal of said digital voltmeter and providing a down-range signal in the event of an occurrence of said decimal 0; and B. means responsive to said comparator means for comparing the current range status of said 1× and 10× drive lines with each of said up-range and down-range signals and for a. up-ranging said digital voltmeter in the event of non-concurrence of the current range with the up-range signal, and b. down-ranging said digital voltmeter in the event of non-concurrence of the current range with the down-range signal; and wherein C. said switching means normally connects one of said 1× and 10× drive lines of said digital voltmeter and including D. an override control means including a. a first control means normally providing a first positive signal passive to said autoranging circuit, b. a second control means normally providing a second positive signal passive to said autoranging system, and c. select means for optionally converting one of said first and second positive signals to, respectively, i. a first negative override signal for selection of and maintaining connection of said one drive line of said digital voltmeter, and ii. a second negative override signal for selection of and maintaining connection of the other of said drive lines of said digital voltmeter irrespective of the decision of said autoranging system;

E. a first override AND/INVERT logic circuit means having a. a first input connected to the range select line corresponding to the other of said drive lines, and b. a second input connected to said first control means and responsive to said first override signal;

F. a second override AND/INVERT logic circuit means having a. first input connected to the output of said first override AND/INVERT logic circuit, b. a second input connected to said second control means and responsive to said second override signal, and c. providing a switch signal in the event of a coincidence of said second override signal with the output of said first override AND/INVERT-logic circuit means; and G. drive means responsive to said switch signal for actuation of said switching means to connect the other of said drive lines of said digital voltmeter.

4. An autoranging system for a digital voltmeter providing an output value signal of a current analog input value and having a plurality of drive lines corresponding to the 1× and 10× operative ranges of said digital voltmeter comprising:

A. a comparator means including a. a first means for determination of the presence of a decimal 9 value and all of the digits in the output value signal of said digital voltmeter and providing an up-range signal in the event of the occurrence of said decimal 9 valves and b. a second means for determining the presence of a decimal 0 valve in the most significant digit of the output value signal of said digital voltmeter and providing a down-range signal in the event of an occurrence of said decimal 0; and B. means responsive to said comparator means for comparing the current range status of said 1× and 10× drive lines with each of said up-range and down-range signals and for a. up-ranging said digital voltmeter in the event of non-concurrence of the current range with the up-range signal, and b. down-ranging said digital voltmeter in the event of non-concurrence of the current range with the down-range signal; and wherein C. said switching means normally connecting one of said 1× and 10× drive lines of said digital voltmeter;

D. an override control means for optionally providing one of a. a first negative override signal for maintaining connection of said one-drive line of said digital voltmeter, and
b. a second negative override signal for maintaining connection of the other of said drive lines of said digital voltmeter;
E. a first override AND/INVERT logic circuit means having
a. a first input connected to the range select line corresponding to the other of said drive lines, and
b. a second input responsive to said first override signal;
F. a second override AND/INVERT logic circuit means having
a. a first input connected to the output of said first override AND/INVERT logic circuit means,
b. a second input responsive to said second override signal, and
c. providing a switch signal in the event of coincidence of said second override signal with the output of said first override AND/INVERT logic circuit means; and
G. drive means for actuation of said switch means in response to said switch signal to connect the other of said drive lines of said digital voltmeter.

5. An autoranging system for digital voltmeters providing an output value signal of a current analog input value and having a plurality of drive lines corresponding to the operative ranges of said digital voltmeter comprising:
A. first means for determining the presence of 8 and 1 bits in each of the digits of the output value signal of said digital voltmeter and providing an up-range signal in the event of an occurrence of both said 8 and 1 bits in all of the said digits in said output value signal;
B. a second means for comparing said digital voltmeter for the absence of 8,4,2 and 1 bits in the most significant digit in the output value signal of said digital voltmeter and providing a down-range signal in the absence of said 8,4,2 and 1 bits in said most significant digit;
C. means for comparing the current range status of said drive lines with each of said up-range and down-range signals and for
a. up-ranging said digital voltmeter in the event of nonconcurrence of the current range with said up-range signal, and
b. down-ranging said digital voltmeter in the event of nonconcurrence of the current range with the down-range signal; and wherein
D. said switching means normally connects one of said 1× and 10× drive lines of said digital voltmeter and including
E. an override control means including
a. a first control means normally providing a first positive signal passive to said autoranging circuit,
b. a second control means normally providing a second positive signal passive to said autoranging system, and
c. select means for optionally converting one of said first and second positive signals to, respectively,
i. a first negative override signal for selection of and maintaining connection of said one drive line of said digital voltmeter, and
ii. a second negative override signal for selection of and maintaining connection of the other of said drive lines of said digital voltmeter irrespective of the decision of said autoranging system;
F. a first override AND/INVERT logic circuit means having
a. a first input connected to the range select line corresponding to the other of said drive lines, and
b. a second input connected to said first control means and responsive to said first override signal;
G. a second override AND/INVERT logic circuit means having
a. first input connected to the output of said first override AND/INVERT logic circuit,
b. a second input connected to said second control means and responsive to said second override signal, and
c. providing a switch signal in the event of a coincidence of said second override signal with the output of said first override AND/INVERT logic circuit means; and
H. drive means responsive to said switch signal for actuation of said switching means to connect the other of said drive lines of said digital voltmeter.

6. An autoranging system for digital voltmeters providing an output value signal of a current analog input value and having a plurality of drive lines corresponding to the operative ranges of said digital voltmeter comprising:
A. first means for determining the presence of 8 and 1 bits in each of the digits of the output value signal of said digital voltmeter and providing an up-range signal in the event of an occurrence of both said 8 and 1 bits in all of the said digits in said output value signal;
B. a second means for comparing said digital voltmeter for the absence of 8,4,2 and 1 bits in the most significant digit in the output value signal of said digital voltmeter and providing a down-range signal in the absence of said 8,4,2 and 1 bits in said most significant digit;
C. means for comparing the current range status of said drive lines with each of said up-range and down-range signals and for
a. up-ranging said digital voltmeter in the event of nonconcurrence of the current range with said up-range signal, and
b. down-ranging said digital voltmeter in the event of nonconcurrence of the current range with the down-range signal; and wherein
D. said switching means normally connecting one of said 1× and 10× drive lines of said digital voltmeter; and including
E. an override control means for optionally providing one of
a. a first negative override signal for maintaining connection of said one-drive line of said digital voltmeter, and
b. a second negative override signal for maintaining connection of the other of said drive lines of said digital voltmeter;
F. a first override AND/INVERT logic circuit means having
a. a first input connected to the range select line corresponding to the other of said drive lines, and
b. a second input responsive to said first negative override signal;
G. a second override AND/INVERT logic circuit means having
a. a first input connected to the output of said first override AND/INVERT logic circuit means,
b. a second input responsive to said second negative override signal, and
c. providing a switch signal in the event of coincidence of said second override signal with the output of said first override AND/INVERT logic circuit means; and
H. drive means for actuation of said switch means in response to said switch signal to connect the other of said drive lines of said digital voltmeter.

7. An autoranging system for a digital voltmeter providing a digital output value signal of a current analog input value and having a 1× drive line and 10× drive line corresponding to and controlling the operative ranges of said digital voltmeter comprising:
A. an up-range AND/INVERT-logic circuit means having inputs connected to be responsive to the 8 and 1 bits in each of the decimal digits in said output value signal of said digital voltmeter and providing a first output signal in the event of the absence of both said 8 and 1 bits in each said decimal digits;
B. an up-range INVERT logic circuit means having an input connected to the output of said up-range first AND/INVERT-logic circuit means;
C. a second up-range AND/INVERT-logic circuit means;
D. a third up-rqnge AND/INVERT-logic circuit means having an output defining 10× select line;
E. a down-range first AND/INVERT logic circuit means connected to the responsive to the complements of the 8, 4, 2 and 1 bits in the most significant digits in the output value of said digital voltmeter and providing a second output signal in the event of the absence of the said complements of the 8, 4, 2 and 1 bits on said most significant decimal digit;

F. a down-range INVERT logic circuit means having its input connected to the output of said down-range first AND/INVERT logic circuit means;

G. a down-range second AND/INVERT logic circuit means;

H. a down-range third AND/INVERT logic circuit means having an output defining a 1× select line;

I. said second up-range AND/INVERT logic circuit means having its inputs connected to said 1× select line and to the output of said up-range INVERT logic circuit means;

J. said up-range third AND/INVERT logic circuit means having inputs connected to said 1× select line and to the output of said up-range second AND/INVERT logic circuit means;

K. said down-range second AND/INVERT logic circuit means having inputs connected to said 10× select line and to the output of said down-range INVERT logic circuit means;

L. said down-range third AND/INVERT logic circuit means having inputs connected to said 10× select line and to the output of said down-range second AND/INVERT logic circuit means; and M. switching means operatively responsive to the status of said 10× select line and said 1× select line for provisionally connecting, respectively, said 10× drive line and said 1× drive line of said digital voltmeter in response to the activated one of said 1× and 10× select line.

8. The autoranging system of claim 7 wherein

A. said switching means normally connects said 1× and 10× drive lines of said digital voltmeter and is adapted to connect the other of said drive lines of said digital voltmeter; and including B. a control means for overriding the decision of said autoranging system and optionally selecting and maintaining connection of either one of
   a. said one drive line, and
   b. the other of said drive lines.

9. The autoranging system of claim 7 wherein

A. said switching means normally connects one of said 1× and 10× drive lines of said digital voltmeter and including B. an override control means including
   a. a first control means normally providing a first positive signal passive to said autoranging circuit,
   b. a second control means normally providing a second positive signal passive to said autoranging system, and
   c. select means for optionally converting one of said first and second positive signals to, respectively,
      i. a first negative override signal for selection of and maintaining connection of said one drive line of said digital voltmeter, and
      ii. a second negative override signal for selection of and maintaining connection of the other of said drive lines of said digital voltmeter irrespective of the decision of said autoranging system;

C. a first override AND/INVERT logic circuit means having
   a. a first input connected to the range select line corresponding to the other of said drive lines, and
   b. a second input connected to said first control means and responsive to said first override signal;

D. a second override AND/INVERT logic circuit means having
   a. first input connected to the output of said first override AND/INVERT logic circuit,
   b. a second input connected to said second control means and responsive to said second override signal, and
   c. providing a switch signal in the event of a coincidence of said second override signal with the output of said first override AND/INVERT logic circuit means; and E. drive means responsive to said switch signal for actuation of said switching means to connect the other of said drive lines of said digital voltmeter.

10. The autoranging system of claim 7 wherein

A. said switching means normally connects one of said 1× and 10× drive lines of said digital voltmeter; and including B. an override control means for optionally providing one of
   a. a first negative override signal for maintaining connection of said one-drive line of said digital voltmeter, and
   b. a second negative override signal for maintaining connection of the other of said drive lines of said digital voltmeter;

C. a first override AND/INVERT logic circuit means having
   a. a first input connected to the range select line corresponding to the other of said drive lines, and
   b. a second input responsive to said first negative override signal;

D. a second override AND/INVERT logic circuit means having
   a. a first input connected to the output of said first override AND/INVERT logic circuit means,
   b. a second input responsive to said second negative override signal, and
   c. providing a switch signal in the event of coincidence of said second override signal with the output of said first override AND/INVERT logic circuit means; and E. drive means for actuation of said switching means in response to said switch signal to connect the other of said drive lines of said digital voltmeter.

11. An autoranging system for a digital voltmeter providing a digital output valve signal of a current analog input value and having a 1× drive line and a 10× drive line corresponding to and controlling the operative ranges of said digital voltmeter comprising:

A. an up-range AND logic circuit means having inputs connected to be responsive to the 8 and 1 bits in each of the decimal digits in said output value signal of said digital voltmeter and providing a first output signal in the event of the occurrence of both said 8 and 1 bits in each of said decimal digits;

B. an up-range AND/INVERT logic circuit means;

C. a second up-range AND/INVERT logic circuit means having an output defining a 10× select line;

D. an up-range AND logic circuit means connected to be responsive to the complemements 8, 4, 2, and 1 bits in the most significant digits in the output value of said digital voltmeter and providing a second output signal in the event of an occurrence of said complements of the 8, 4, 2, and 1 bits in said most significant decimal digit;

E. a first down-range AND/INVERT logic circuit means;

F. a second down-range AND/INVERT logic circuit means having an output defining a 1× select line;

G. said first up-range AND/INVERT logic circuit means having its input connected to said 1× select line and to the output of said up-range AND logic circuit means;

H. said second up-range AND/INVERT logic circuit means having inputs connected to said 1× select line and to the output of said first up-range AND/INVERT logic circuit means;

I. said first down-range AND/INVERT logic circuit means having inputs connected to said 10× select lines and to the output of said AND logic circuit means;

J. said second down-range AND/INVERT logic circuit means having inputs connected to said 10× select lines and to the output of said first down-range AND/INVERT logic circuit means; and K. switching means operatively responsive to the status of said 10× select line and said 1× select line for provisionally connecting, respectively, said 10× drive line and said 1× drive line of said digital voltmeter in response to the activating one of said 1× and 10× select lines.

12. The autoranging system of claim 11 wherein

A. said switching means normally connects said 1× and 10× drive lines of said digital voltmeter and is adapted to connect the other of said drive lines of said digital voltmeter; and including
B. a control means for overriding the decision of said autoranging system and optionally selecting and maintaining connection of either one of
a. said one drive line, and
b. the other of said drive lines.

13. The autoranging system of claim 11 wherein
A. said switching means normally connects one of said 1× and 10× drive lines of said digital voltmeter and including
B. an override control means including
a. a first control means normally providing a first positive signal passive to said autoranging circuit,
b. a second control means normally providing a second positive signal passive to said autoranging system, and
c. select means for optionally converting one of said first and second positive signals to, respectively,
i. a first negative override signal for selection of and maintaining connection of said one drive line of said digital voltmeter, and
ii. a second negative override signal for selection of and maintaining connection of the other of said drive lines of said digital voltmeter irrespective of the decision of said autoranging system;
C. a first override AND/INVERT logic circuit means having
a. a first input connected to the range select line corresponding to the other of said drive lines, and
b. a second input connected to said first control means and responsive to said first override signal;
D. a second override AND/INVERT logic circuit means having
a. first input connected to the output of said first override AND/INVERT logic circuit,
b. a second input connected to said second control means and responsive to said second override signal, and
c. providing a switch signal in the event of a coincidence of said second override signal with the output of said first override AND/INVERT logic circuit means; and
E. drive means responsive to said switch signal for actuation of said switching means to connect the other of said drive lines of said digital voltmeter.

14. The autoranging system of claim 11 wherein
A. said switching means normally connects one of said 1× and 10× drive lines of said digital voltmeter; and including
B. an override control means for optionally providing one of
a. a first negative override signal for maintaining connection of said one-drive line of said digital voltmeter, and
b. a second negative override signal for maintaining connection of the other of said drive lines of said digital voltmeter;
C. a first override AND/INVERT logic circuit means having
a. a first input connected to the range select line corresponding to the other of said drive lines, and
b. a second input responsive to said first negative override signal;
D. a second override AND/INVERT logic circuit means having
a. a first input connected to the output of said first override AND/INVERT logic circuit means,
b. a second input responsive to said second negative override signal, and
c. providing a switch signal in the event of coincidence of said second override signal with the output of said first override AND/INVERT logic circuit means; and
E. drive means for actuation of said switching means in response to said switch signal to connect the other of said drive lines of said digital voltmeter.

15. An autoranging system for a digital voltmeter providing a digital output value signal of a current analog input value and having
a. a 1× drive line and
b. a 10× drive line corresponding to and controlling the operative ranges of said digital voltmeter, comprising:
A. an up-range AND logic circuit means
a. having inputs connected to be responsive to the 8 and 1 bits in each of the significant decimal digits in said output value signal of said digital voltmeter, and
b. providing a first output signal in the event of the occurrence of both said 8 and 1 bits in each of said decimal digits;
B. a first up-range AND/INVERT logic circuit means;
C. a second up-range AND/INVERT logic circuit means having an output defining a 10× select line;
D. a down-range AND logic circuit means having
a. inputs connected to be responsive to the complements of the 8, 4, 2 and 1 bits in the most significant decimal digit in the output value of said digital voltmeter, and
b. providing a second output signal in the event of an occurrence of each of said complements of the 8, 4, 2, and 1 bits in said most significant digit;
E. a first down-range AND/INVERT logic circuit means;
F. a second down-range AND/INVERT logic circuit means having an output defining a 1× select line;
G. said first up-range AND/INVERT logic circuit means having its inputs connected to said 1× select line and to the output of said up-range AND logic circuit means;
H. said second up-range AND/INVERT logic circuit means having its input connected to said 1× select line and to the output of said first up-range AND/INVERT logic circuit means;
I. said first down-range AND/INVERT logic circuit means having inputs connected to said 10× select line and to the output of said down-range AND logic circuit means;
J. said second AND/INVERT logic circuit means having inputs connected to said 10× select line and to the output of said first down-range AND/INVERT logic circuit means; and
K. switching means operatively responsive to the status of said 10× select line and said 1× select line for provisionally connecting, respectively, said 10× drive line and 1× drive line.

16. The autoranging system of claim 15 wherein
A. said switching means normally connects said 1× and 10× drive lines of said digital voltmeter and is adapted to connect the other of said drive lines of said digital voltmeter; and including
B. a control means for overriding the decision of said autoranging system and optionally selecting and maintaining connection of either one of
a. said one drive line, and
b. the other of said drive lines.

17. The autoranging system of claim 15, wherein
A. said switching means normally connects one of said 1× and 10× drive lines of said digital voltmeter and including
B. an override control means including
a. a first control means normally providing a first positive signal passive to said autoranging circuit,
b. a second control means normally providing a second positive signal passive to said autoranging system, and
c. select means for optionally converting one of said first and second positive signals to, respectively,
i. a first negative override signal for selection of and maintaining connection of said one drive line of said digital voltmeter, and
ii. a second negative override signal for selection of and maintaining connection of the other of said drive lines of said digital voltmeter irrespective of the decision of said autoranging system;
C. a first override AND/INVERT logic circuit means having
a. a first input connected to the range select line corresponding to the other of said drive lines, and
b. a second input connected to said first control means and responsive to said first override signal;
D. a second override AND/INVERT logic circuit means having a. first input connected to the output of said first override AND/INVERT logic circuit, b. a second input connected to said second control means and responsive to said second override signal, and c. providing a switch signal in the event of a coincidence of said second override signal with the output of said first override AND/INVERT logic circuit means; and E. drive means responsive to said switch signal for actuation of said switching means to connect the other of said drive lines of said digital voltmeter.

18. The autoranging system of claim 15 wherein

A. said switching means normally connects one of said 1× and 10× drive lines of said digital voltmeter; and including B. an override control means for optionally providing one of a. a first negative override signal for maintaining connection of said one-drive line of said digital voltmeter, and b. a second negative override signal for maintaining connection of the other of said drive lines of said digital voltmeter;

C. a first override AND/INVERT logic circuit means having a. a first input connected to the range select line corresponding to the other of said drive lines, and b. a second input responsive to said first negative override signal;

D. a second override AND/INVERT logic circuit means having a. a first input connected to the output of said first override AND/INVERT logic circuit means, b. a second input responsive to said second negative override signal, and c. providing a switch signal in the event of coincidence of said second override signal with the output of said first override AND/INVERT logic circuit means; and E. drive means for actuation of said switching means in response to said switch signal to connect the other of said drive lines of said digital voltmeter.

* * * * *

PO-1050 (5/69)

UNITED STATES PATENT OFFICE
CERTIFICATE OF CORRECTION

Patent No. 3,648,175 Dated March 7, 1972

Inventor(s) Barnard et al

It is certified that error appears in the above-identified patent and that said Letters Patent are hereby corrected as shown below:

| | |
|---|---|
| TABLE 3, Line 1 (In the specification Page 15, Line 9) | change "$V_{1-14}$" to --$V_{1-4}$-- |
| TABLE 8, Line 24 (In the specification Page 34, Line 25) | change "10101" to --101001-- |
| TABLE 8, Line 30 (In the specification Page 15, Line 31) | change "010 00" to --010100-- |
| Column 19, Line 37 (In the specification Page 53, Line 15) | change "drive-to-fall" to --drive-to-fail--etc. |
| TABLE 12, Lines 58-61 (In the specification Page 62, Lines 11-14) | change "0-11" "0-12" "0-12" "0-14" to --041-- --042-- --042-- --044-- |
| TABLE 13, Line 24 (In the specification Page 63, Line 26) | change "MP" to --MP=-- |
| TABLE 13, Line 26 (In the specification Page 63, Line 29) | change "Pina" to --Pins-- |
| TABLE 15, Line 1 (In the specification Page 65, Line 4) | change "$Z_1,B_3$" to --$Z_1,B_2$-- |

PO-1050
(5/69)

UNITED STATES PATENT OFFICE
CERTIFICATE OF CORRECTION

Patent No. 3,648,175 Dated March 7, 1972

Inventor(s) Barnard et al - 2 -

It is certified that error appears in the above-identified patent and that said Letters Patent are hereby corrected as shown below:

| | |
|---|---|
| TABLE 15, Line 3 (In the specification Page 65, Line 6) | change "$N_{1\ 3\ 4}$ " to --$N_{1,2,3}$-- |
| Column 26, Line 36 (In the specification Page 69, Line 13) | change "W" to --IF-- |
| Column 27, Line 63 (In the specification Page 72, Line 19) | change "n" to --#n-- |
| Column 31, Line 56 (In the specification Page 84, Line 3) | change "one" to --"one"-- |
| Column 31, Line 57 (In the specification Page 84, Line 4) | change "zero" to --"zero"-- |
| Column 32, Line 22 (In the specification Page 85, Line 26) | change "04" to --04-V-- |
| Column 32, Line 64 (In the specification Page 87, Line 15) | Delete (Line printed twice in patent) |
| Column 39, CLAIM 7, Line 1 (in the CLAIMS, CLAIM 7 Line 22) | change "connected to the"etc. to --connected to be--etc. |

Signed and sealed this 10th day of April 1973.

(SEAL)
Attest:

EDWARD M.FLETCHER,JR.
Attesting Officer

ROBERT GOTTSCHALK
Commissioner of Patents